(12) United States Patent
Nelson

(10) Patent No.: US 10,279,300 B2
(45) Date of Patent: *May 7, 2019

(54) AIR CLEANER ASSEMBLY; COMPONENTS THEREFOR; AND, METHODS

(71) Applicant: Donaldson Company, Inc., Minneapolis, MN (US)

(72) Inventor: Benny K. Nelson, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,347

(22) Filed: Apr. 27, 2018

(65) Prior Publication Data

US 2018/0311604 A1    Nov. 1, 2018

Related U.S. Application Data

(63) Continuation of application No. 14/293,023, filed on Jun. 2, 2014, now Pat. No. 9,956,516, which is a
(Continued)

(51) Int. Cl.
*B01D 39/00* (2006.01)
*B01D 46/00* (2006.01)
(Continued)

(52) U.S. Cl.
CPC ...... *B01D 46/2411* (2013.01); *B01D 46/0005* (2013.01); *B01D 46/525* (2013.01); *B01D 46/526* (2013.01); *B01D 2271/027* (2013.01)

(58) Field of Classification Search
None
See application file for complete search history.

(56) References Cited

U.S. PATENT DOCUMENTS 4,410,427 A   10/1983   Wydeven
4,589,983 A    5/1986   Wydevan
(Continued)

FOREIGN PATENT DOCUMENTS

EP    0 164 956    12/1985
GB    2222964      3/1990
(Continued)

OTHER PUBLICATIONS

PCT Search Report and Written Opinion corresponding to PCT/US2009/051214 dated Mar. 24, 2010.
Pending claims of U.S. Appl. No. 15/918,664 dated Jul. 18, 2018.

*Primary Examiner* — Amber R Orlando
*Assistant Examiner* — Phillip Y Shao
(74) *Attorney, Agent, or Firm* — Merchant & Gould P.C.

(57) ABSTRACT

Air filter cartridges for use in air cleaner assemblies are described. The air filter cartridges typically comprise a stack of strips of fluted media, having an inlet flow face and an outlet flow face. A projection is provided extending outwardly from adjacent the outlet flow face of the media pack, as a projection supporting a seal arrangement. The seal arrangement is typically rectangular, with four straight and four rounded corners. The projection can be configured with open corners, and in some instances comprises tabs, to facilitate flexing of the projection to accommodate variations in a housing seal surface, with which the cartridge is installed. Air cleaner assemblies and components therefor, using cartridges in accord with the descriptions herein, are described.

21 Claims, 69 Drawing Sheets

Related U.S. Application Data continuation of application No. 12/737,519, filed as application No. PCT/US2009/051214 on Jul. 21, 2009, now Pat. No. 8,741,017.

(60) Provisional application No. 61/135,595, filed on Jul. 22, 2008.

(51) Int. Cl.
  *B01D 47/00* (2006.01)
  *B01D 53/00* (2006.01)
  *B01D 46/24* (2006.01)
  *B01D 46/52* (2006.01)

(56) References Cited

U.S. PATENT DOCUMENTS

| | | |
|---|---|---|
| D326,706 S | 6/1992 | Karlsson |
| 5,613,992 A | 3/1997 | Engel et al. |
| 5,730,769 A | 3/1998 | Dungs et al. |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A | 10/1998 | Gillingham et al. |
| 5,893,937 A | 4/1999 | Moessinger |
| 5,895,574 A | 4/1999 | Friedmann et al. |
| 5,902,364 A | 5/1999 | Tokar et al. |
| D417,268 S | 11/1999 | Gillingham et al. |
| 6,039,778 A | 3/2000 | Coulonvaux et al. |
| D428,128 S | 7/2000 | Gillingham et al. |
| 6,179,890 B1 | 1/2001 | Ramos et al. |
| D437,401 S | 2/2001 | Ramos et al. |
| D437,402 S | 2/2001 | Gieseke et al. |
| 6,190,432 B1 | 2/2001 | Gieseke et al. |
| 6,210,469 B1 | 4/2001 | Tokar et al. |
| 6,221,122 B1 | 4/2001 | Gieseke et al. |
| 6,235,195 B1 | 5/2001 | Tokar |
| D444,219 S | 6/2001 | Gieseke et al. |
| D447,549 S | 9/2001 | Gieseke et al. |
| D450,827 S | 11/2001 | Gieseke et al. |
| D450,828 S | 11/2001 | Tokar |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,350,296 B1 | 2/2002 | Warner |
| 6,368,374 B1 | 4/2002 | Tokar et al. |
| D460,169 S | 7/2002 | Anderson et al. |
| D461,003 S | 7/2002 | Gieseke et al. |
| 6,416,605 B1 | 7/2002 | Golden |
| D464,129 S | 10/2002 | Xu et al. |
| 6,517,598 B2 | 2/2003 | Anderson et al. |
| D471,623 S | 3/2003 | Gieseke et al. |
| D473,637 S | 4/2003 | Golden |
| D477,659 S | 7/2003 | Gieseke et al. |
| 6,599,342 B2 | 7/2003 | Andress et al. |
| 6,610,126 B2 | 8/2003 | Xu et al. |
| D481,101 S | 10/2003 | Gieseke et al. |
| 6,652,614 B2 | 11/2003 | Gieseke et al. |
| D483,459 S | 12/2003 | Dewit et al. |
| D484,584 S | 12/2003 | Anderson et al. |
| 6,673,136 B2 | 1/2004 | Gillingham et al. |
| 6,743,317 B2 | 6/2004 | Wydeven |
| D497,202 S | 10/2004 | Stavos et al. |
| 6,852,141 B2 | 2/2005 | Bishop et al. |
| D506,539 S | 6/2005 | Bishop et al. |
| 6,966,940 B2 | 11/2005 | Krisko et al. |
| 7,004,986 B2 | 2/2006 | Kopec et al. |
| D520,619 S | 5/2006 | Kuempel et al. |
| 7,070,642 B2 | 7/2006 | Scott et al. |
| 7,090,708 B2 | 8/2006 | Winter |
| 7,115,156 B2 | 10/2006 | Schaerlund et al. |
| 7,282,075 B2 | 10/2007 | Spone et al. |
| 7,329,326 B2 | 2/2008 | Wagner et al. |
| 7,351,270 B2 | 4/2008 | Olson et al. |
| 7,364,601 B2 | 4/2008 | Xu et al. |
| 7,396,375 B2 | 7/2008 | Kuempel et al. |
| 7,396,376 B2 | 7/2008 | Schrage et al. |
| 7,488,365 B2 | 2/2009 | Golden et al. |
| 7,524,349 B2 | 4/2009 | Schrage et al. |
| 7,537,631 B2 | 5/2009 | Scott et al. |
| 7,569,090 B2 | 8/2009 | Nelson |
| D600,790 S | 9/2009 | Nelson et al. |
| 7,625,419 B2 | 12/2009 | Nelson et al. |
| 7,655,074 B2 | 2/2010 | Nepsund et al. |
| 7,674,308 B2 | 3/2010 | Krisko et al. |
| 7,682,416 B2 | 3/2010 | Engelland et al. |
| 7,713,321 B2 | 5/2010 | Kuempel et al. |
| D635,233 S | 3/2011 | Nelson |
| 7,905,936 B2 | 3/2011 | Olson et al. |
| 7,967,886 B2 | 6/2011 | Schrage et al. |
| 7,972,404 B2 | 7/2011 | Kuempel et al. |
| 7,972,405 B2 | 7/2011 | Engelland et al. |
| 7,997,425 B2 | 8/2011 | Golden et al. |
| 8,016,903 B2 | 9/2011 | Nelson et al. |
| 8,034,145 B2 | 10/2011 | Boehrs et al. |
| 8,048,188 B2 | 11/2011 | Engelland et al. |
| 8,066,791 B2 | 11/2011 | Baseotto et al. |
| 8,142,533 B2 | 3/2012 | Gillenberg et al. |
| 8,147,576 B2 | 4/2012 | Gillenberg et al. |
| 8,152,876 B2 | 4/2012 | Gillenberg et al. |
| 8,216,334 B2 | 7/2012 | Nelson et al. |
| 8,277,532 B2 | 10/2012 | Reichter et al. |
| 8,287,612 B2 | 10/2012 | Gillenberg et al. |
| 8,292,983 B2 | 10/2012 | Reichter et al. |
| 8,328,897 B2 | 12/2012 | Nelson et al. |
| 8,357,219 B2 | 1/2013 | Boehrs et al. |
| 8,493,723 B2 | 7/2013 | Reichter et al. |
| 8,663,355 B2 | 3/2014 | Nelson et al. |
| 8,741,017 B2 * | 6/2014 | Nelson ............... B01D 46/0005 55/493 |
| 8,808,417 B2 | 8/2014 | Engelland et al. |
| 8,840,699 B2 | 9/2014 | Bruce et al. |
| 9,289,712 B2 | 3/2016 | Nelson et al. |
| 9,943,797 B2 | 4/2018 | Nelson et al. |
| 9,956,516 B2 * | 5/2018 | Nelson ............... B01D 46/0005 |
| 2002/0096247 A1 | 7/2002 | Wydeven et al. |
| 2003/0146149 A1 | 8/2003 | Binder et al. |
| 2004/0173097 A1 * | 9/2004 | Engelland ............ B01D 46/0004 95/273 |
| 2007/0039296 A1 | 2/2007 | Schrage et al. |
| 2007/0235384 A1 | 10/2007 | Oku et al. |
| 2008/0190082 A1 | 8/2008 | Scott et al. |
| 2008/0307759 A1 | 12/2008 | Reichter et al. |
| 2009/0064646 A1 | 3/2009 | Reichter et al. |
| 2009/0094951 A1 | 4/2009 | Baseotto et al. |
| 2009/0100813 A1 | 4/2009 | Iddings et al. |
| 2009/0151311 A1 | 6/2009 | Reichter et al. |
| 2009/0211450 A1 | 8/2009 | Mosset et al. |
| 2009/0217632 A1 | 9/2009 | Coulonvaux et al. |
| 2009/0301045 A1 | 12/2009 | Nelson et al. |
| 2010/0032365 A1 | 2/2010 | Moe et al. |
| 2010/0043366 A1 | 2/2010 | Boehrs et al. |
| 2010/0044295 A1 | 2/2010 | Campbell |
| 2010/0146917 A1 | 6/2010 | Coulonvaux et al. |
| 2010/0146919 A1 | 6/2010 | Nelson |
| 2010/0146920 A1 | 6/2010 | Iddings et al. |
| 2010/0293906 A1 | 11/2010 | Flagstad et al. |
| 2011/0017657 A1 | 1/2011 | Jokschas et al. |
| 2011/0094197 A1 | 4/2011 | Ruhland et al. |
| 2011/0173937 A1 | 7/2011 | Nelson |
| 2011/0232244 A1 | 9/2011 | Schrage et al. |
| 2011/0247582 A1 | 10/2011 | Blossey et al. |
| 2011/0308212 A1 | 12/2011 | Ruhland et al. |

FOREIGN PATENT DOCUMENTS

| | | |
|---|---|---|
| WO | 2004/071616 | 8/2004 |
| WO | 2005/079954 | 9/2005 |
| WO | 2007/044677 | 4/2007 |

* cited by examiner

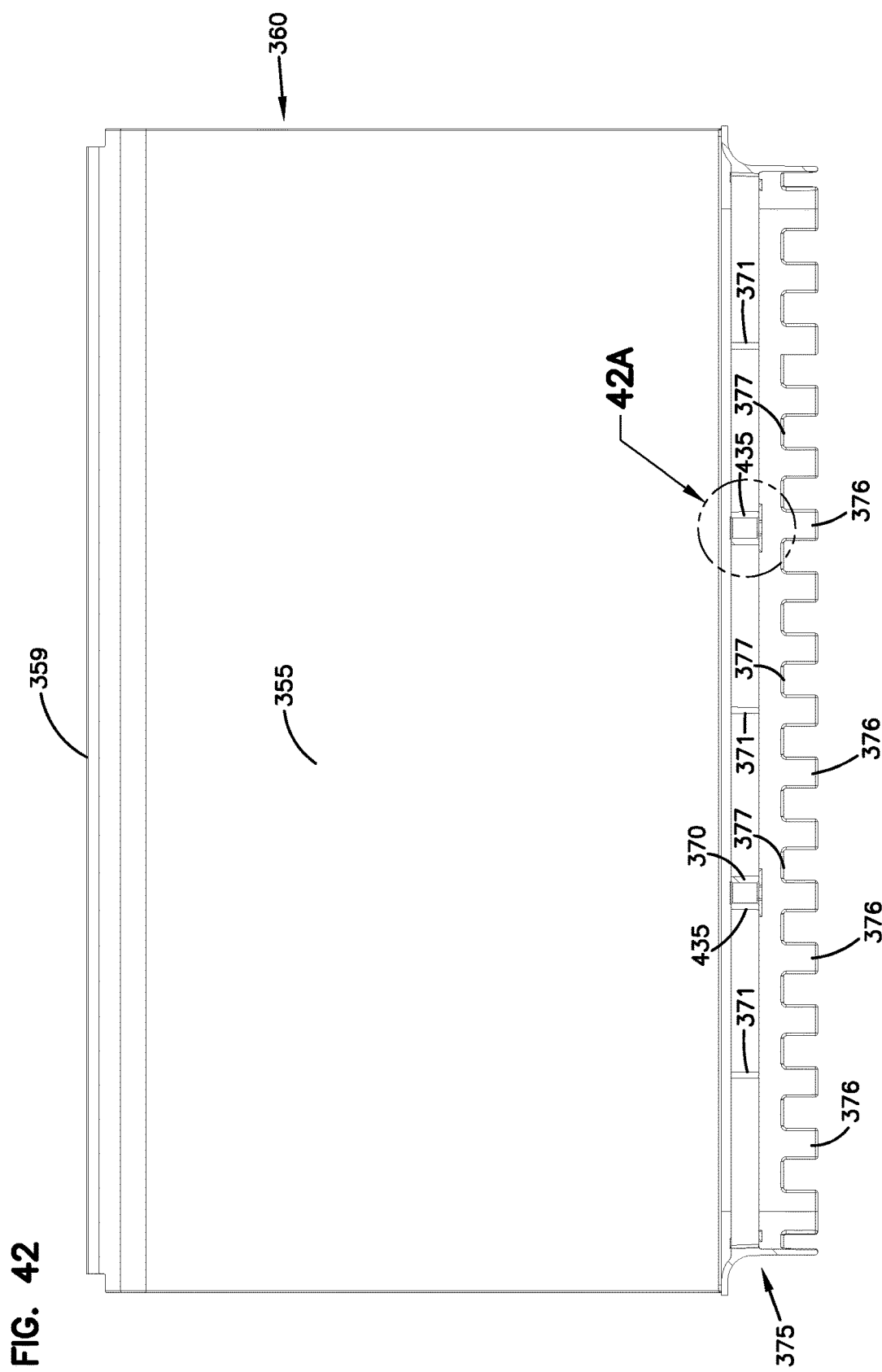

AIR CLEANER ASSEMBLY; COMPONENTS THEREFOR; AND, METHODS

CROSS REFERENCE TO RELATED APPLICATION

This application is a continuation application of U.S. Ser. No. 14/293,023, filed Jun. 2, 2014, which issued as U.S. Pat. No. 9,956,516 on May 1, 2018. U.S. Ser. No. 14/293,023 is a continuation of Ser. No. 12/737,519, filed Apr. 7, 2011, which issued as U.S. Pat. No. 8,741,017 on Jun. 3, 2014. U.S. Ser. No. 12/737,519 was filed as a National Stage of PCT International Patent Application PCT/US2009/051214, filed Jul. 21, 2009. The present application includes the disclosure of, with edits, U.S. provisional application 61/135,595 filed Jul. 22, 2008. The complete disclosures of U.S. Ser. Nos. 14/293,023; 12/737,519; PCT/US2009/051214 and, U.S. application 61/135,595 are incorporated herein by reference. A claim of priority to each of U.S. Ser. Nos. 14/293,023; 12/737,519; PCT/US2009/051214 and, U.S. application 61/135,595 is made, to the extent appropriate.

FIELD OF THE DISCLOSURE

The present disclosure relates to filter arrangements for use in filtering air. The disclosure particularly relates to filter arrangements including media packs that use media as characterized herein. The media generally comprises flutes formed into a media pack having inlet and outlet faces with flutes extending therebetween. More specifically, the disclosure relates to such use of media packs and their inclusion in serviceable air filter cartridges for use in air cleaners. Air cleaner arrangements and methods of assembly and use are also described.

BACKGROUND

Air streams can carry contaminant material therein. In many instances, it is desired to filter some or all of the contaminant material from the air stream. For example, air flow streams to engines (for example combustion air) for motorized vehicles or for power generation equipment, gas streams to gas turbine systems and air streams to various combustion furnaces, carry particulate contaminant therein that should be filtered. It is preferred for such systems, that selected contaminant material be removed from (or have its level reduced in) the air. A variety of air filter arrangements have been developed for contaminant rejection. Improvements are sought.

SUMMARY

According to the present disclosure, air cleaner assemblies and components therefor are described. In the example systems depicted, a serviceable main filter cartridge is provided which comprises inlet and outlet flow faces, with flutes of fluted media extending therebetween; the media pack being closed to flow of air entering the inlet face and passing outwardly from the outlet flow face without filtering the flow through the media of the media pack. Example media packs are described, which comprise stacks of strips and fluted media.

A housing seal arrangement is positioned to project axially outwardly from the outlet flow face, adjacent the outlet flow face. It is configured with a seal member having at least one of: a radially, inwardly directed housing seal; and, a radially, outwardly directed housing seal. In addition, each radial side of the seal member is configured to engage a housing seal groove engagement surface, in an air cleaner housing with which the cartridge is to be used. Example arrangements and alternatives therefor, are described.

An air cleaner assembly is depicted, for removable insertion therein of an air filter cartridge as previously characterized. The housing includes a seal groove therein, for receipt, projecting into the seal groove, of the housing seal arrangement on the filter cartridge. Some specific housing features are characterized.

There is no requirement than an assembly include all of the features characterized herein, in order to obtain some benefit according to the present disclosure.

BRIEF DESCRIPTION OF THE DRAWINGS

in FIG. 30, a fragmentary cross-sectional view of a housing portion also being depicted.

FIG. 42 is an a schematic, cross-sectional view taken along line 42-42, of FIG. 41.

DETAILED DESCRIPTION

I. Media Configurations, Generally

Figure 1:
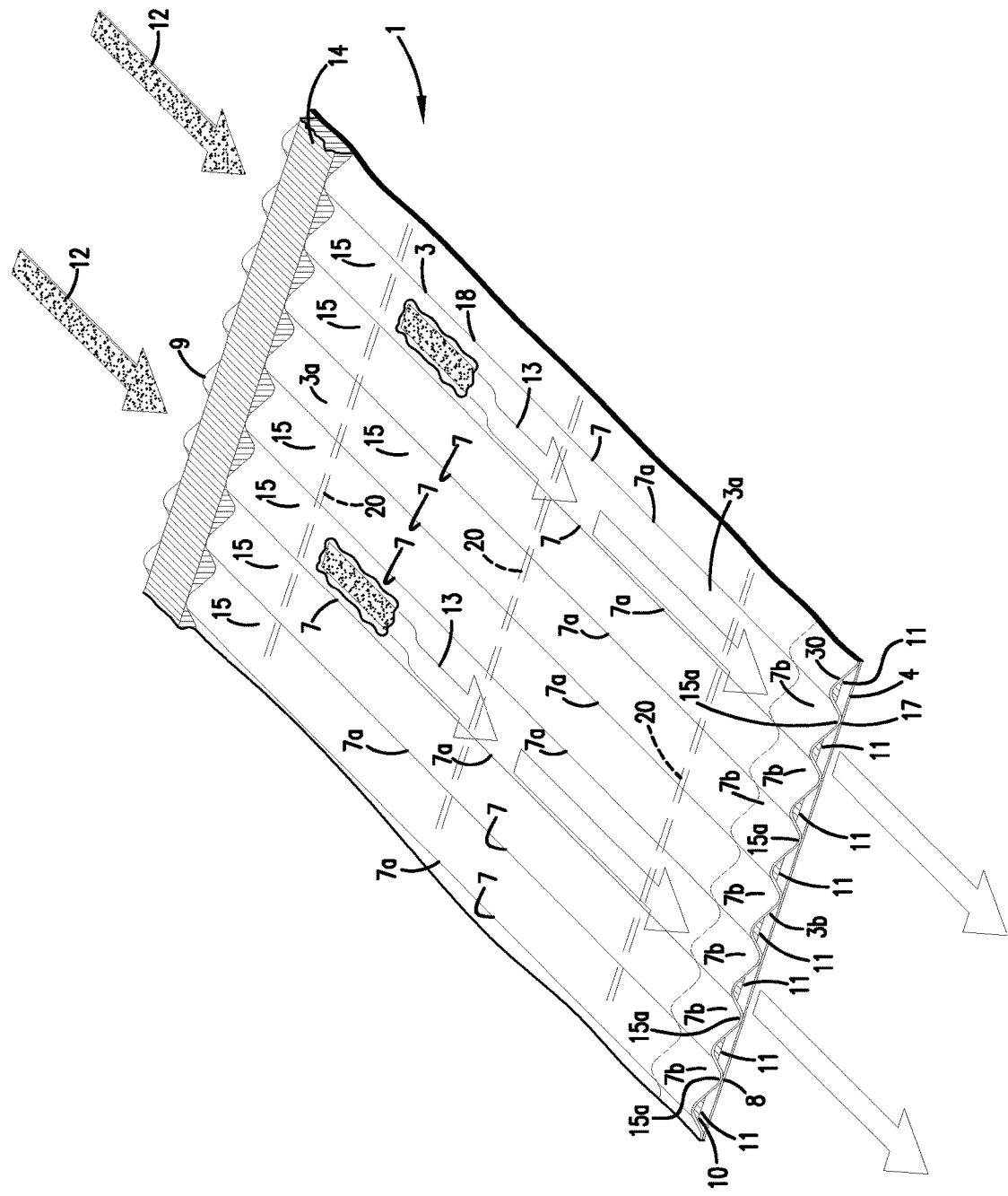
FIG. 1 is a fragmentary, schematic, perspective view of z-filter media useable in arrangements according to the present disclosure.

Fluted filter media can be used to provide fluid filter constructions in a variety of manners. One well known manner is characterized herein as a z-filter construction. The term "z-filter construction" as used herein, is meant to refer to a type of filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. No. 6,235,195 and U.S. Pat. No. 6,179,890, each of which is incorporated herein by reference. In certain other arrangements, some non-coiled sections or strips of fluted (typically corrugated) media secured to facing media, are stacked on one another, to create a filter construction. An example of this is described in FIG. 11 of U.S. Pat. No. 5,820,646, incorporated herein by reference.

Herein, strips of material comprising fluted sheet secured to corrugated sheet, which are then assembled into stacks to form media packs, are sometimes referred to as "single facer strips" or a "single facer". The term "single facer strip", and "single facer" and variants thereof, is meant to refer to a fact that one face, i.e., a single face, of the fluted (typically corrugated) sheet, is faced by the facing sheet, in each strip.

Typically, coiling of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application U.S. 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to allow for definition of inlet and outlet flutes; and/or a media pack constructed or formed from such media into a three dimensional network of inlet and outlet flutes; and/or, a filter cartridge or construction including such a media pack.

In FIG. 1, an example of media 1 useable in z-filter media is shown. The media 1 is formed from a fluted, in this instance corrugated, sheet 3 and a facing sheet 4. A construction such as media 1 is deferred to herein as a single facer or single facer strip.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs $7b$ and ridges $7a$. The term "regular" in this context is meant to refer to the fact that the pairs of troughs and ridges ($7b$, $7a$) alternate with generally the same repeating corrugation (or flute) shape and size. (Also, typically in a regular configuration each trough $7b$ is substantially an inverse of each ridge $7a$.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges $7a$ and seven complete troughs $7b$.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex $7a$ of each ridge and the bottom $7b$ of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, wave pattern fluted (in this instance corrugated) sheet 3 shown in FIG. 1, is that the individual corrugations are generally straight. By "straight" in this context, it is meant that through at least 70%, typically at least 80% of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is formed into a media pack, in general edge 9 will form an inlet end for the media pack and edge 8 an outlet end, although an opposite orientation is possible.

Adjacent edge 8 is provided a sealant bead 10, sealing the corrugated sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

Adjacent edge 9, is provided seal bead 14. Seal bead 14 generally closes flutes 15 to passage of unfiltered fluid therein, adjacent edge 9. Bead 14 would typically be applied as strips of the media 1 are secured to one another during stacking. Thus bead 14 will form a seal between a back side 17 of facing sheet 4, and side 18 of the next adjacent corrugated sheet 3. When the media 1 is cut in strips and stacked, instead of coiled, bead 14 is referenced as a "stacking bead." (When bead 14 is used in a coiled arrangement formed from media 1, not depicted herein, it is referenced as a "winding bead.")

Referring to FIG. 1, once the media 1 is incorporated into a media pack, for example by stacking, it can be operated as follows. First, air in the direction of arrows 12, would enter open flutes 11 adjacent end 9. Due to the closure at end 8, by bead 10, the air would pass through the media, for example as shown by arrows 13. It could then exit the media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing media sheet is sometimes tacked to the fluted media sheet, to inhibit this spring back in the corrugated sheet. Such tacking is shown at 20.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference. In some instances, when such fine fiber material is used, it may be desirable to provide the fine fiber on the upstream side of the material and inside the flutes. When this occurs, air flow, during filtering, will typically be into the edge comprising stacking bead.

An issue with respect to z-filter constructions relates to closing of the individual flute ends. Although alternatives are possible, typically a sealant or adhesive is provided, to accomplish the closure. As is apparent from the discussion above, in typical z-filter media, especially that which uses straight flutes as opposed to tapered flutes and sealant for flute seals, large sealant surface areas (and volume) at both the upstream end and the downstream end are needed. High quality seals at these locations are critical to proper operation of the media structure that results. The high sealant volume and area, creates issues with respect to this.

Figure 2:
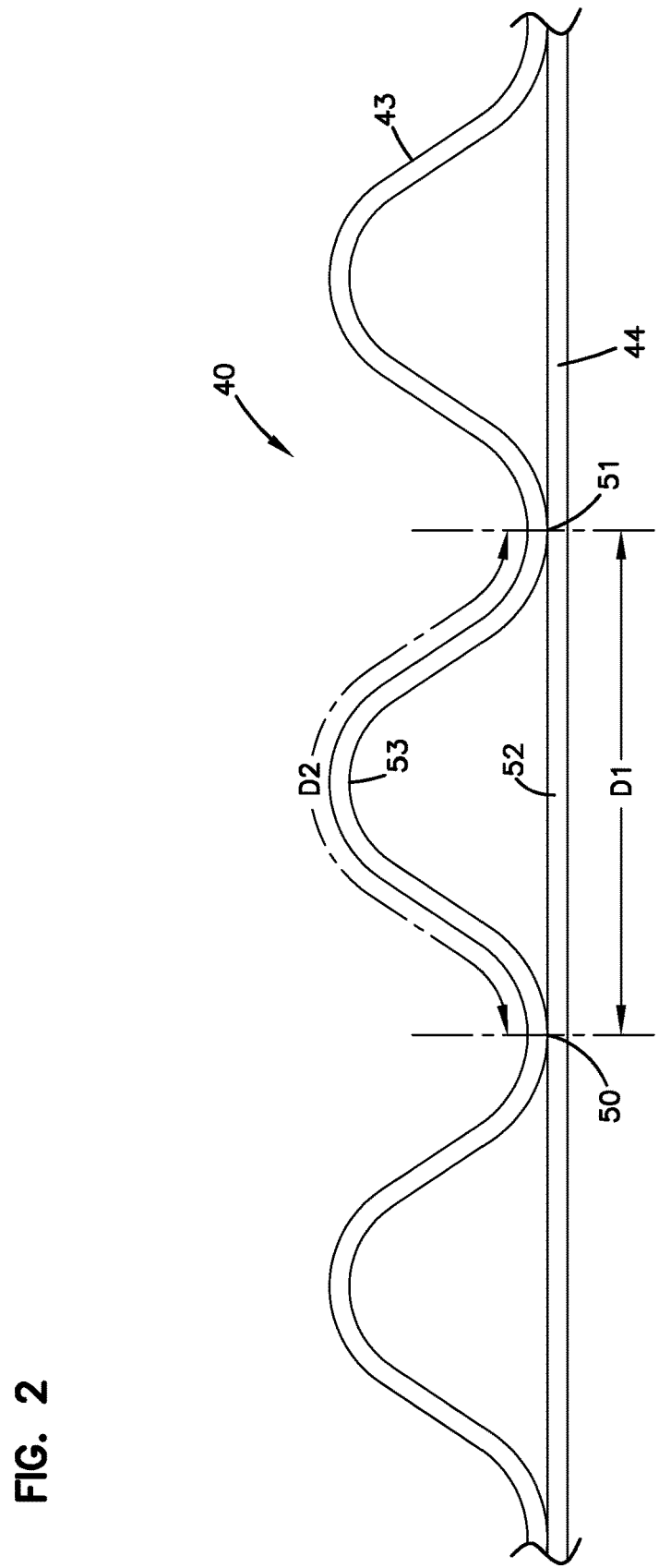
FIG. 2 is an enlarged, schematic, cross-sectional view of a portion of the media depicted in FIG. 1.

Attention is now directed to FIG. 2, in which a z-filter media construction 40 utilizing a regular, curved, wave pattern corrugated sheet 43, and a non-corrugated flat sheet 44, i.e., a single facer strip is schematically depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0 times D1, inclusive. One particularly convenient arrangement for air filters has a configuration in which D2 is about 1.25-1.35× D1. Such media has, for example, been used commercially in Donaldson Powercore™ Z-filter arrangements. Another potentially convenient size would be one in which D2 is about 1.4-1.6 times D1. Herein the ratio D2/D1 will sometimes be characterized as the flute/flat ratio or media draw for the corrugated media.

Figure 3:
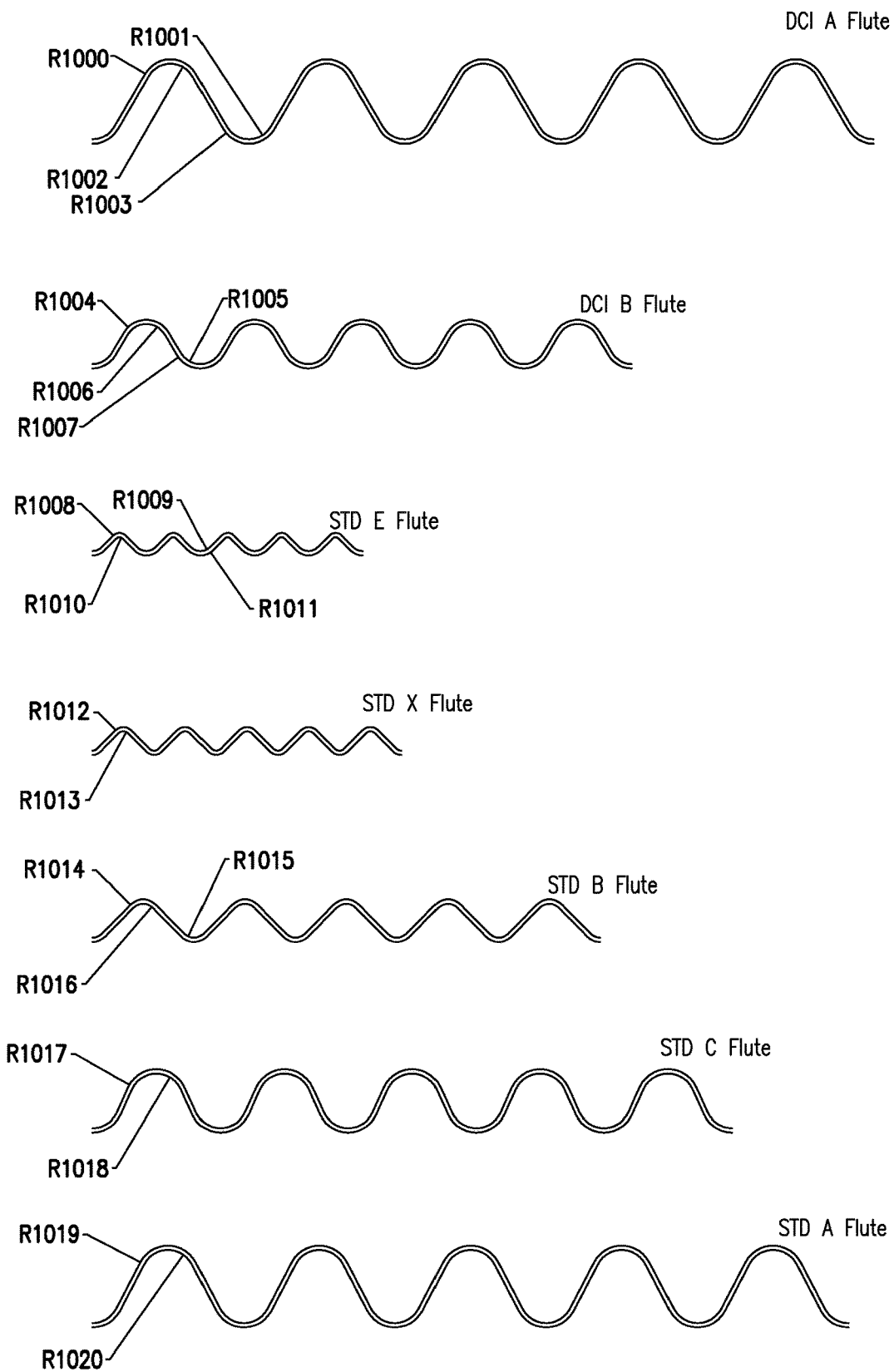
FIG. 3 includes schematic views of examples of various fluted media definitions.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

DCI A Flute: Flute/flat = 1.52:1; The Radii (R) are as follows:
R1000 = .0675 inch (1.715 mm); R1001 = .0581 inch (1.476 mm);
R1002 = .0575 inch (1.461 mm); R1003 = .0681 inch (1.730 mm);
DCI B Flute: Flute/flat = 1.32:1; The Radii (R) are as follows:
R1004 = .0600 inch (1.524 mm); R1005 = .0520 inch (1.321 mm);
R1006 = .0500 inch (1.270 mm); R1007 = .0620 inch (1.575 mm);
Std. E Flute: Flute/flat = 1.24:1; The Radii (R) are as follows:
R1008 = .0200 inch (.508 mm); R1009 = .0300 inch (.762 mm);
R1010 = .0100 inch (.254 mm); R1011 = .0400 inch (1.016 mm);
Std. X Flute: Flute/flat = 1.29:1; The Radii (R) are as follows:
R1012 = .0250 inch (.635 mm); R1013 = .0150 inch (.381 mm);
Std. B Flute: Flute/flat = 1.29:1; The Radii (R) are as follows:
R1014 = .0410 inch (1.041 mm); R1015 = .0310 inch (.7874 mm);
R1016 = .0310 inch (.7874 mm);
Std. C Flute: Flute/flat = 1.46:1; The Radii (R) are as follows:
R1017 = .0720 inch (1.829 mm); R1018 = .0620 inch (1.575 mm);
Std. A Flute: Flute/flat = 1.53:1; The Radii (R) are as follows:
R1019 = .0720 inch (1.829 mm); R1020 = .0620 inch (1.575 mm).

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and Ser. No. 12/012,785, filed Feb. 4, 2008 can be used, with air cleaner features as characterized herein below. The complete disclosures of each of U.S. Ser. No. 12/215,718 and Ser. No. 12/012,785 are incorporated herein by reference.

II. Manufacture of Stacked Media Configurations Using Fluted Media, Generally

Figure 4:
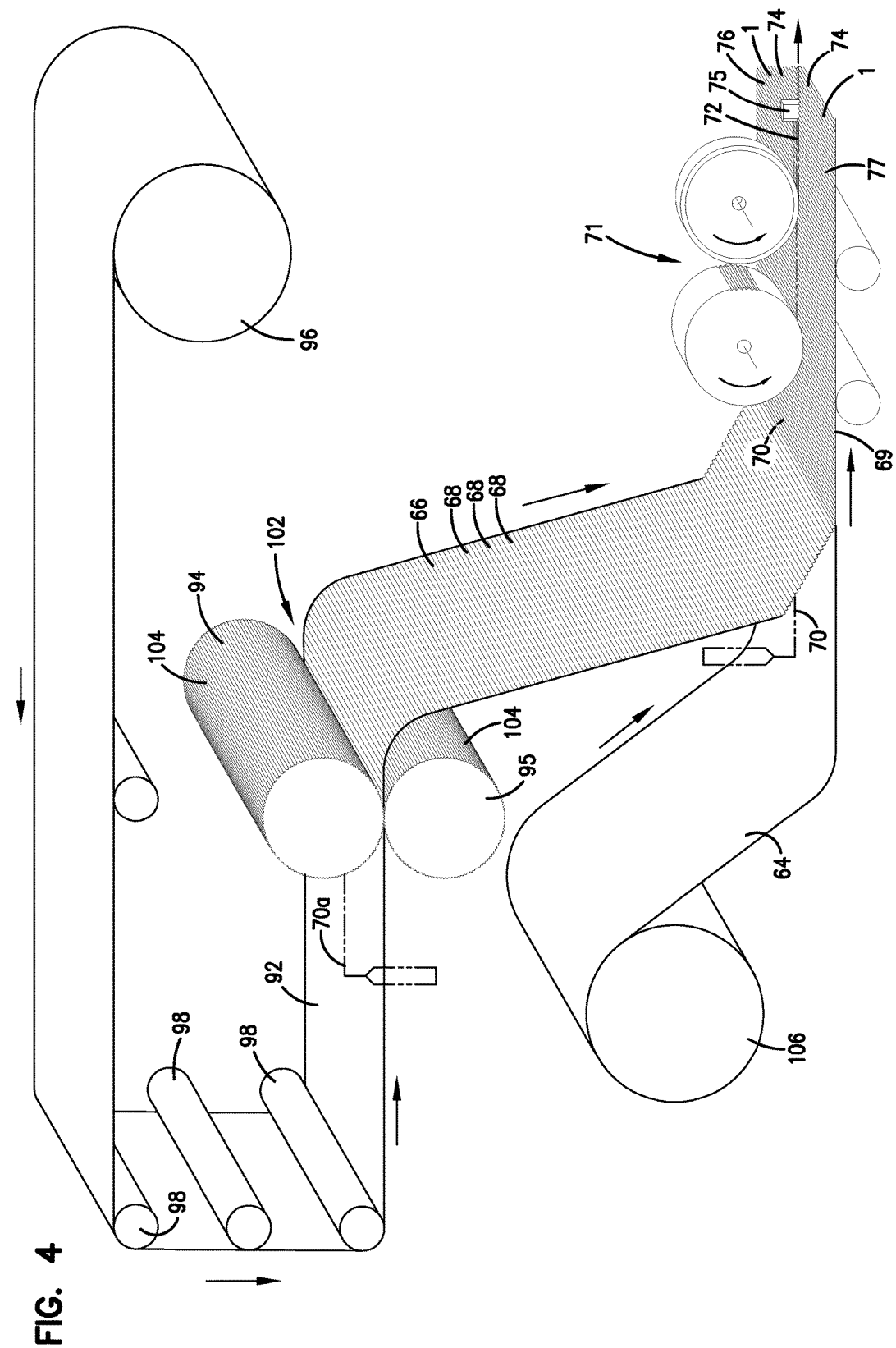
FIG. 4 is a schematic view of an example process for manufacturing media according to the present disclosure.

In FIG. 4, one example of a manufacturing process for making a media strip corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 14, FIG. 1.

The term "single facer bead" references a sealant bead positioned between layers of a single facer; i.e., between the fluted sheet and facing sheet.

An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location. The strips or pieces 76, 77 can then be cut across, into single facer strips for stacking, as described below in connection with FIG. 6.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 the media 74 must be formed. In the schematic shown in FIG. 4, this is done by passing a flat sheet of media 92 through a pair of corrugation rollers 94, 95. In the schematic shown in FIG. 4, the flat sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the flat sheet 92 becomes corrugated and is referenced at 66 as the corrugated sheet. The corrugated (i.e., fluted) media sheet 66 is then secured to facing media sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 are secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

The type of corrugation provided to the corrugated media is a matter of choice, and will be dictated by the corrugation or corrugation teeth of the corrugation rollers 94, 95. One typical type of flute pattern will be a regular, typically curved, wave pattern corrugation, of straight flutes, as defined herein above. A typical regular curved wave pattern used, would be one in which the distance D2, as defined above, in a corrugated pattern is at least 1.2 times the distance D1 as defined above. In one typical application, typically D2=1.25-1.35×D1; in another D2=1.4-1.6×D1. In some instances the techniques may be applied with curved wave patterns that are not "regular," including, for example, ones that do not use straight flutes.

Figure 5:
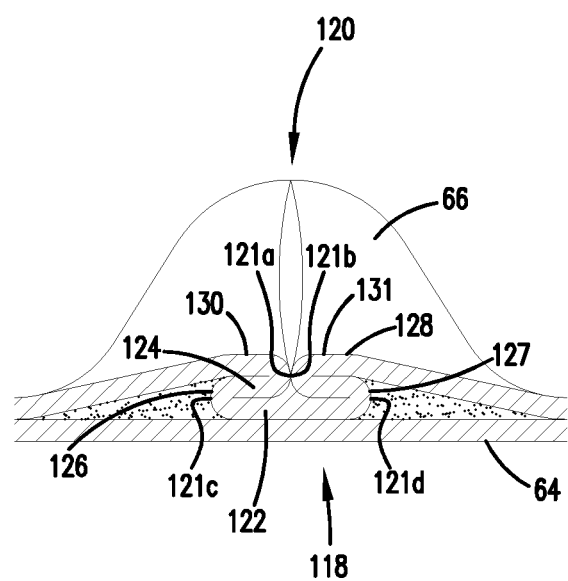
FIG. 5 is a schematic cross-sectional view of an optional end dart for media flutes useable in arrangements according to the present disclosure.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a preferred regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Other techniques for media management are described in PCT application U.S. 04/07927, filed Mar. 17, 2004, incorporated herein by reference.

Techniques described herein are well adapted for use of media packs that result from arrangements that, instead of being formed by coiling, are formed from a plurality of strips of single facer.

Opposite flow ends or flow faces of the media pack can be provided with a variety of different definitions. In many arrangements, the ends are generally flat and perpendicular to one another.

The flute seals (single facer bead, winding bead or stacking bead) can be formed from a variety of materials. In various ones of the cited and incorporated references, hot melt or polyurethane seals are described as possible for various applications. These are useable for applications described herein.

Figure 6:
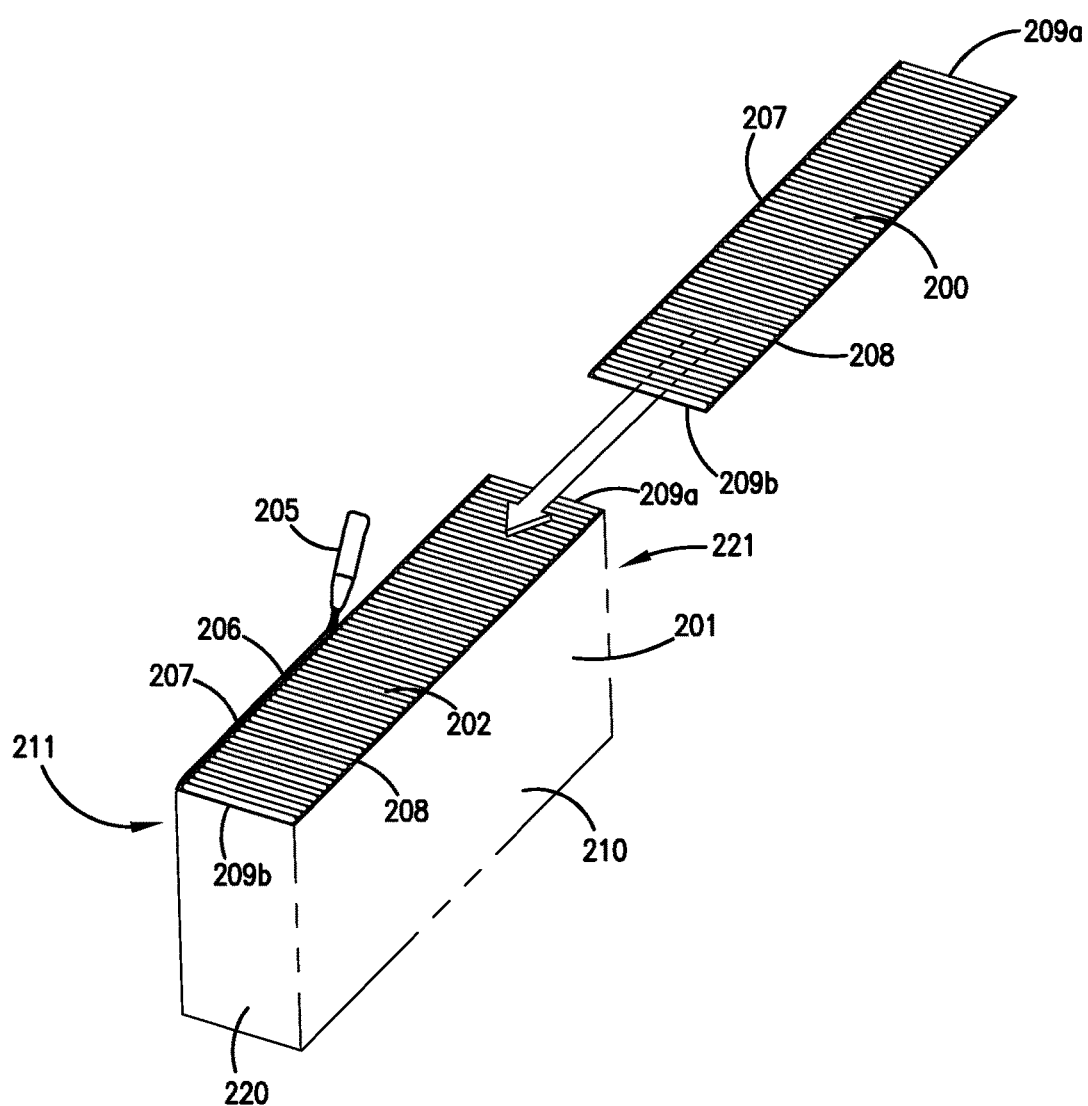
FIG. 6 is a schematic depiction of a step of creating a stacked z-filter media pack.

In FIG. 6, schematically there is shown a step of forming a stacked z-filter media pack from strips of z-filter media, each strip being a fluted sheet secured to a facing sheet. Referring to FIG. 6, single facer strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 6, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 6, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media pack 201 shown being formed in FIG. 6, is sometimes referred to herein as a "blocked" stacked media pack. The term "blocked" in this context, is an indication that the arrangement is formed to a rectangular block in which all faces are 90° relative to all adjoining wall faces. Alternate configurations are possible, as discussed below in connection with certain of the remaining figures. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media pack will be referenced as having a parallelogram shape in any cross-section, meaning that any two opposite side faces extend generally parallel to one another.

It is noted that a blocked, stacked arrangement corresponding to FIG. 6 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003. All four of these latter references are incorporated herein by reference. It is noted that a stacked arrangement shown in U.S. Ser. No. 10/731,504, is a slanted stacked arrangement.

III. Air Cleaner Assembly and Components, Useable with a Media Pack for Example in General Accord with FIG. 6

A. General Air Cleaner Features

Herein, example air cleaner assemblies and components are described, for implementing a media pack in general accord with FIG. 6.

Figure 7:
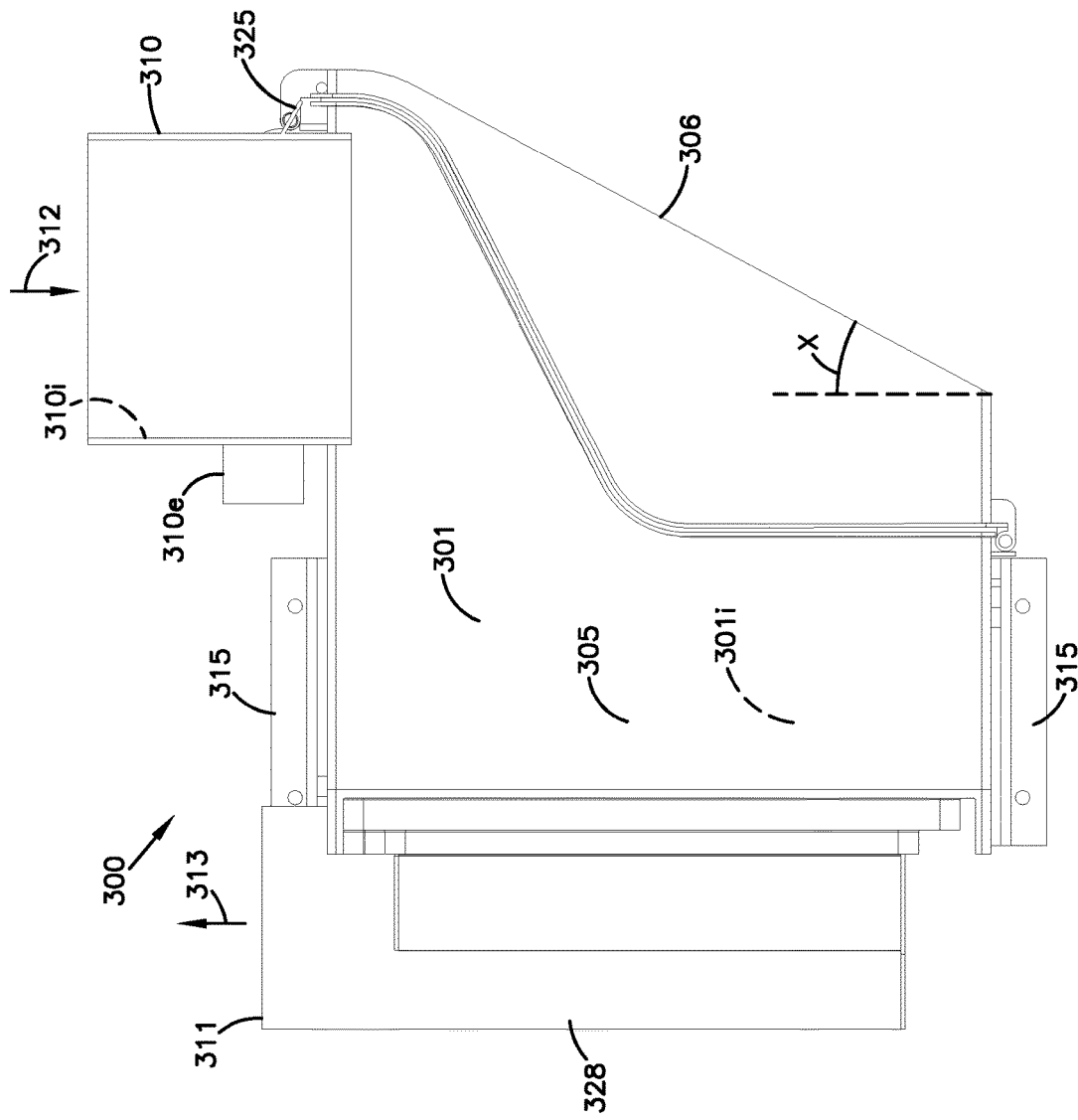
FIG. 7 is a schematic side elevational view of an air cleaner assembly according to the present disclosure.

Referring first to FIG. 7, at 300 an air cleaner assembly is depicted. The air cleaner assembly 300 includes a housing 301 and an internally received, removable and replaceable, primary filter cartridge 302, not viewable in FIG. 7, see FIG. 8 discussed below.

It is noted that the air cleaner assembly 300 may include an optional secondary or safety filter cartridge positioned therein as well, as discussed below.

Referring still to FIG. 7, housing 301 generally includes a housing body 305 and an openable access cover 306. The access cover 306 is openable with respect to housing body 305, to allow service access to an interior 301i, of housing 301, and filter cartridge 302 positioned therein.

Still referring to FIG. 7, housing 305 includes an air flow inlet arrangement 310 and an air flow outlet arrangement 311.

In general terms, air to be filtered is directed into air cleaner assembly 300, in the direction indicated by inlet arrow 312. Within the air cleaner assembly 301, air is passed through a filter cartridge 302, with filtering. Filtered air is then directed into air flow outlet arrangement 311, and for the particular air cleaner assembly 300 depicted, the filtered air exits the air cleaner assembly 300 in the general direction of arrow 313.

Thus, for the particular example assembly 300 depicted, the housing 301 is configured so that air flow, when viewed from the side, moves in a generally u-shaped orientation; i.e. it enters the housing 301 by being directed downwardly; it is directed laterally as it moves through an interiorly received cartridge 302; and, upon exiting the housing 301 filtered air is directed in the direction of arrow 313 in a direction generally opposite to that from which it entered housing 301.

It is noted that the inlet arrangement 310 can be provided with a precleaner arrangement therein, for example in the form of a plurality of separator tubes, for example of the type as referenced generally in U.S. Ser. No. 61/130,790 filed Jun. 2, 2008 and/or as described more specifically in WO 03/084641 published Oct. 16, 2003, U.S. Pat. No. 4,242,115 or U.S. Pat. No. 4,746,340, each of which is incorporated herein by reference. An array of such tube arrangements can optionally be positioned within an interior 310i of inlet 310. Further, for operation of such an arrangement, scavenge exit 310e can be provided in the inlet arrangement 310, to be attached to a scavenge duct system, i.e. vacuum draw. It is noted that herein housing 301 is depicted in the absence of such a precleaner, but configured for such a precleaner if optionally used.

Referring to FIG. 7, it is noted that housing 301 includes mounting brackets 315 thereon, for mounting air cleaner housing 301 on equipment with which the housing 300 is to be used, for example a tractor. It is noted that brackets 315 are mounted on the housing body 305, to allow for selected movement of the access cover 306 during a typical servicing operation.

Still referring to FIG. 7, it is noted that an inlet baffle or duct may be provided in engagement with inlet 310, to direct intake air to the air cleaner assembly 300. Further, outlet duct work may be secured to outlet 311 to direct filtered air to appropriate downstream componentry, for example ultimately to a combustion air intake for a engine of a vehicle or other equipment on which the air cleaner assembly 300 is used.

Figure 8:
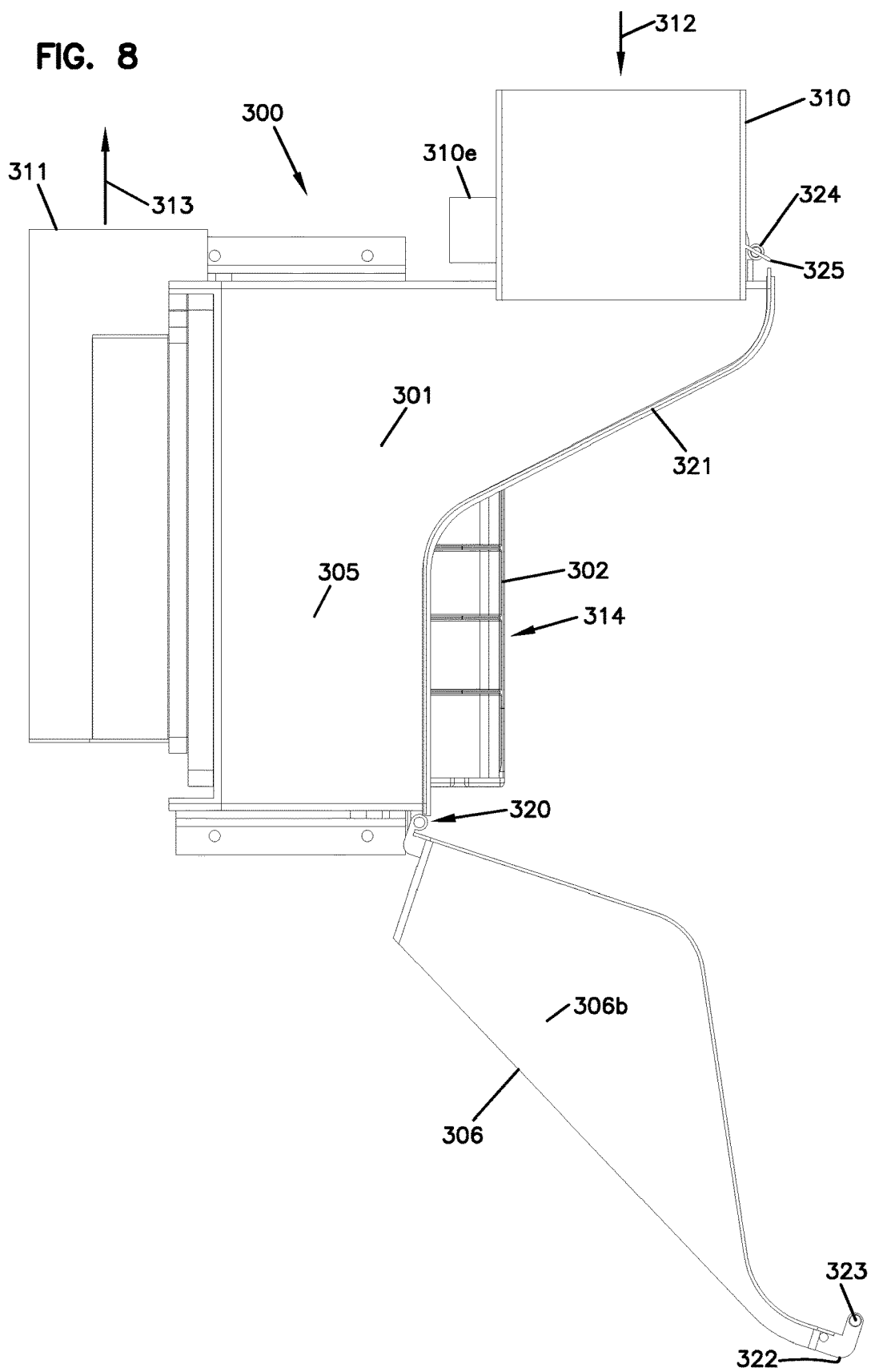
FIG. 8 is a schematic side elevational view of the air cleaner assembly of FIG. 7, depicted with an access cover opened, for service access to an interior of the air cleaner assembly.

Attention is now directed to FIG. 8, a view analogous to FIG. 7, but depicted with access cover 306 configured in an open position, rather than in the closed position of FIG. 7. In particular, access cover 306 has been pivoted around pivot 320, i.e. downward, to open end 321 of body 305, for service access to cartridge 302.

Still referring to FIG. 8, arrow 314 is positioned to indicate the general direction of flow of air to be filtered, into cartridge 302.

It is noted that pivot 320 can be a hinge capable of disconnection, or, alternatively, a hinge incapable of disconnection, as desired.

Generally, end 322 of access cover 306 provides for an upper closure latch. In the example air cleaner assembly 300 depicted, end 322 includes a tube section 323, which mates with a tube section 324 on the housing body 305. A release rod 325 can be projected through the tube sections 323, 324, to secure the housing 301 closed; which rod, when removed, allows access cover 306 to pivot around pivot 320 and thus open. The release rod can be provided with a handle on one end, and a key or similar construction removably positioned on an opposite end, if desired. A variety of alternate closure arrangements can be used.

Still referring to FIG. 8, it is noted that the access cover 306 can be raised or lowered once the air cleaner assembly 300 is mounted in place by brackets 315, since the brackets 315 are positioned on the housing body 305, which does not need to move as the access cover 306 is opened and closed.

Figure 9:
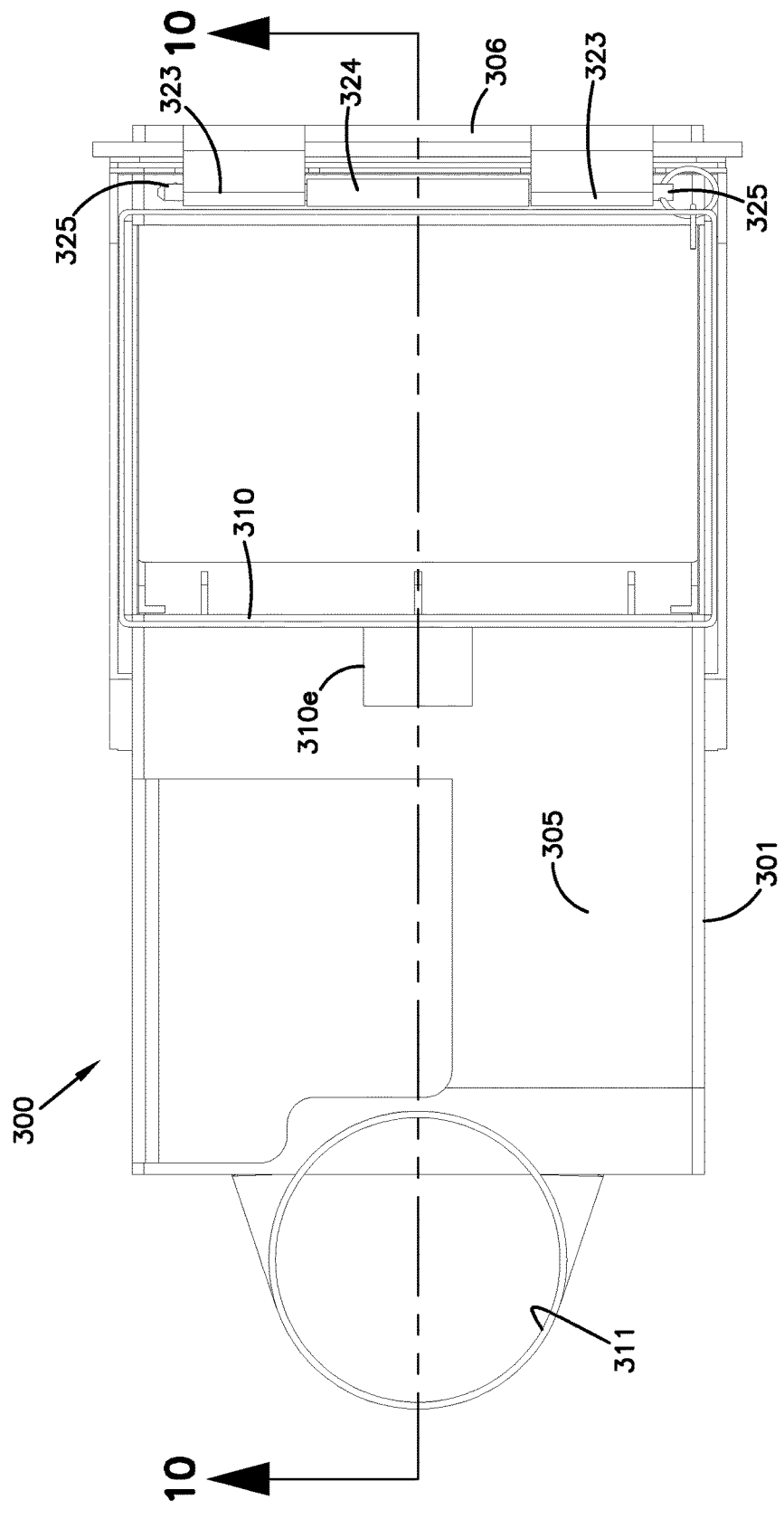
FIG. 9 is a schematic top plan view of the air cleaner assembly of FIG. 7.

In FIG. 9, a schematic top plan view of the assembly 300 is depicted. Here rod 325, for operation to close access cover 306, is viewable projecting through tube sections 323 and 324.

In FIG. 9, a cross-section line 10-10, is provided to identify the cross-sections of FIGS. 10 and 16 as discussed further below.

Figure 13:
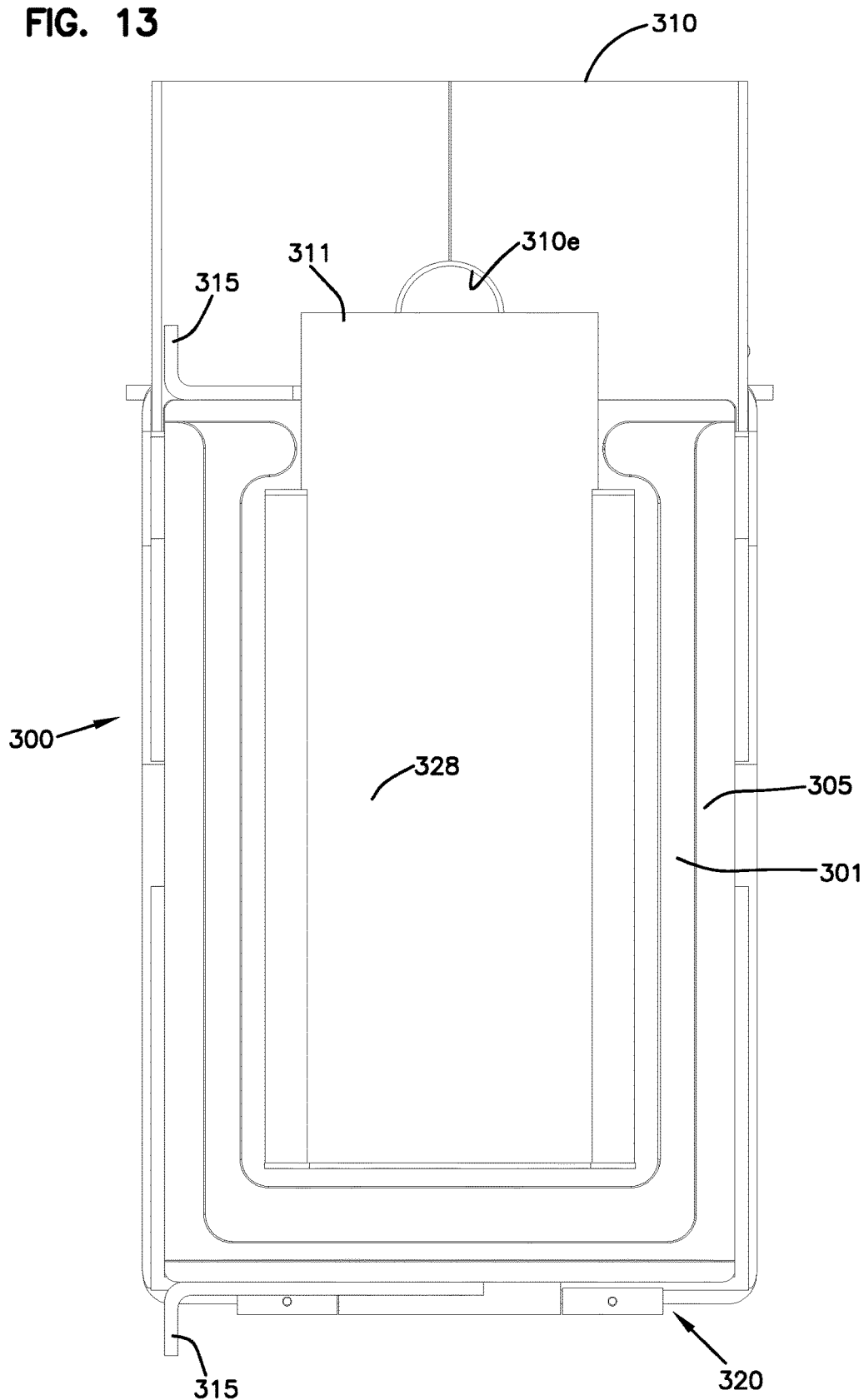
FIG. 13 is a schematic outlet end elevational view of the air cleaner assembly of FIG. 7.
Figure 14:
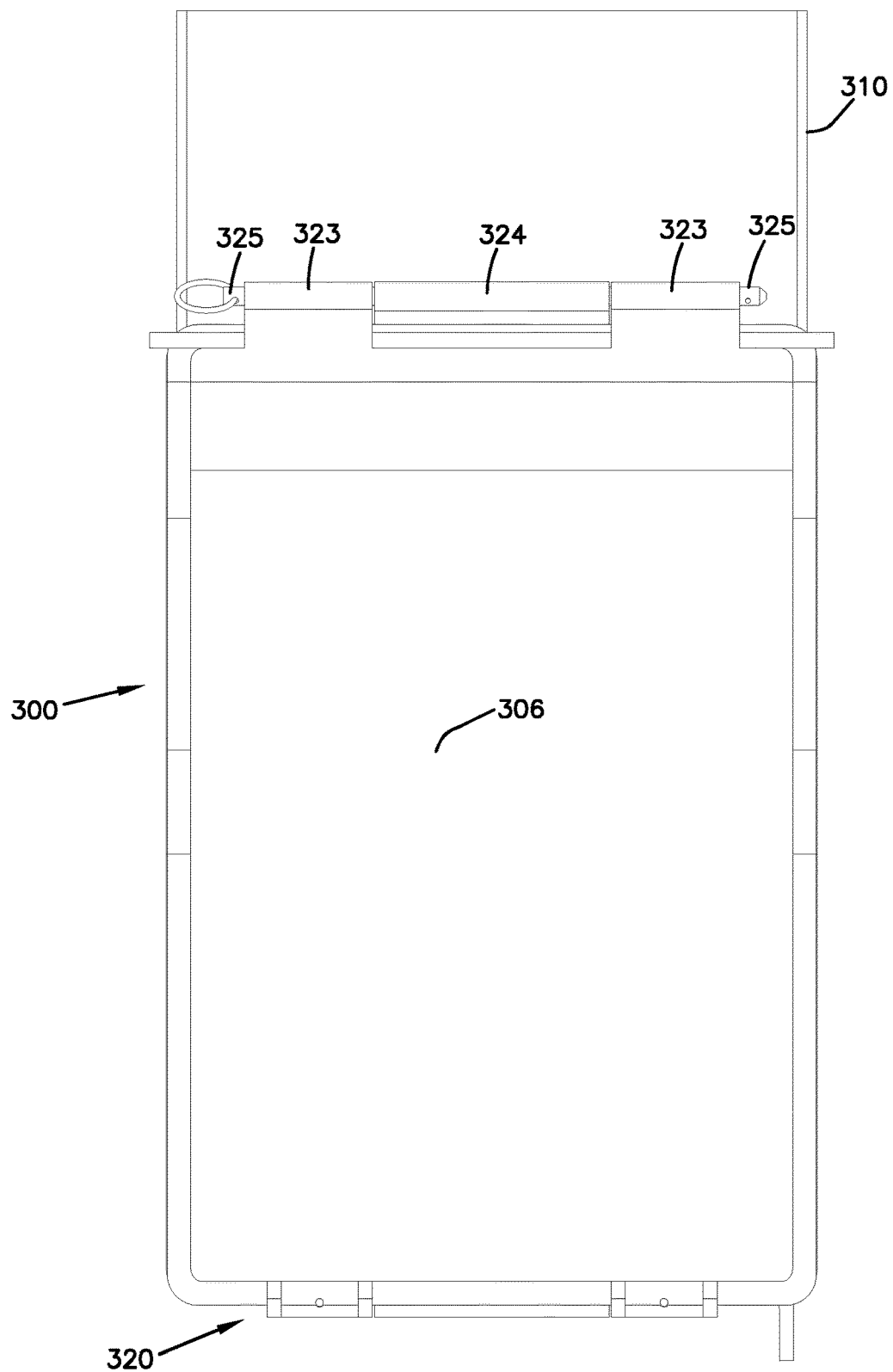
FIG. 14 is a schematic access cover end elevational view of the air cleaner assembly of FIG. 7.
Figure 15:
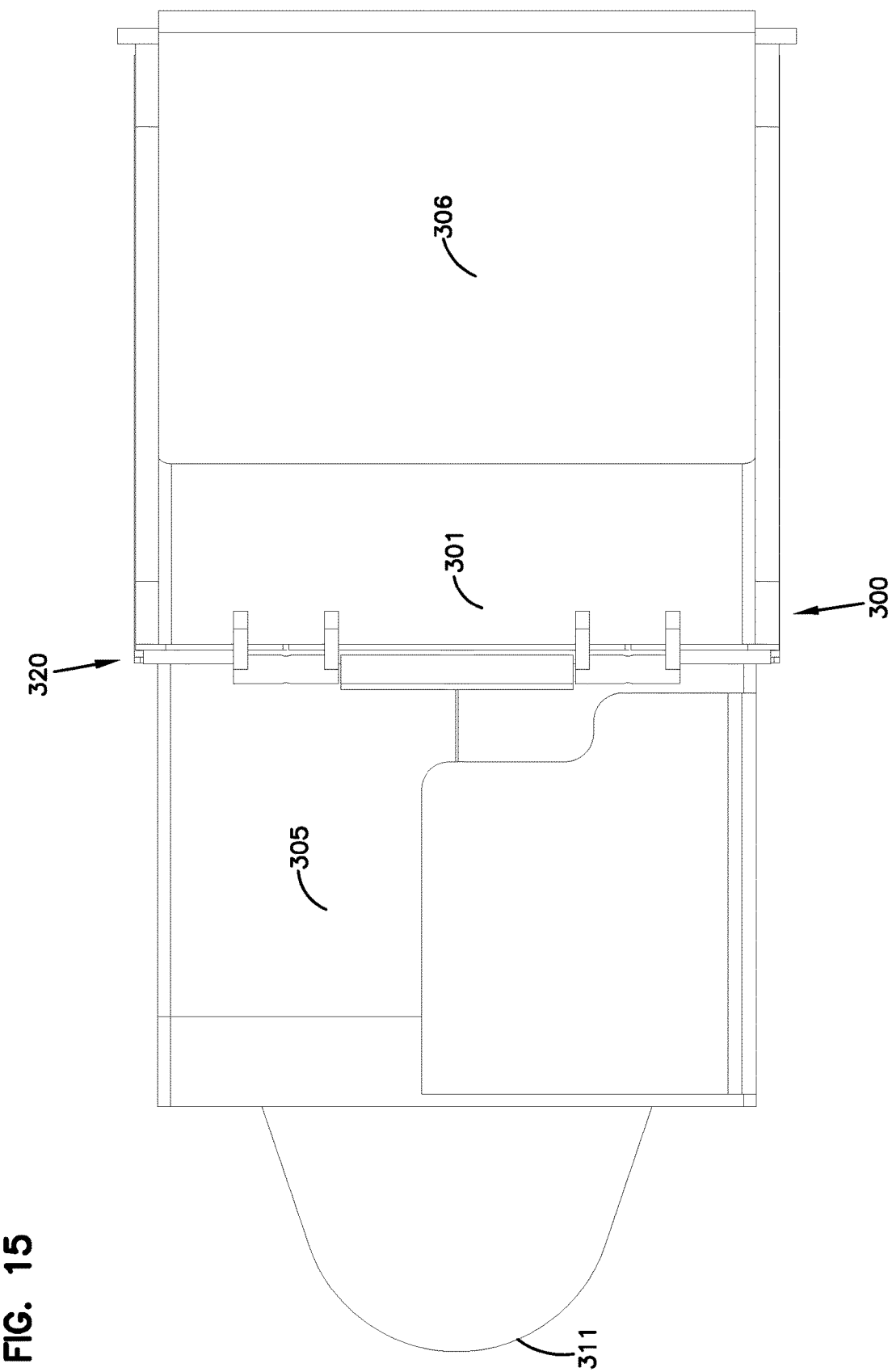
FIG. 15 is a schematic bottom plan view of the air cleaner assembly of FIG. 7.

In FIG. 14, an end elevational view directed toward access cover 306 is provided. Again, control rod 325 is viewable, for access cover 306. In FIG. 15, a bottom plan view of air cleaner assembly 300 is provided. In FIG. 13, and end view toward an opposite end from FIG. 14, i.e. toward outlet 311 is provided.

Referring to FIGS. 9 and 13, it is noted that in general outlet 311 includes an elongate and generally circular tube section 328 extending vertically along an end of housing body 305. Alternative shapes and direction of flow are possible.

Figure 10:
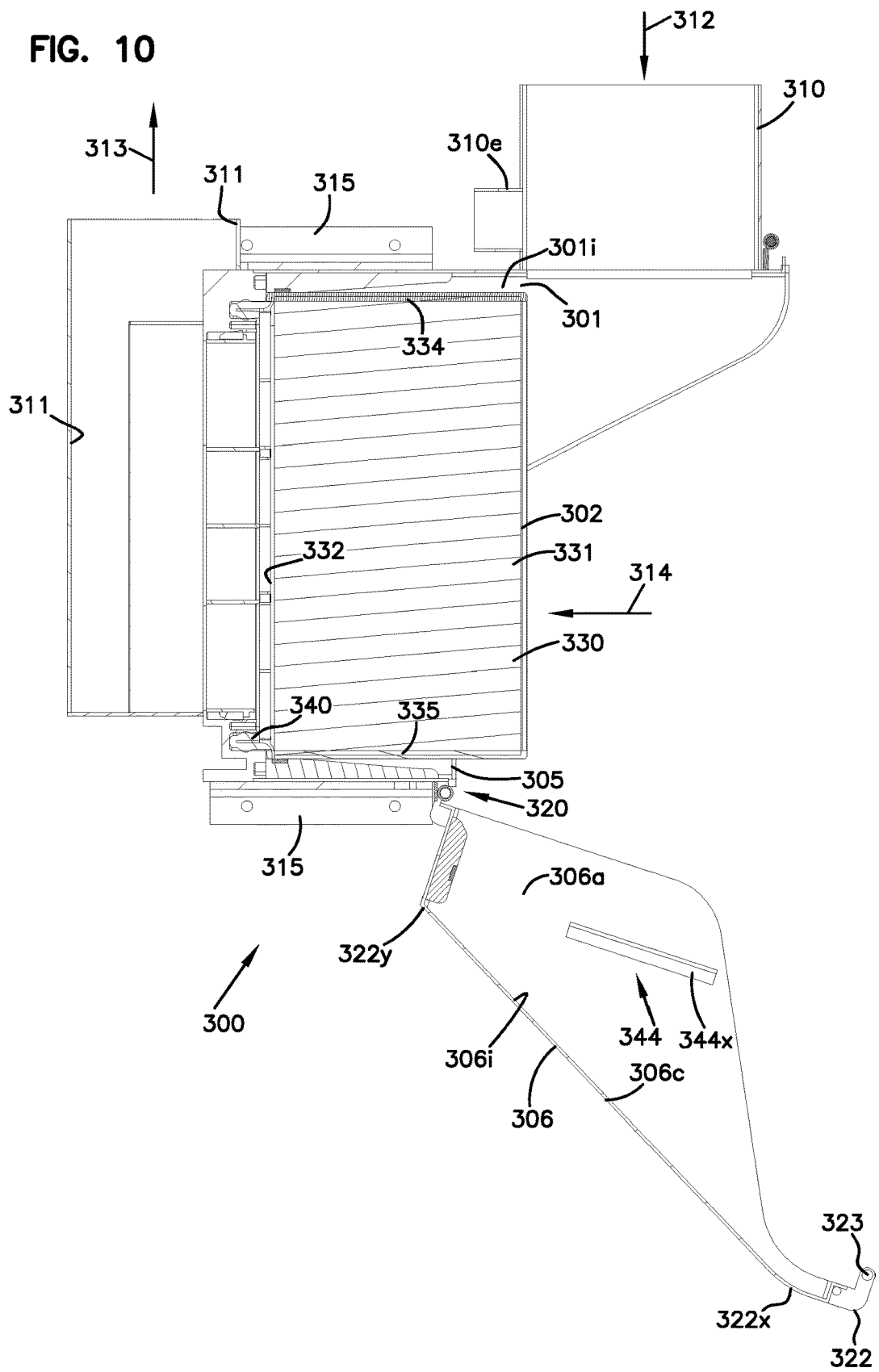
FIG. 10 is a schematic cross-sectional view taken generally along line 10-10, FIG. 9, but depicting an access cover opened for service access to an interior of the assembly.

Attention is now directed to FIG. 10, a schematic cross-sectional view defined generally by line 10-10, FIG. 9, but depicting the air cleaner assembly 300 with the access cover 306 open, i.e. in a lowered orientation. In general terms, the access cover 306 can be characterized as having an open orientation, FIG. 10, and a closed orientation, FIG. 7. Further it can be characterized as having a raised orientation, FIG. 7, i.e. corresponding to the closed orientation; and, a lowered orientation, FIG. 10, i.e. corresponding to the open orientation.

Referring to FIG. 10, interior 301i of housing 301 can be viewed as having, operably (and removably) positioned therein, cartridge 302. Cartridge 302 comprises a media pack 330 having an inlet flow face 331, and opposite outlet flow face 332. In general terms, the media pack 330 comprises flutes extending in a direction between opposite inlet and outlet flow faces 331, 332, and sealed appropriately to cause air entering face 331 to pass through media, before exiting face 332. Typically, the media pack 330 will comprise strips of media, the strips generally comprising single facer strips of fluted media secured to facing media, as previously described in connection with FIGS. 1-6, for example. The particular example media pack 330 depicted comprises a blocked configuration of stacked strips. Referring to FIG. 10, the strips generally extend between ends 334, 335, with the flutes extending generally in a direction between flow faces 331, 332.

The cartridge 302 also generally includes, secured to the media pack 330, a housing seal arrangement 340. The housing seal arrangement 340 is discussed in greater detail below, and provides for a sealing arrangement between the cartridge 302 and the housing 301, when cartridge 302 is operably installed within the housing 301. The housing seal arrangement 340, then, generally helps to provide that unfiltered air entering the air cleaner assembly 300 in the direction of arrow 312, FIG. 10, does not reach outlet arrangement 311 without passing through media of the media pack 330, with filtering.

Figure 18:
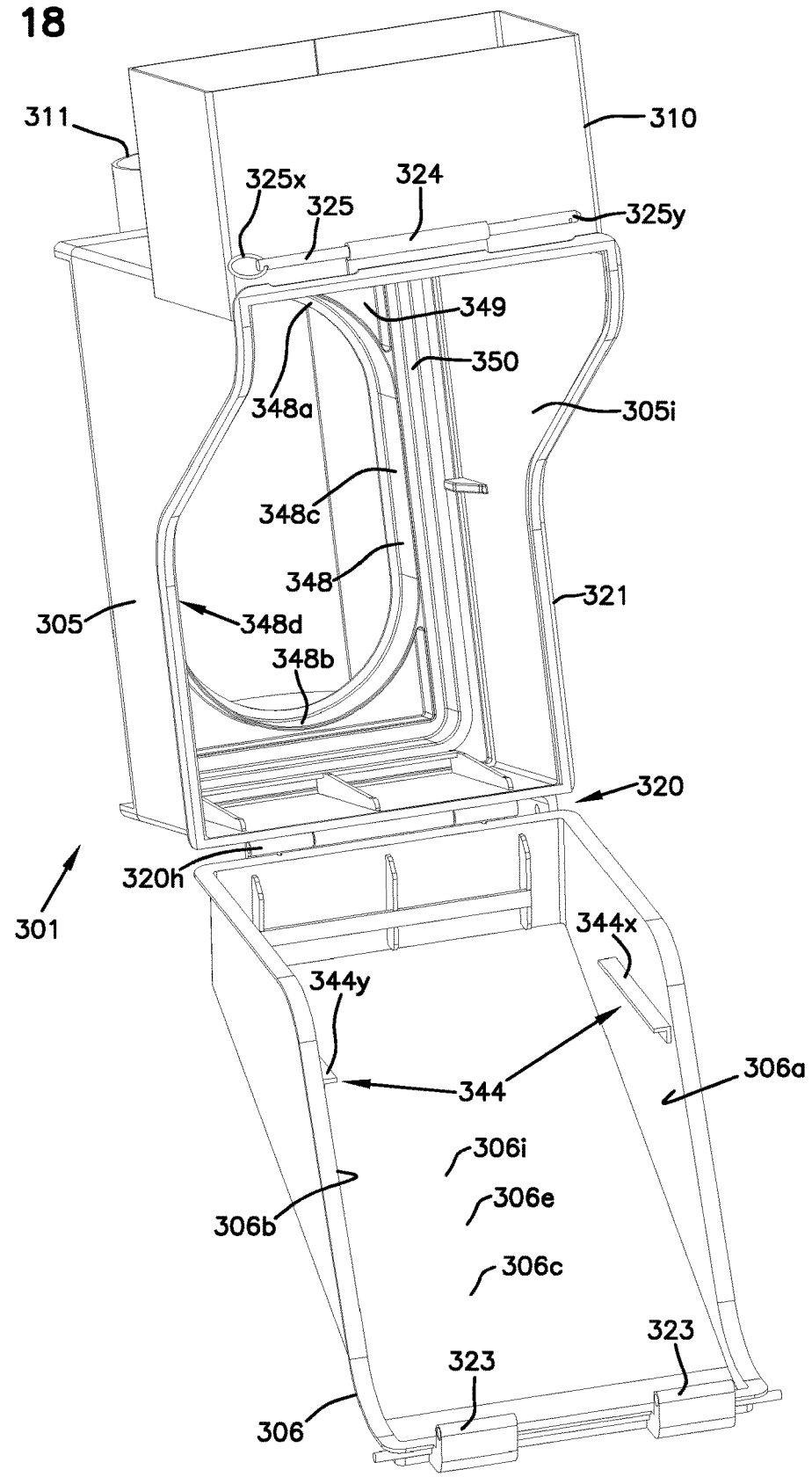
FIG. 18 is a schematic perspective view of the housing of FIG. 17, depicted generally toward an interior thereof.

Still referring to FIG. 10, it is important to inhibit cartridge 302 from backing out of its sealed orientation, FIG. 10, once installed. To provide for this, the access cover 306 is provided, on an interior 306i thereof, with lock arrangement 344, in the example shown comprising a pair of oppositely positioned projections 344x, 344y one of which (344x) is positioned on side 306a of access cover 306, as viewable in FIG. 10. It is noted that on opposite side 306b, FIG. 18, is provided an analogous projection 344y. Projection arrangement 344 is configured to overlap and block cartridge 302 from moving in a direction opposite arrow 314, FIG. 10, when access cover 306 is in the closed orientation of FIG. 7.

Referring to FIG. 10, it is noted as the air enters inlet 311 in the general direction of arrow 312, it will need to make a turn in order to enter the cartridge 302 in the general direction of arrow 314. To facilitate turning of the air, while providing good flow distribution across inlet face 331, end face or wall 306c of access cover 306, overlapping cartridge face 331, is configured to slant inwardly in a general direction from upper end section 322x toward lower end 322y. The slant is generally shown in FIG. 7 at angle X. The angle X of slant region 306c, (which is a portion extending between the sides 306a, 306b) is, typically, relative to the face 331 of media pack 302, an acute angle of at least 15°, and not more than 40°, usually within the range of 20°-35°.

Figure 11:
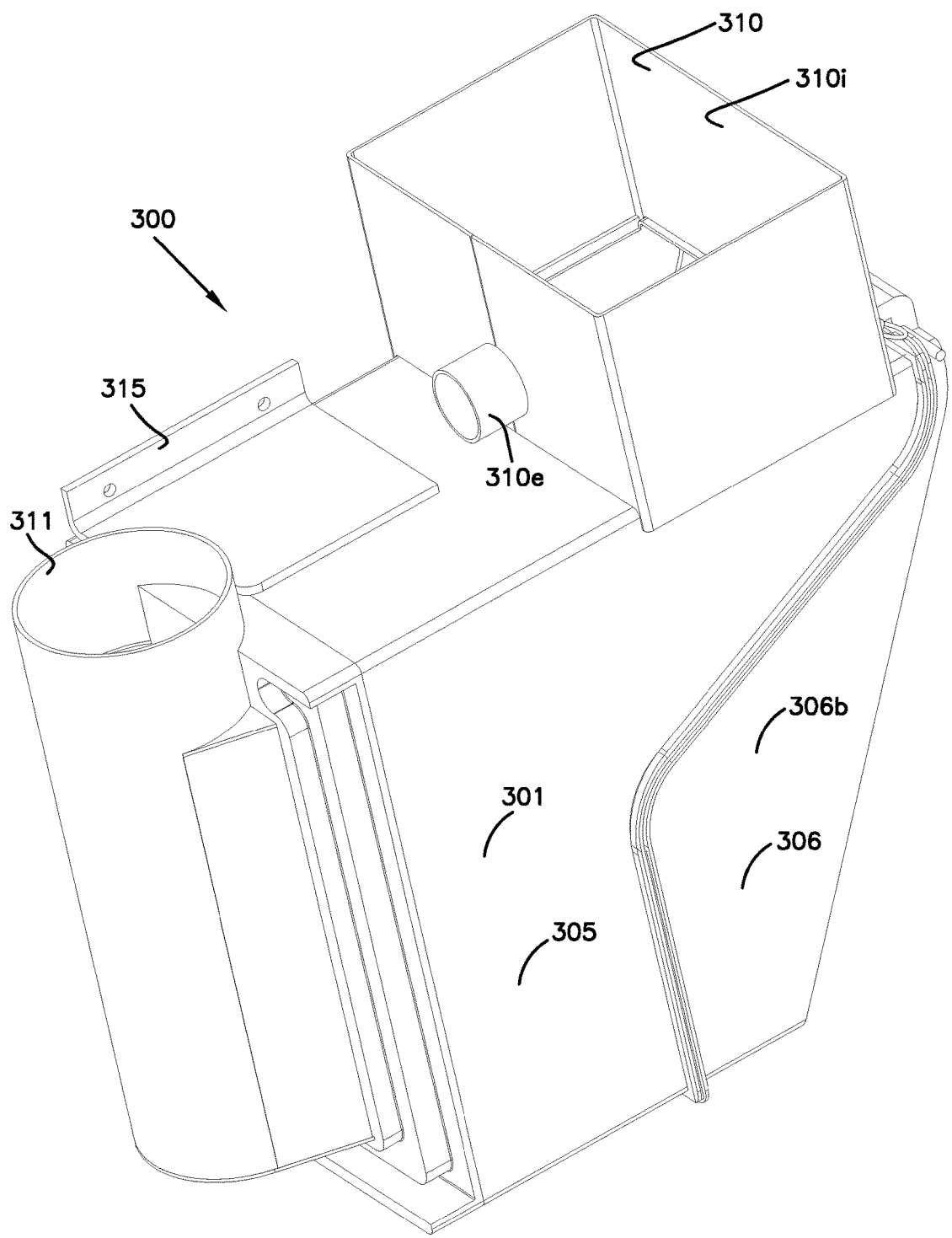
FIG. 11 is a schematic, top, outlet end, perspective view of the air cleaner assembly of FIG. 7.

Attention is now directed to FIG. 11, a top, outlet end, perspective view of air cleaner assembly 300. It can be seen that an interior 310i of inlet arrangement 311 is shown devoid of a precleaner arrangement, comprising a plurality of separator tubes. However, an array of separator tubes, for example, as previously referenced, can be positioned in interior 310i, if desired.

Figure 12:
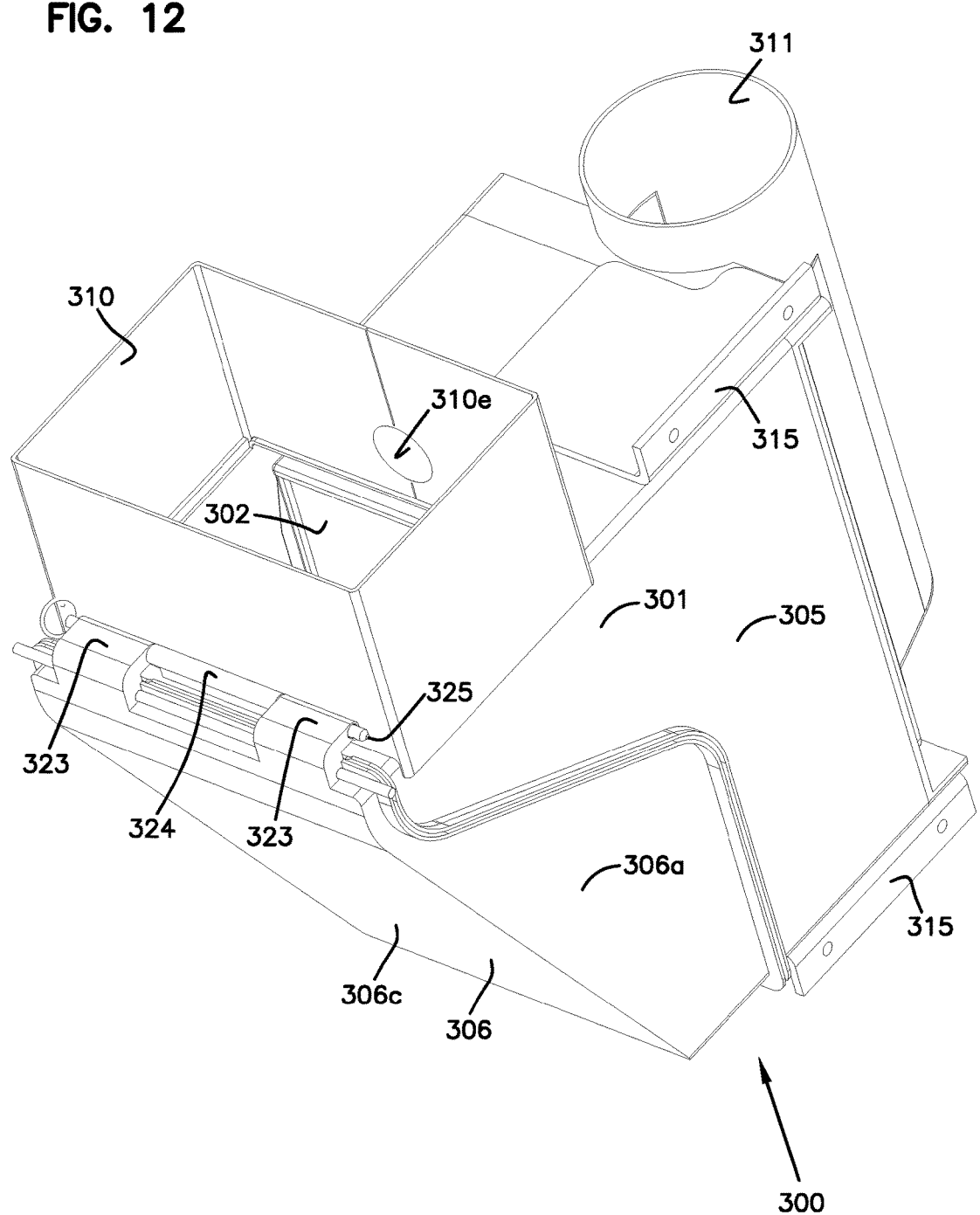
FIG. 12 is a schematic, top, inlet end, perspective view of the air cleaner assembly of FIG. 7.

In FIG. 12, an access cover end perspective view of air cleaner assembly 300 is provided.

It is noted that the air cleaner assembly 300 can be configured to be manufactured from sheet metal components, as generally indicated in the example depictions of FIGS. 7-12. It is also noted that the housing 301 and access cover 306 can alternatively be configured as molded plastic components. When the housing comprises molded plastic components, some shape variation may be desirable.

It is noted that many of the features characterized herein, with respect to the seal arrangement on filter cartridge 302, discussed below, were developed to accommodate variability in seal surfaces, when relatively long seals surfaces are needed, especially in a molded plastic housing. This is discussed further below. An issue for observation, then, is that the metal housing depicted in FIG. 7, is used as an example to indicate general features. It is anticipated that in a commercial product, the housing will be made from molded plastic components.

Figure 16:
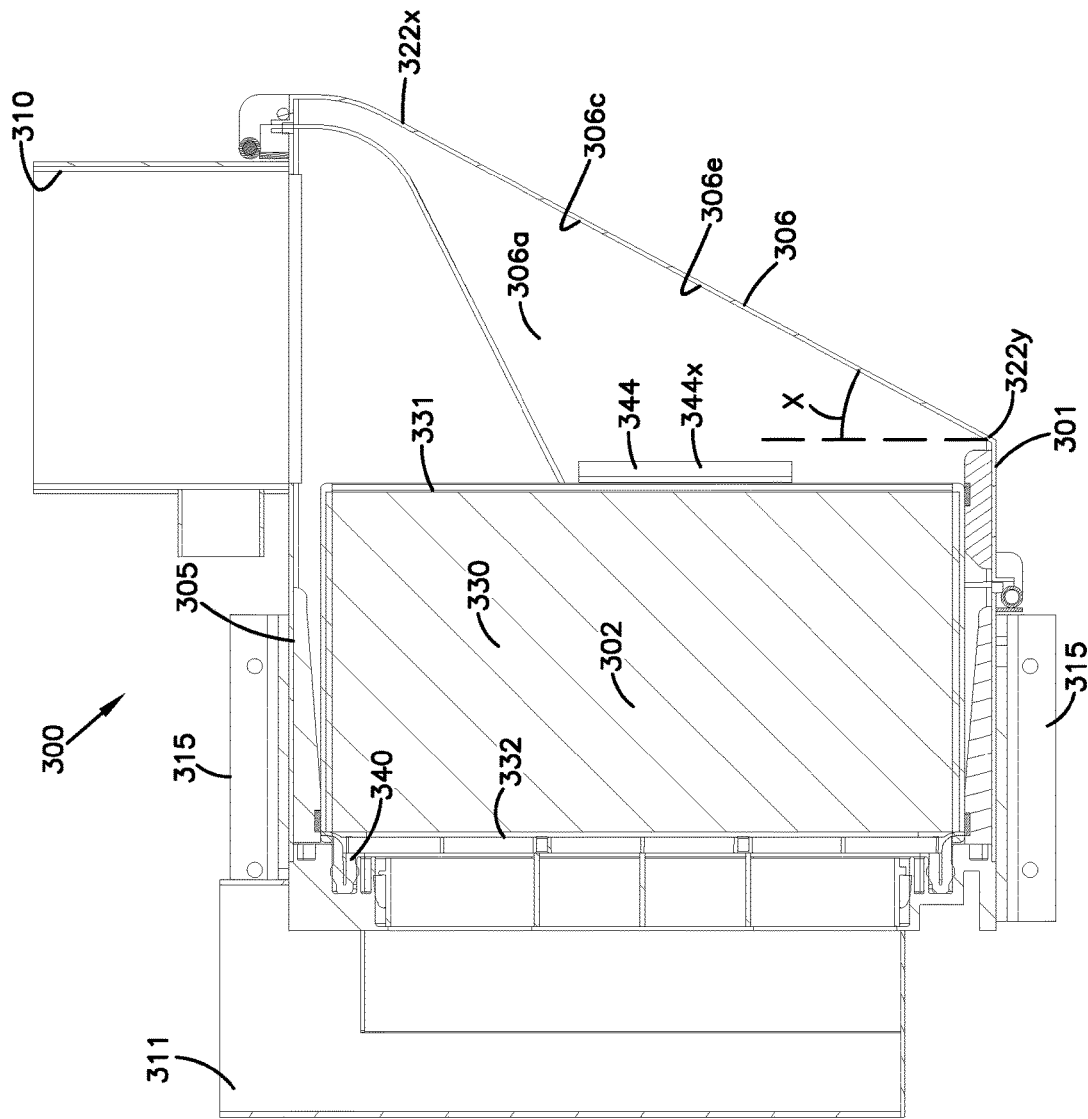
FIG. 16 is a schematic cross-sectional view taken generally along line 10-10, FIG. 7.

In FIG. 16, a cross-sectional view taken along line 10-10, FIG. 9, but depicted with access cover 306 closed is shown. Here an interior surface 306e can be seen, slanting inwardly at the identified angle X, in extension from end 322y and end 322x. Cartridge 302 is viewable, secured in place by projection arrangement 344.

Figure 17:
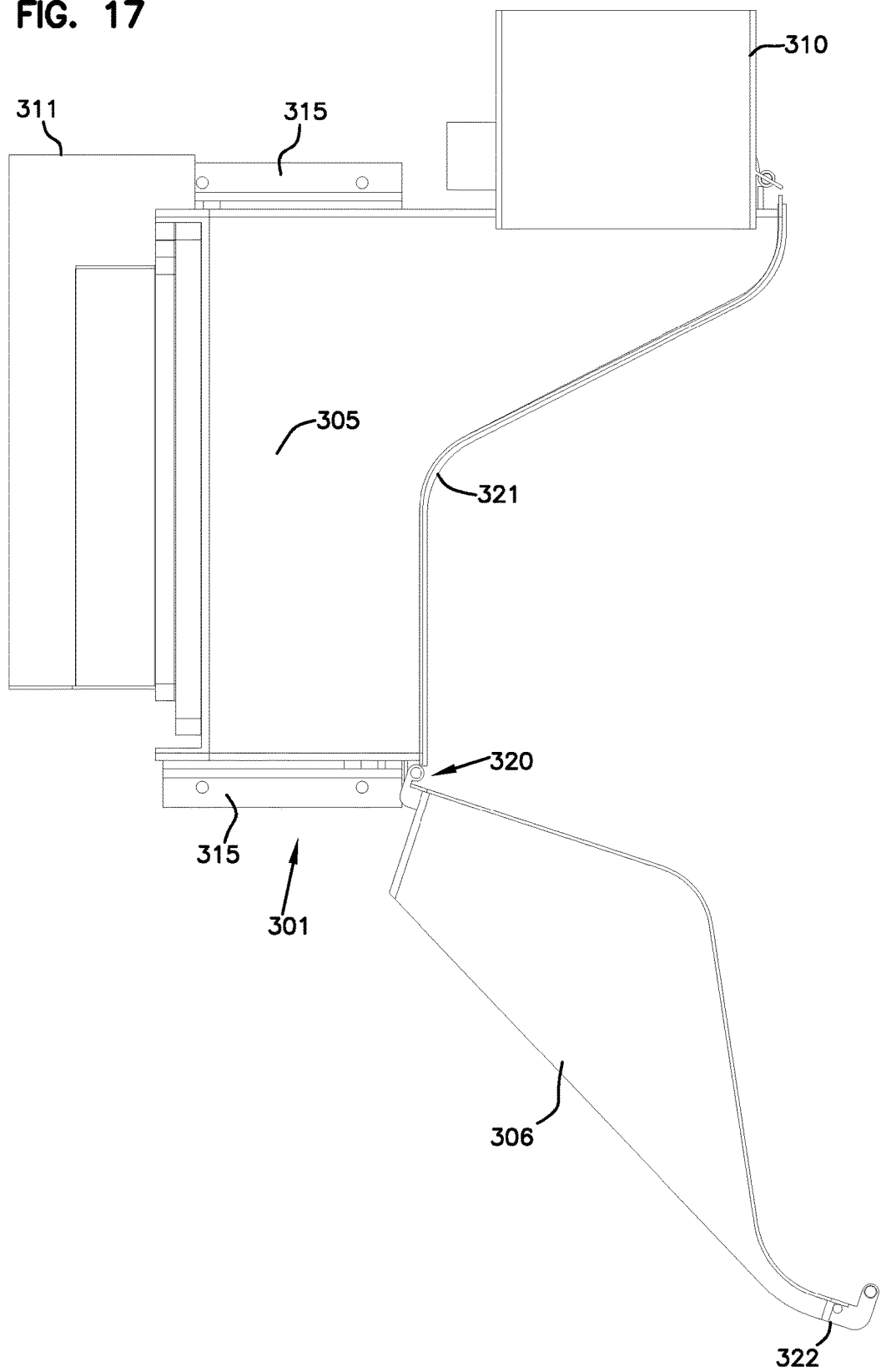
FIG. 17 is a schematic side elevational view of a housing component of the air cleaner of FIG. 7, with an access cover depicted in an open orientation.

In FIG. 17, a side elevational view of housing 301 is provided, with access cover 306 open, and with cartridge 302, FIGS. 10 and 16 removed.

Attention is now directed to FIG. 18. FIG. 18 is a view of housing 301 with cartridge 302, FIG. 16, removed. The view of FIG. 18 is with access cover 306 lowered or open relative to housing body 305. Further, the view is directed toward interior 305i of housing body 305, and interior 306i access cover 306.

Referring first to the access cover 306, the opposite sides 306a, 306b and end wall 306c can be viewed. On the opposite sides 306a, 306b, projection members 344x 344y, respectively, of lock arrangement 344 are viewable. It can be seen that these projections 344x 344y will overlap an end of an installed cartridge (302 of FIG. 16), when a cartridge 302 is installed, as cover 306 is moved to a closed position. This will prevent the cartridge 302 from moving out of the sealed orientation, within housing body 305i.

Still referring to FIG. 18, at 320 the pivot connection 320 between the access cover 306 and the housing body 305 is viewable as a hinge 320h.

Referring to FIG. 18, it is noted that rod 325 is shown positioned directed through tube section 324. Normally, to open housing body 301, rod 325 would be withdrawn through tube sections 323, 324. In this instance, the rod 325 has been repositioned in tube section 324 after an initial withdrawal to allow for opening. For FIG. 18, end ring 325x, on one end of rod 325 is viewable, for easy grasping. Key aperture 325y is viewable at an opposite end, for receipt of a key therethrough, to lock rod 325 in place.

In FIG. 18, as indicated above, portions of interior 305i of housing section 305 are viewable. For example, outlet aperture 348, allowing air flow between interior 305i and outlet arrangement 311 is viewable in end wall 349 of housing body 305, opposite edge 321 and, when closed, opposite access cover inner wall 306c. For the particular example depicted, the outlet aperture 348 has an oval shape, with opposite curved ends 348a, 348b, and sides 348c, 348d extending therebetween. For the example depicted, opposite sides 348c 348d each have a central straight section.

The particular housing body 305 depicted, includes a seal groove 350 in end wall 349, defining a perimeter groove around outlet aperture 348. The particular seal groove 350 depicted is generally rectangular in perimeter definition, although alternative shapes are possible. Detail regarding the seal groove 350 is provided further below. In general, the seal groove 350 is configured to receive, projecting therein, a housing seal member on cartridge 302, with the housing seal member on cartridge 302 sealed within the groove 350, to provide a housing seal between a cartridge 302 and the housing body 305.

B. General Features of the Cartridge 302

Before seal engagement between the cartridge 302 and the housing 301, (in particular by engagement of a housing seal arrangement 340 of the cartridge 302 with sealing groove 350 and housing body 305), are described in detail, general features of the cartridge 302 are discussed.

Figure 19:
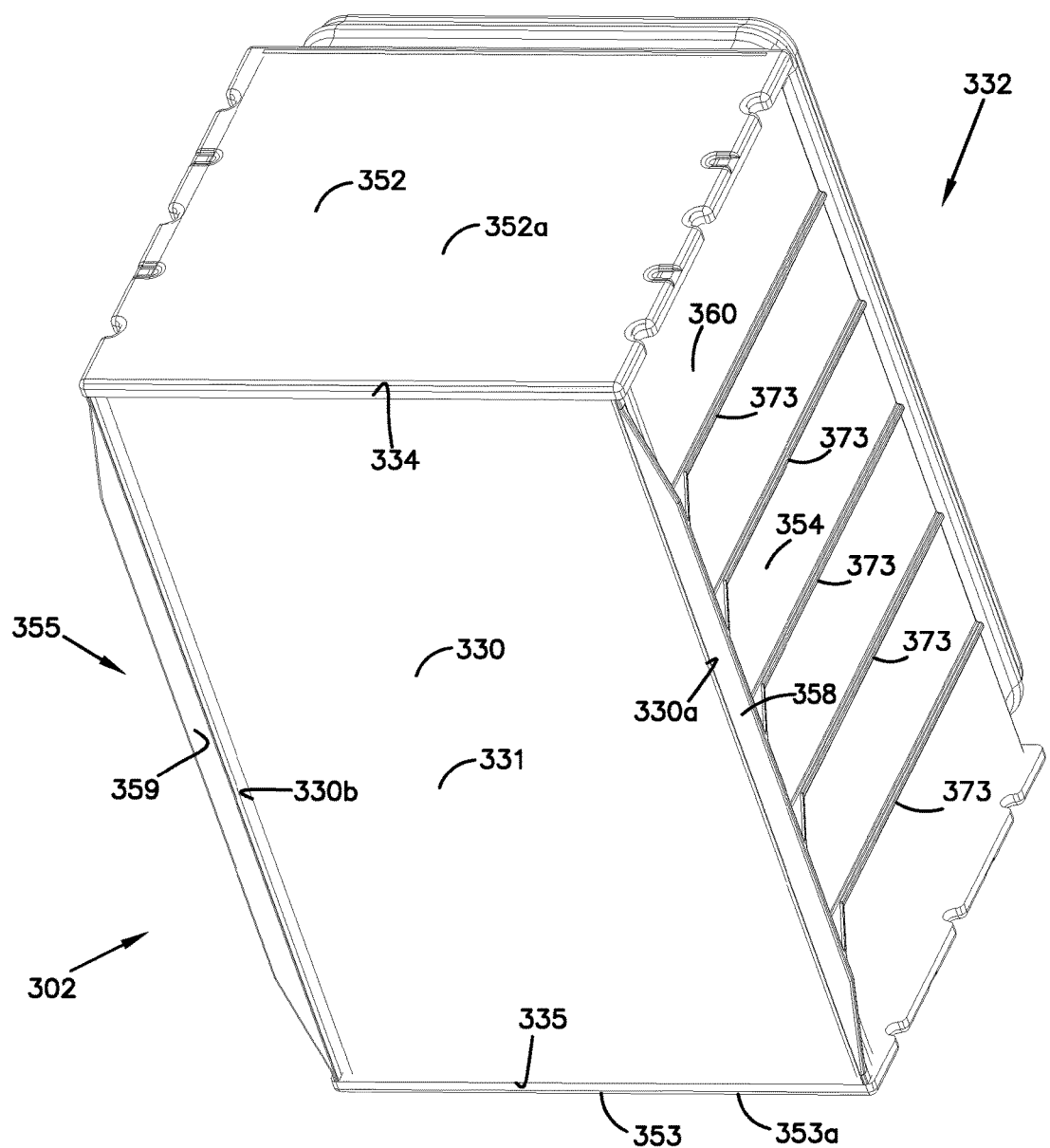
FIG. 19 is a schematic, inlet end, perspective view of a filter cartridge component of the air cleaner assembly of FIG. 7.
Figure 20:
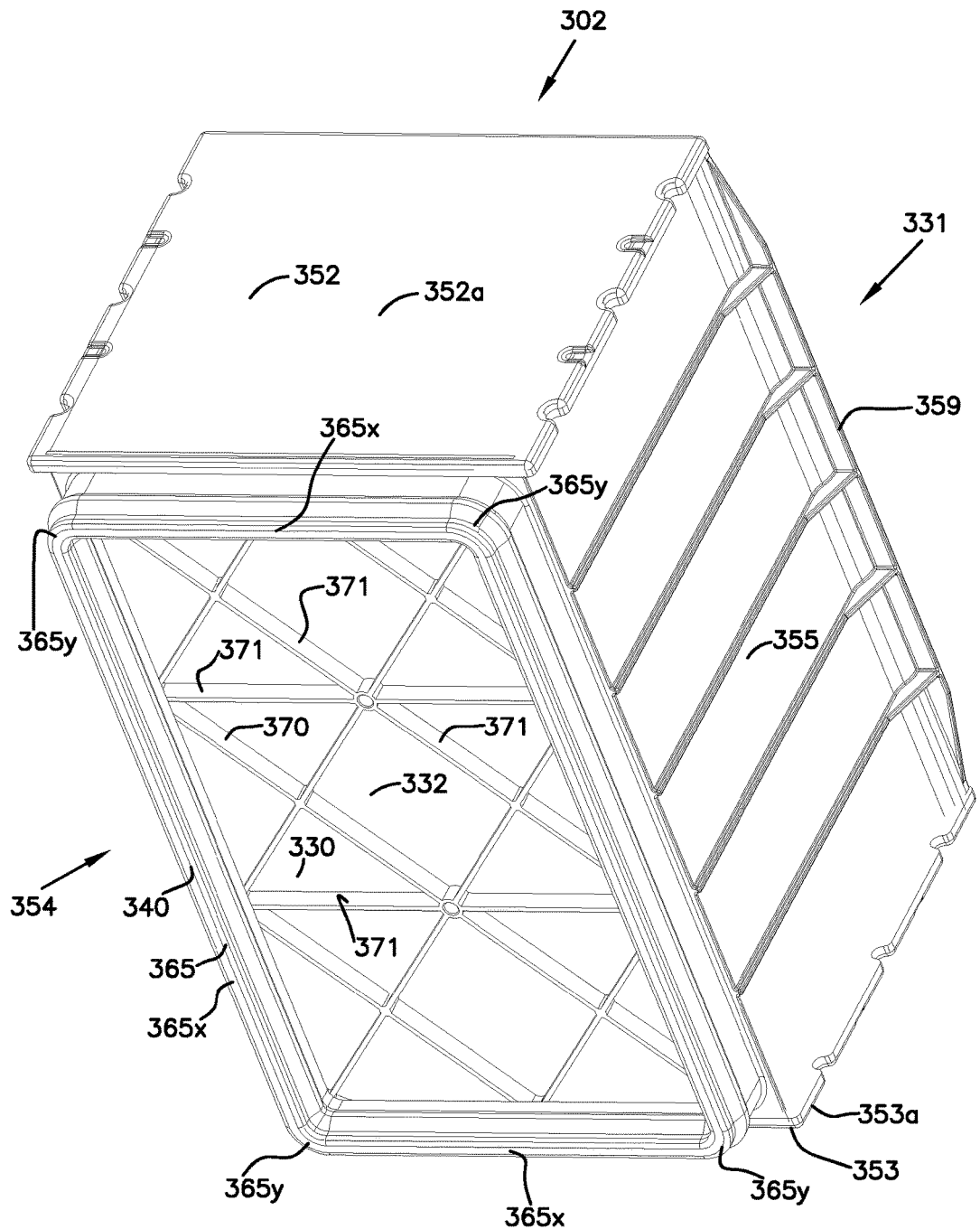
FIG. 20 is a schematic, outlet end, perspective view of the filter cartridge of FIG. 19.

Attention is first directed to FIGS. 19 and 20, in which the cartridge 302 is viewed in perspective view.

Attention is first directed to FIG. 19. FIG. 19 is an inlet flow face perspective view of the cartridge 302. As previously characterized, the cartridge 302 includes a media pack 330 defining an inlet flow face 331 and opposite outlet flow face 332. Also, as previously characterized, the media pack 340 generally comprises flutes extending in the direction between the flow faces 331, 332. The particular media pack 330, comprises strips of fluted media secured to facing media (generally characterized herein as single facer strips), stacked with each single facer strip in extension between ends 334 and 335. It is noted that in the cartridge depictions herein, including FIG. 19, the media pack 330 is depicted schematically, and specific details of media sheet layers (for example alternating fluted and spacing sheet layers) are not shown, nor are specific media pack flute seals specifically depicted.

Still referring to FIG. 19, the air filter cartridge 302 can be viewed as having: first and second, opposite, flow faces 331, 332; first and second, opposite, ends 352, 353; (sometimes called side ends) and, first and second, opposite, sides 354, 355. The ends 352, 353 generally correspond to, and overlap, ends 334, 335, respectively, of media pack 330. Sides 354, 355 are opposite one another, and generally extend between ends 352, 353, along opposite sides 330a, 330b, respectively, of media pack 330. The inlet and outlet flow faces 331, 332, for the media pack 330 and the cartridge 302 are the same.

Still referring to FIG. 19, ends 352, 353 comprise end covers or pieces 352a, 353a respectively. End pieces 352a, 353a are typically molded-in-place, providing for a sealing therein of ends 334, 335 of media pack 331. Typically end pieces 352a, 353a will comprise molded-in-place foamed polyurethane, as described below.

Still referring to FIG. 19, extending along the sides 354, 355, of cartridge 302, adjacent inlet face 331, are provided opposite, outwardly, laterally, extending flanges 358, 359; flange 358 extend along side 354 adjacent face 331; and, flange 359 extending along side 355 adjacent face 331. The flanges 358, 359 extend generally opposite one another, in extension away from media pack 330. Flanges 358, 359 provide for several effects. First, they facilitate removal of the cartridge 302 from the housing 301, by allowing the service provider to grab the opposite flanges 358, 359, by positioning fingers around opposite sides of the flanges 358, 359 from those viewable in FIG. 19. Secondly, flanges 358, 359 are positioned to be overlapped by the projection arrangement 344, to help secure the cartridge 302 within housing body 305, once installed. Further, flanges 358, 359 along with a portion of a shell component described below, define an outward flange gap providing for positioning of a sealant, as discussed below, during cartridge manufacture.

Still referring to FIG. 19, sides 354, 355 including flanges 358, 359, are typically portions of a shell 360, discussed below, manufactured as a preform component of the cartridge 302. By the terms "preform," "preform component" and variants thereof herein, in this context, it is meant that the shell 360 is manufactured before the cartridge 302, and is assembled with other componentry to make the cartridge 302. In contrast, the example end pieces 352a, 353a, depicted, when molded-in-place, are not preforms, but rather are formed as the cartridge 302 is being formed. It is noted that the molded-in-place end pieces 352a, 353a, secure the shell 360 in position in the cartridge 302, as discussed below.

Attention is now directed to FIG. 20. FIG. 20 is an outlet and perspective view of cartridge 302; i.e., the view is taken generally toward end 352 and outlet flow face 332. Referring to FIG. 20, housing seal arrangement 340 is viewable. The particular housing seal arrangement 340 depicted, comprises a (peripherally) rectangular seal member 365, having four straight sections 365x with rounded corners 365y. The seal member 365 is described further below, in connection with other figures. Typically, each straight section 365x of the housing seal arrangement 365 is at least 6 inches (152 mm) long, and, often, at least the longer sections are substantially longer (10 inches, i.e. 254 mm, or longer).

Still referring to FIG. 20, extending across outlet face 332, cartridge 302 includes a support grid 370. Support grid 370 generally comprises a lattice of strips 371, which, among other things, provides for downstream support to media pack 331, along outlet face 332. Typically the support grid 370 will comprise an integral portion of shell 360, and will provide some strength to the shell 360, along an end thereof.

Figure 21:
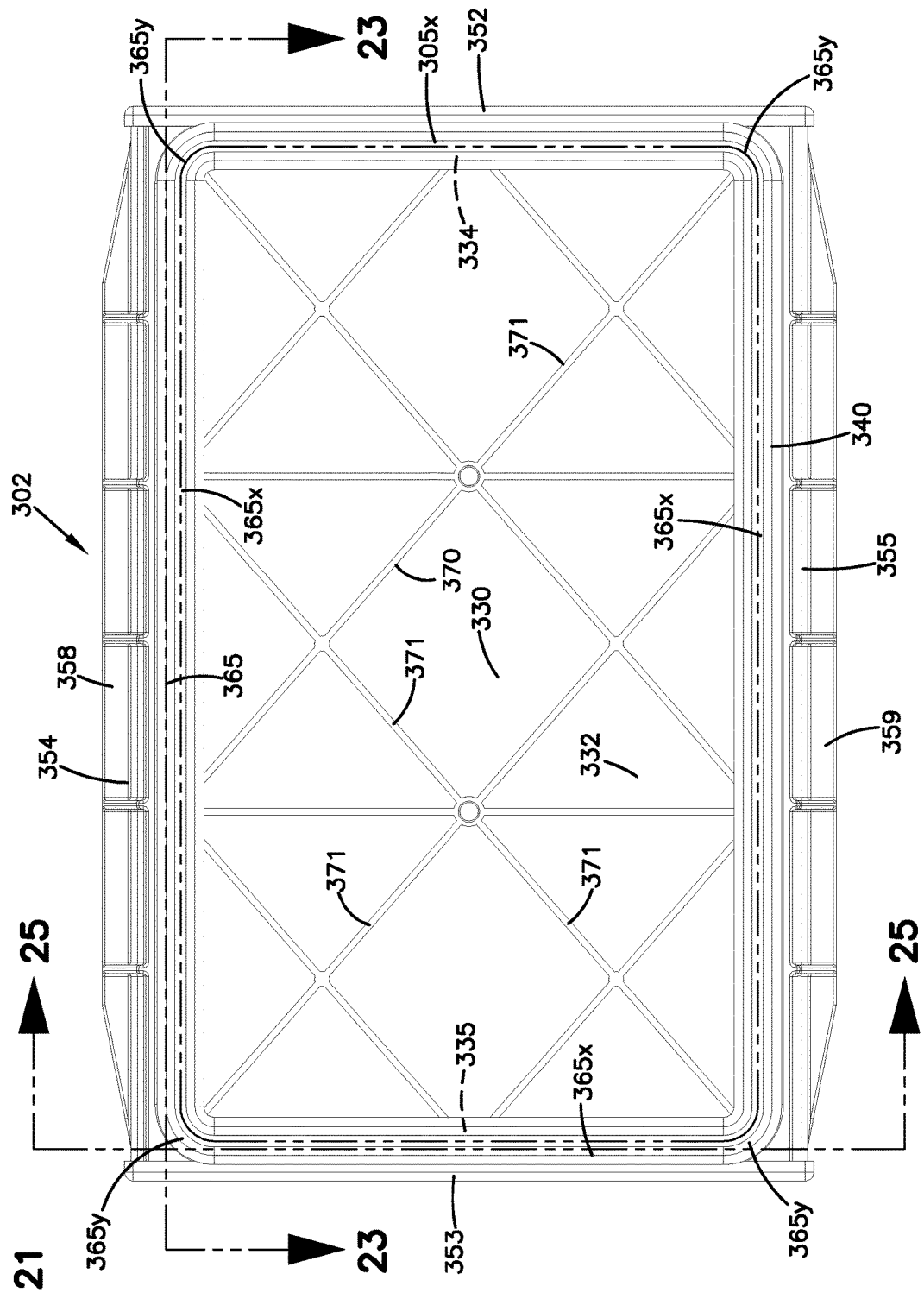
FIG. 21 is a schematic, outlet end, plan view of the filter cartridge of FIGS. 19 and 20.

Attention is now directed to FIG. 21. FIG. 21 is an outlet end plan view of cartridge 302. The view is generally taken towards support grid 370. Opposite flanges 358, 359 are viewable. The rectangular shape (four straight sides 365x with rounded corners 365y) to seal member 365 can be viewed.

Figure 22:
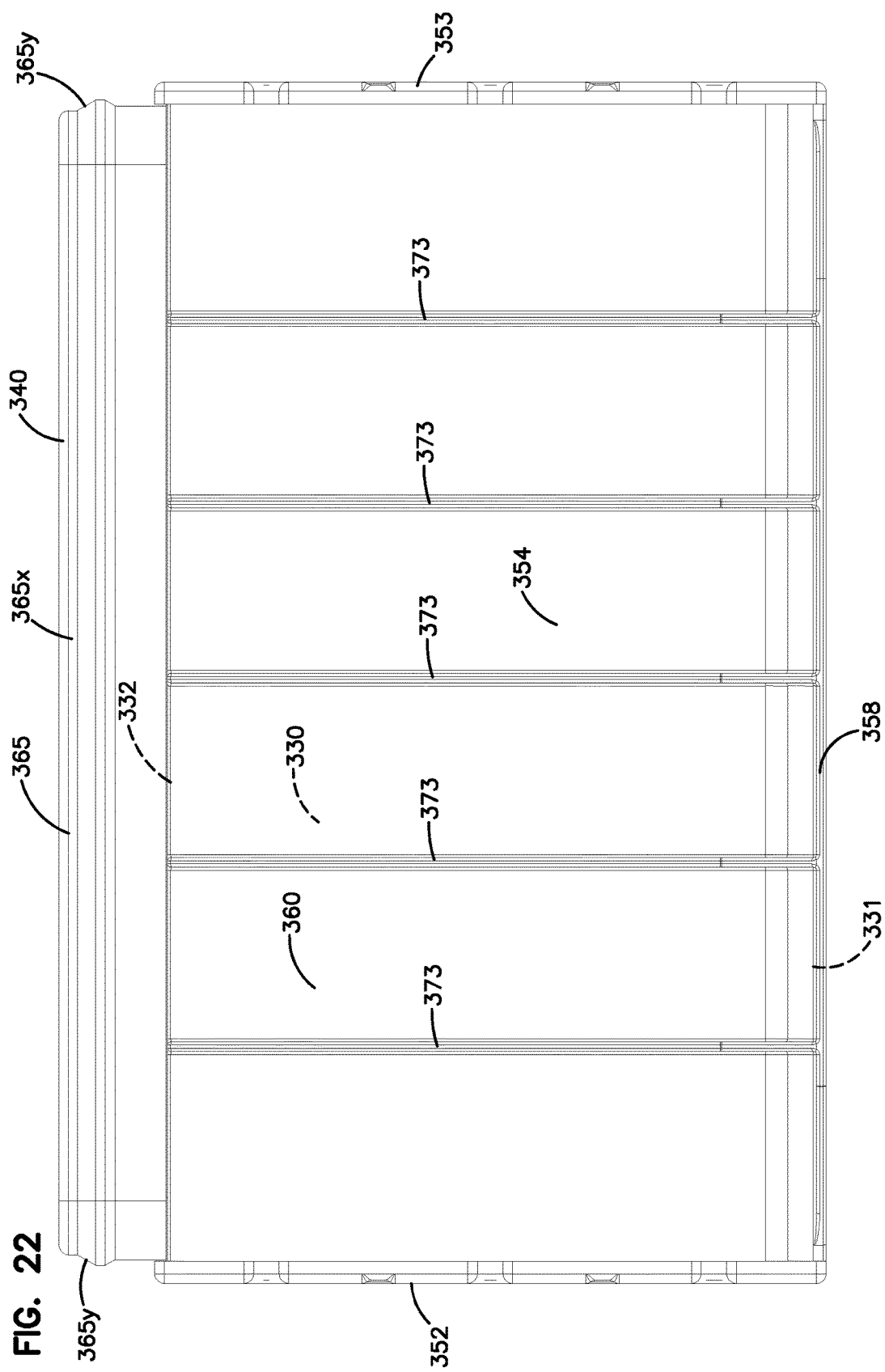
FIG. 22 is a schematic side elevational view of the filter cartridge of FIGS. 19-21.

FIG. 22 is a side elevational view of cartridge 302, taken generally towards side 354. Here a side portion of shell 360 is viewable having strengthening ribs 373 thereon, extending between opposite faces 331, 332 of enclosed media pack 330, not viewable in FIG. 22.

Still referring to FIG. 22, housing seal arrangement 340 is viewable in the side elevational view. The housing seal arrangement 340 is generally positioned projecting (axially) outwardly from adjacent flow face 332 of media pack 330, in a direction away from flow face 331.

Figure 23:
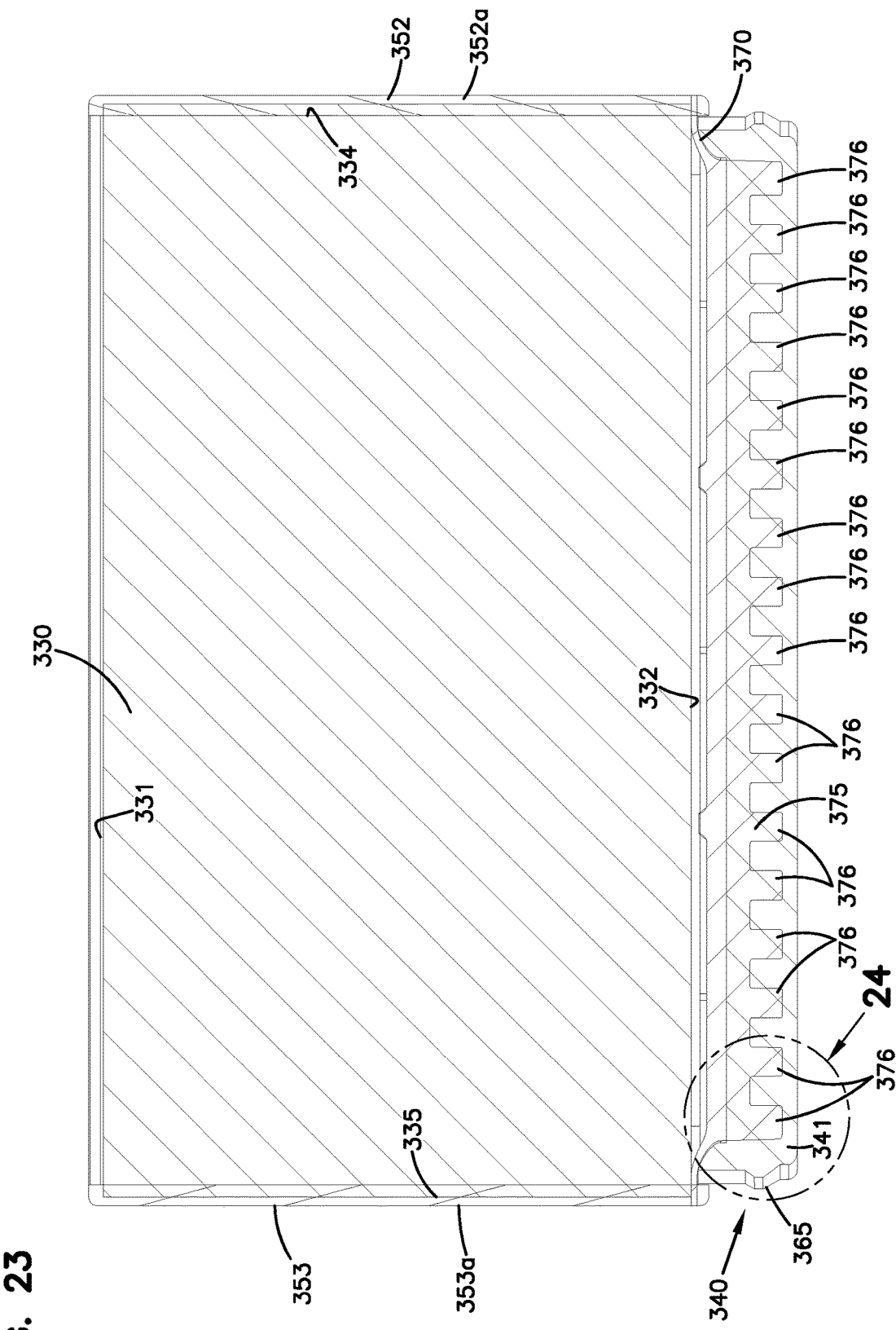
FIG. 23 is a schematic cross-sectional view taken generally along line 23-23, FIG. 21.

Attention is now directed to FIG. 23. FIG. 23 is generally a cross-sectional view taken along line 23-23, of FIG. 21. Referring to FIG. 23, media pack 330 is shown in schematic cross-sectional view, extending between inlet flow face 331 and outlet flow face 332. Opposite ends 334, 335 are viewable embedded within end pieces 352a, 353a respectively.

Still referring to FIG. 23, it is noted that the cross-section shows a seal projection arrangement or portion of shell 360 extending away from end face 332, and embedded within seal material of housing seal arrangement 340. That projection portion is indicated generally at 375. In general terms, shell projection arrangement 375 is positioned to support seal material 341 of housing seal arrangement 340 thereon, in extension axially away from face 332. Typically the shell seal projection arrangement 375 (which supports housing seal arrangement 340) is configured to be somewhat flexible, with respect to forces perpendicular thereto. This is discussed in greater detail below. The particular seal projection arrangement 375 depicted, in part, is configured to provide for this flexibility, by comprising a plurality of spaced tabs 376. The individual tabs 376 provide for some flexibility in a direction perpendicular, i.e., orthogonal, to the direction of extension of seal projection arrangement 375. For the particular cross-section viewed in FIG. 23, this flexibility would be in directions generally toward and away from the viewer. Advantages from this flexible nature to projection arrangement 375 are discussed below.

Figure 24:
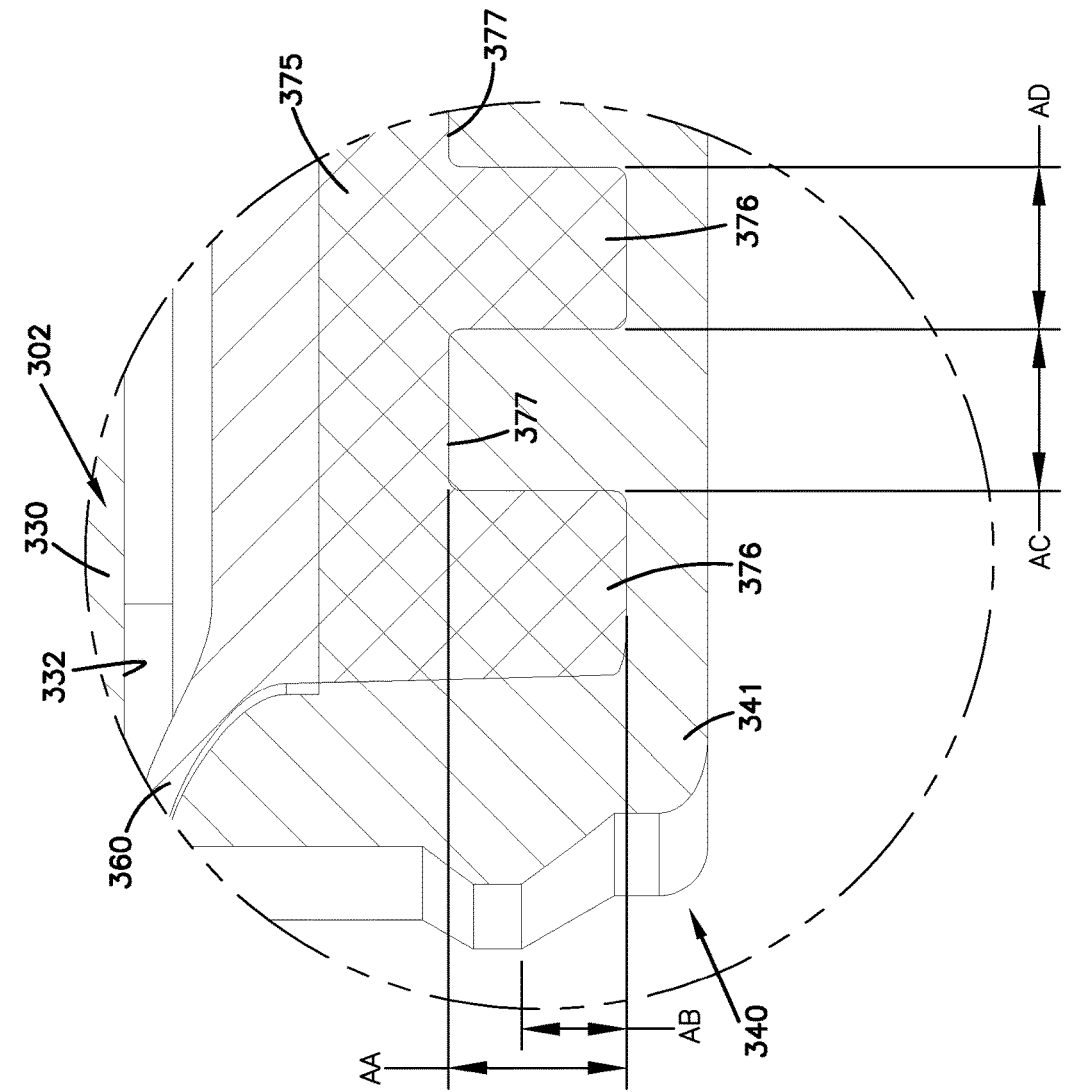
FIG. 24 is an enlarged, schematic, fragmentary view of an identified portion of FIG. 23.

In FIG. 24, an enlarged fragmentary view of a selected portion of FIG. 23 is depicted; the portion shown in FIG. 24 depicting part of projection arrangement 375 embedded within a seal member 365 (i.e. seal material 341) of housing seal arrangement 340. In particular, spaced tabs 376 are viewable in cross-section. For the example depicted, the individual tabs 376 are spaced by gaps 377 which are typically at least 1 mm wide, usually not more than 35 mm wide, and which are often within the range of 2 to 20 mm wide, inclusive, (typically at least 5 mm) indicated at dimension AC. The individual tabs 376 are typically at least 1 mm wide, usually not more than 35 mm wide, and often 2 to 20 mm wide, inclusive, typically at least 5 mm wide, as indicated at dimension AD. The length of the individual tabs 376, generally indicated at dimension AA, usually not more than 30 mm long, and often is within the range of 2 to 20 mm, inclusive, often at least 5 mm and typically 5-15 mm, inclusive. Alternatives are possible for any of the above dimensions.

Herein in connection with figures, some example dimensions are provided to indicate an example system. Of course variations in the dimensions are possible. In FIG. 24, example dimensions indicated, from example cartridge 302, would be as follows: AA=2-15 mm; AB=2-10 mm; AC=2-20 mm; and, AD=2-20 mm.

There is no specific requirement that all tabs 376 have the same width, or that all gaps 377 have the same width. It is specifically noted that at the ends of each of the four sides of the projection 375, open corners, discussed below, are generally present. By the term "open" in this context, it is meant that adjacent sides of the projection 375 do not join adjacent the tabs 376, at the corners. This increases flexibility of each of the sides. Adjacent the corners, wide tabs, relative to the other tabs, may be present. Typically, the tabs adjacent the open corners will be truncated to not curve into the corner; and, in general, the various tabs 376 will not have lateral supports such as struts or gussets thereon, inhibiting flexibility. Of course at the gaps 377, seal flexibility also results from the fact that seal material 341 fills the gaps, and is itself flexible.

Referring back to FIG. 23, the total cartridge length, between media pack ends 334, 335, would typically be about 378 mm (300-450 mm, inclusive), for the example assembly depicted. Principles described herein are particularly advantageous, for cartridges having a media pack length between opposite sides 334, 335, in the order of at least 300 mm, typically at least 350 mm, and often within the range 350 mm-450 mm, inclusive, although alternative sizes are possible. These lengths would also approximate the total length of the cartridge 302, as the length of the cartridge 302 only differs from the length of the media pack 330, by partial thickness of the side pieces 352a, 353a.

Figure 25:
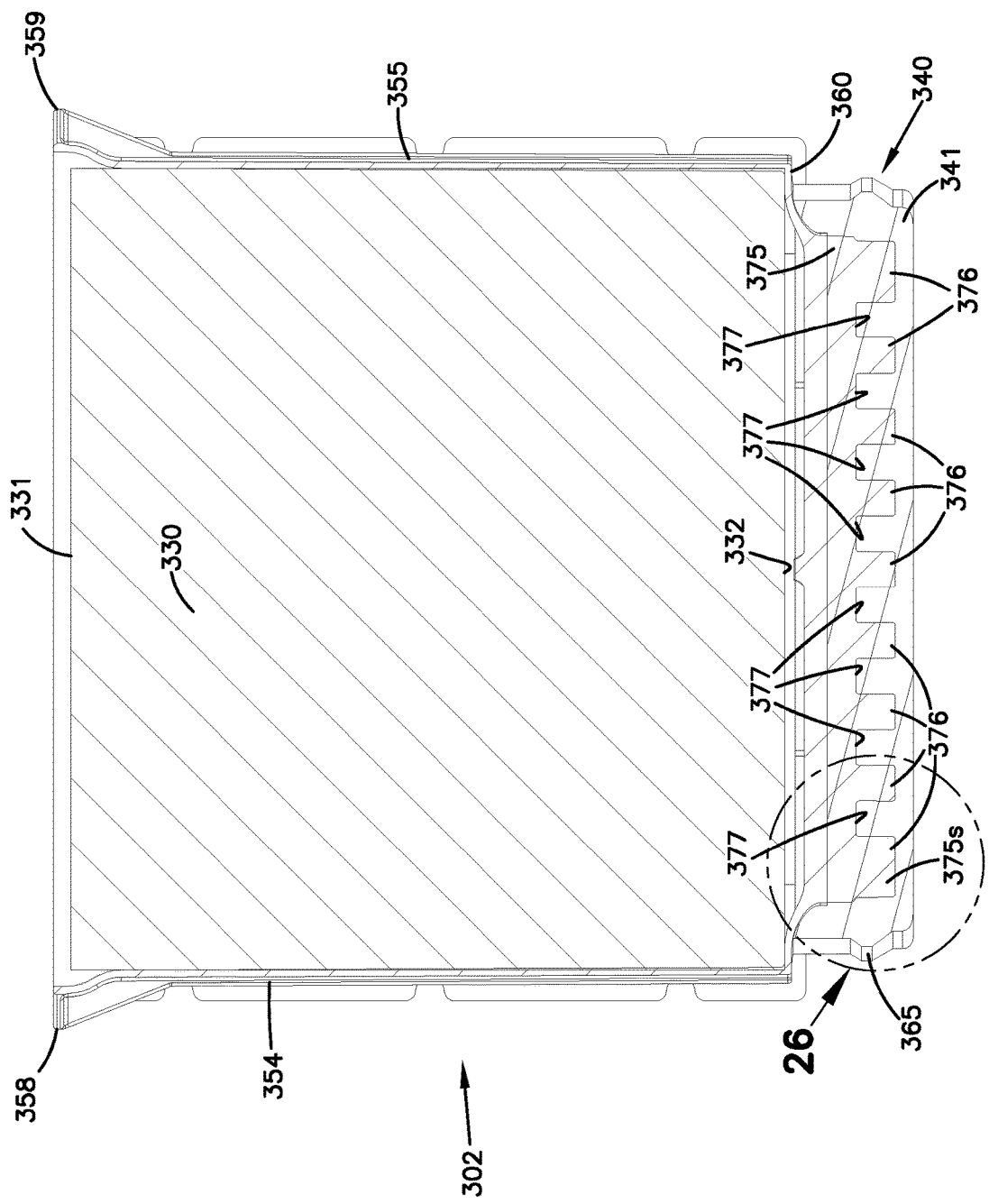
FIG. 25 is a schematic cross-sectional view taken generally along line 25-25, FIG. 21.

Attention is now directed to FIG. 25. FIG. 25 is a cross-sectional view of cartridge 320 taken generally along line 24-24, FIG. 21. Here the media pack 330 is again depicted in schematic cross section, extending between opposite flow faces 331, 332. Opposite sides 354, 355 are viewable, with outer flares, flanges or projections 358, 359 thereon.

Referring to FIG. 25, shell 360 is viewed in cross section, having opposite sides 354, 355. Housing seal arrangement 340 is viewable, again comprising (shell) projection arrangement 375, projecting away from end face 332. Shell projection arrangement 375, for the example depicted, comprises a plurality of spaced tabs 376, separated by gaps 377. Thus, throughout its perimeter extension, projection arrangement 375 of shell 360, (which projects outwardly away from outlet face 332), comprises a plurality of spaced tabs 376 defining a parallelogram perimeter shape, in this instance rectangular.

Thus, in a typical assembly, the projection arrangement 375 comprises a rectangular perimeter, with four sides and four open corners; the sides comprising a first pair of opposite (longer) sides; and, a first pair of opposite (shorter) ends. Typically, the longer sides can be characterized as having a length $L_1$, the shorter ends having a length $L_2$, with $L_1$ greater than $L_2$. Typically $L_1$ is at least 50 mm longer than $L_2$, usually 80 mm or more.

Typically, shell projection arrangement 375, which operates as a support member 375s for seal material 341 (and seal member 365) of housing seal arrangement 340, is positioned in at least partial axial overlap cartridge outlet flow face 332. By this, it is meant that the projection arrangement 375, and the resulting seal arrangement 360, can be viewed as projecting outwardly from adjacent end face 332, and in at least partial axial overlap with the end face 332.

Figure 26:
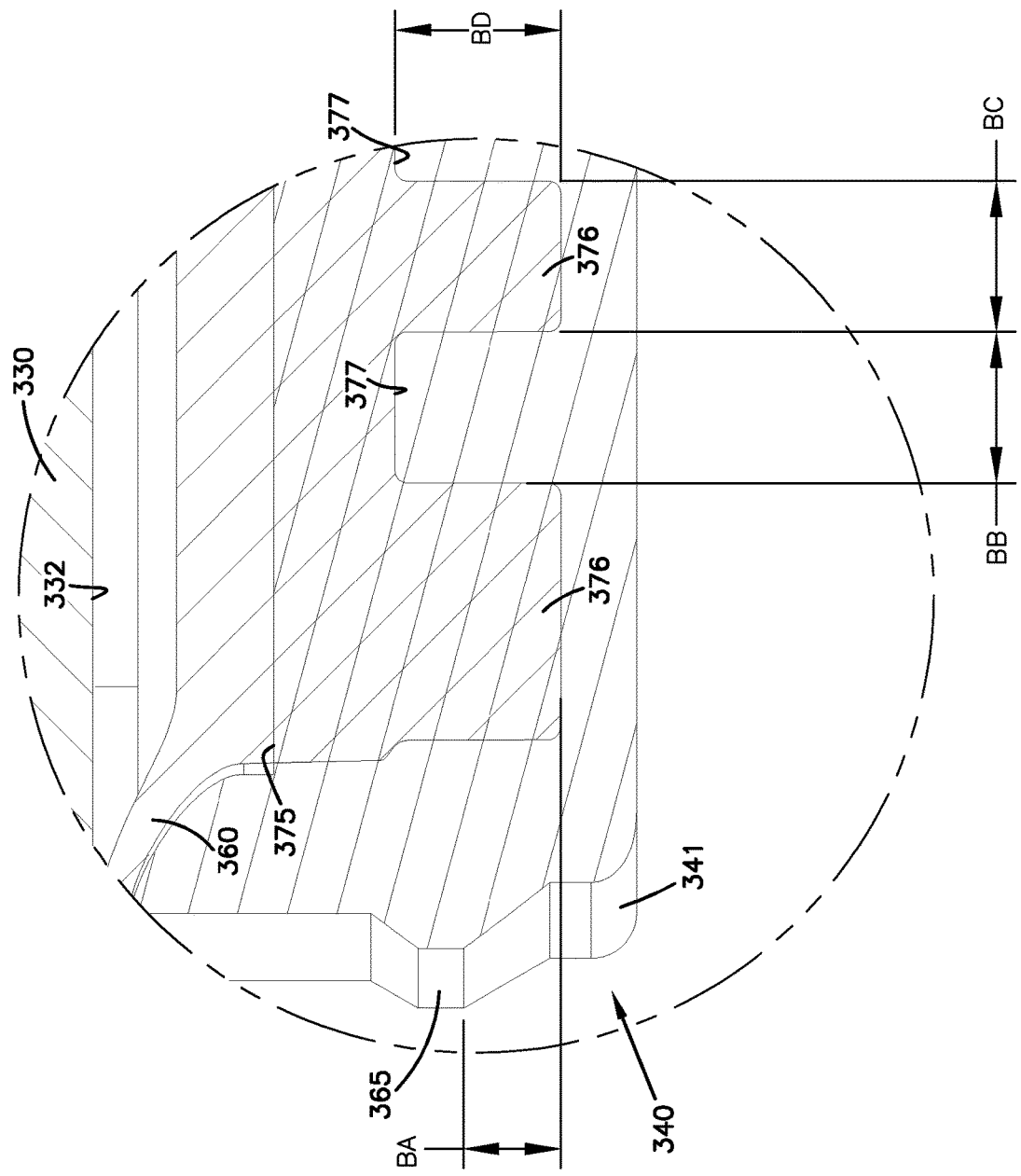
FIG. 26 is an enlarged, schematic, fragmentary view of a selected portion of FIG. 25.

Attention is now directed to FIG. 26, an enlarged fragmentary view of an identified portion of FIG. 25. Here, seal material 341 can be viewed, as well as a portion of shell projection arrangement 375, including tabs 376 spaced by caps 377.

By comparison of FIGS. 23, 24, 25, and 26, it will again be understood shell projection arrangement 375 is generally rectangular, and has four open corners or corner gaps. That is, gaps between adjacent ones of tabs 376 are positioned in each of the four corners. Alternatives are possible, however the particular configuration depicted is desirable for reasons discussed below.

In FIG. 26, some example dimensions for an example application are provided as follows: BA=2-10 mm; BB=2-20 mm; BC=2-20 mm; and BD=2-15 mm. Alternatives are of course possible.

Figure 27:
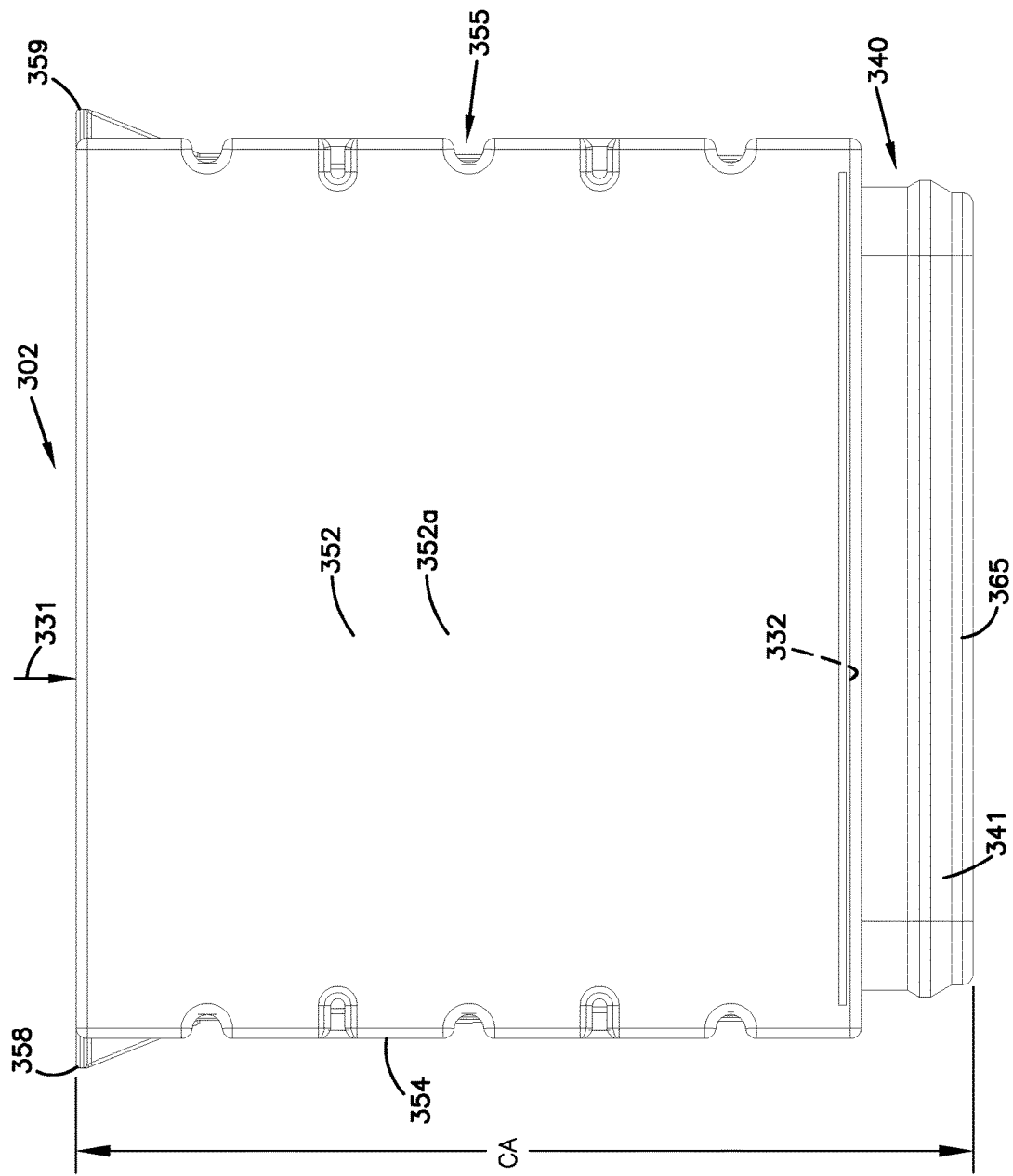
FIG. 27 is a schematic end elevational view of the filter cartridge of FIGS. 19-21.

Attention is now directed to FIG. 27, an end elevational view of cartridge 302, directed generally toward end piece 352a, of end 352. An example dimension, for a total height or depth of example cartridge 302 is provided, as follows: CA=241 mm. In FIG. 27, the features viewable include housing seal arrangement 340, and end flanges 358, 359.

Figure 28:
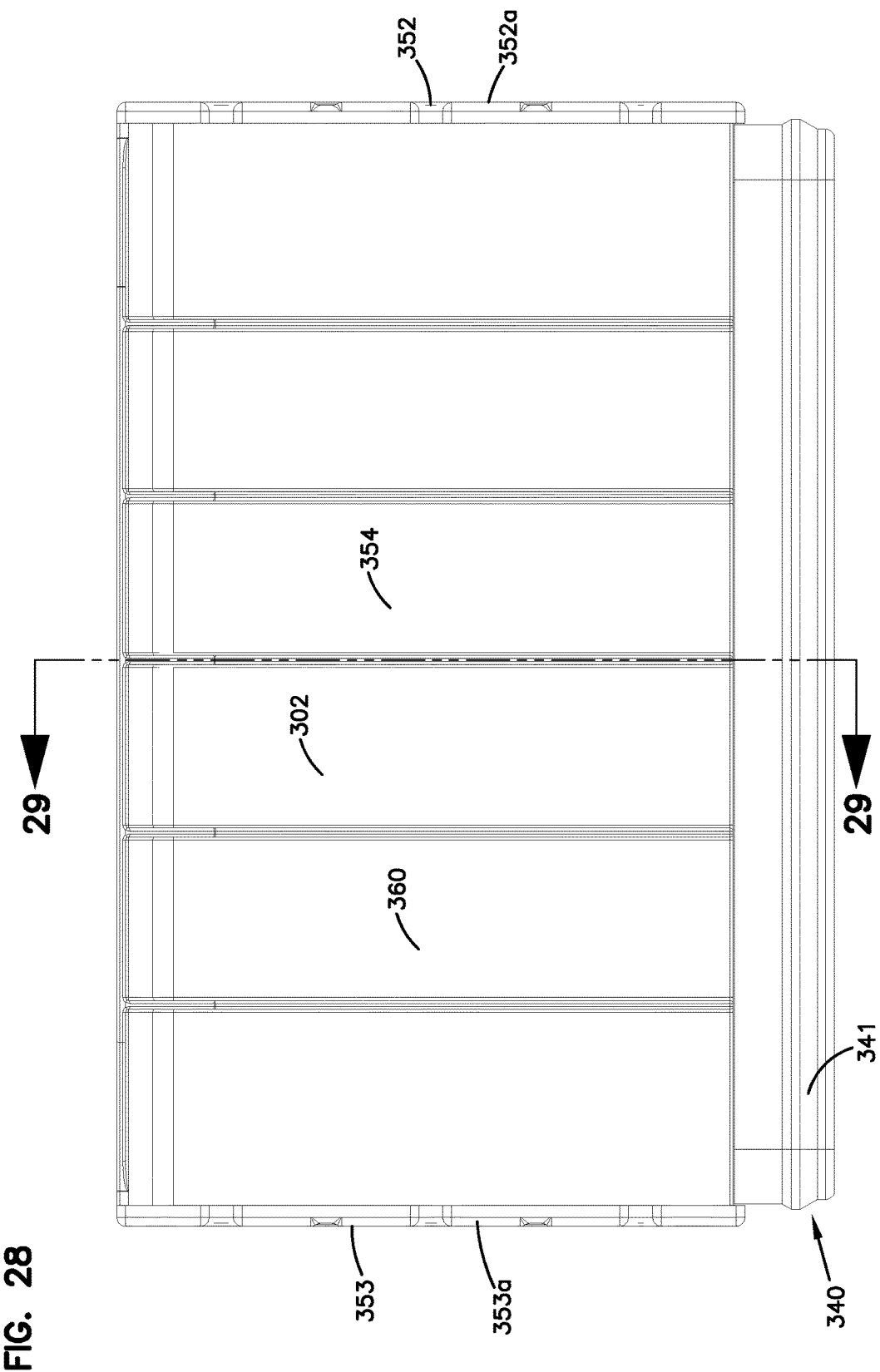
FIG. 28 is a schematic side elevational view analogous to FIG. 22, but depicting the cartridge inverted relative to FIG. 22.
Figure 29:
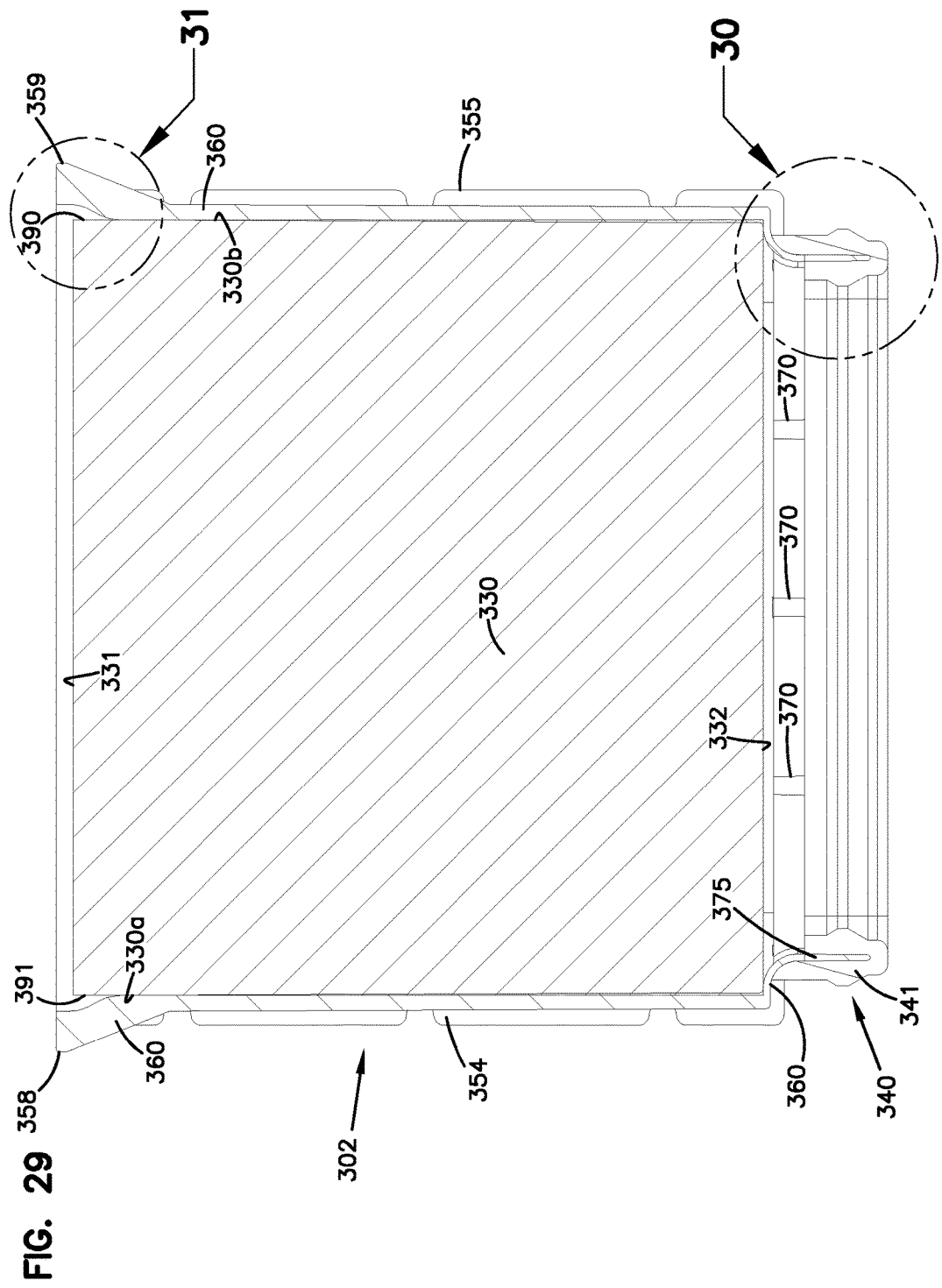
FIG. 29 is a schematic cross-sectional view taken generally along line 29-29, FIG. 28.

In FIG. 28, a side elevational view of cartridge 302 is provided, generally analogous to view 22 but inverted; the view taken being generally directed towards side 354. Here, cross-section line 29-29, identifying for the cross sectional view of FIG. 29, is depicted. Referring to FIG. 29, the cross-sectional view of cartridge 302 is generally parallel to end piece 352a. Here, cross-sections of opposite sides 344, 355 are viewable, including a cross-sectional view of flanges 358, 359.

Figure 31:
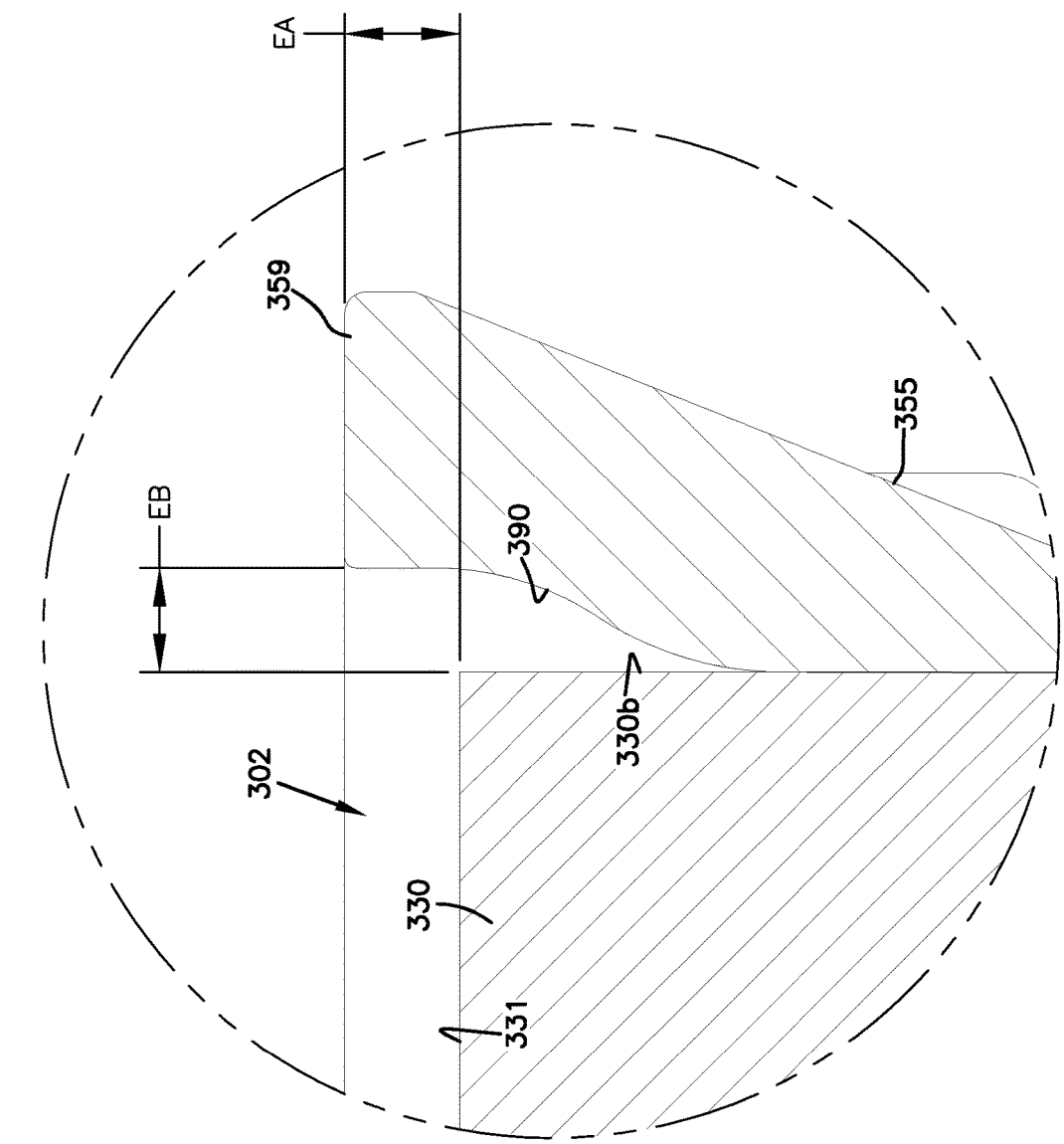
FIG. 31 is an enlarged, fragmentary, schematic view of a selected portion of FIG. 29.

Attention is now directed to FIG. 31, an enlarged fragmentary view of a selected portion of FIG. 29. Here attention is directed to a region adjacent flange 359. It is noted that between cartridge 302 and flange 359 is provided a gap 390. The gap 390 generally extends along a longer side 330b of media pack 330, between the media pack 330 and the flange 359, in a region immediately adjacent inlet flow face 331. In general, gap 390 provides a receiving space for sealant applied along the side 330b of the media pack 330 in this region. An analogous gap 391, FIG. 29 is positioned adjacent flange 358.

In general, when cartridge 302 is constructed, a pre-made media pack 330 is positioned within shell 360. A strip of sealant is positioned within gaps 390, 391, to ensure seals between the media pack 330 and shell 360, along opposite sides 330a, 330b of the media pack 330 (the flanges 358, 359 comprising portions of shell 360).

In FIG. 31, some example dimensions are provided as follows: EA=5 mm; and, EB=4.5 mm.

C. The Housing Seal Arrangement 340

In this section, interaction between the housing seal arrangement 340 and the housing 301 is described. Attention is first directed to FIG. 30, an enlarged fragmentary cross-sectional view depicting a portion of the cartridge 302 viewable in FIG. 29, inserted within a portion of seal groove 350 of housing 301, FIG. 18.

Figure 30:
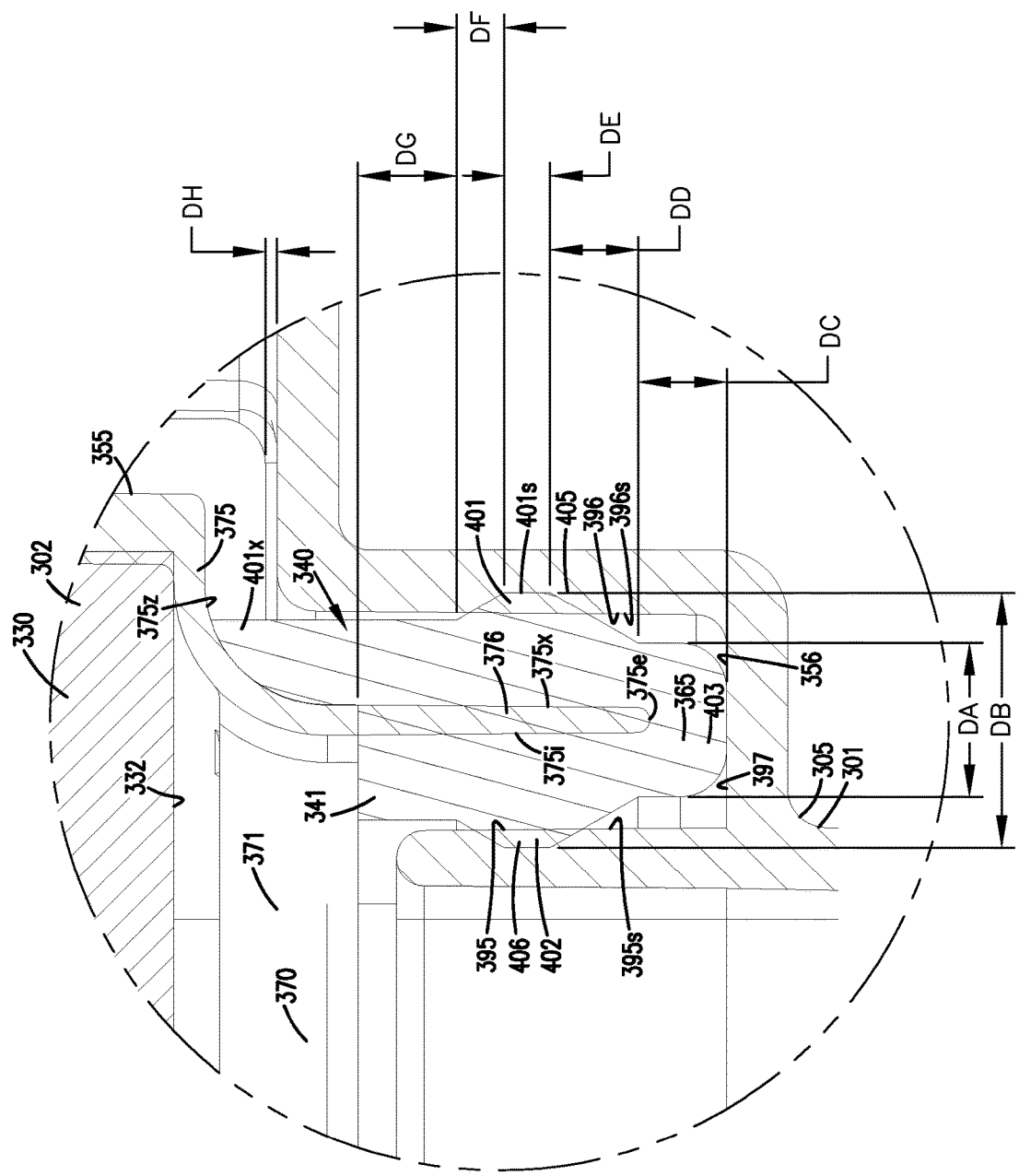
FIG. 30 is an enlarged, schematic, fragmentary view of a selected portion of FIG. 29.

Referring to FIG. 30, attention is first directed to portions of housing 301 depicted in cross-section, in that figure. Groove 350 can be seen as defined by an inner (side) wall 395 an opposite outer (side) wall 396 and an end wall 397. Groove 350 will typically be at least 8 mm and not more than 25 mm, wide (usually 9-18 mm wide, inclusive); and, at least about 25 mm, deep, for typical applications according to the present disclosure. Typically, at least the inner wall 395, and often both the inner wall 395 and the outer wall 396, of groove 350, will be in axial overlap with the outlet flow face 332 of the media pack 330, when positioned. By this, it is meant that typically the groove 350 is directly aligned over a portion of face 332, and is not axially aligned with space peripherally around face 332.

As discussed in connection with FIG. 18 above, the groove 350 is generally sized and positioned to extend peripherally around outlet aperture 348, typically spaced therefrom. Thus, seal groove 350 is oriented to provide a seal location which will isolate a clean air region at outlet aperture 348, from an unfiltered air region within housing 301.

Referring to FIG. 30, attention is now directed to portions of cartridge 302 depicted in cross-section. Here, a portion of shell 360 is viewable, in particular a portion of (shell) projection seal arrangement 375. It can be seen that mounted on shell projection portion 375 is provided seal member 365, comprising seal material 341. Seal member 365 includes: a peripherally (radially) outer portion 401; opposite radially inwardly facing or peripherally inner portion 402; and, an end tip 403. In general, peripherally outer portion 401 surrounds an outer face 375x, of a portion of shell projection arrangement 375. Peripherally inner portion 402, is surrounded by an inner surface 375i of a portion of shell projection arrangement 375; and, end tip 403 extends over (and in the view of FIG. 30 under) an end 375e of a portion of shell projection arrangement 375.

Typically, seal member 365 will be molded-in-place, often comprising a foamed polyurethane as described herein below.

For the particular example cartridge 302 depicted, the outer (radially directed) peripheral portion 401 has an end portion 401x, which engages, i.e. presses against, an end portion 375z of projecting shell projection arrangement 375 which is in overlap with media pack outlet flow face 332, and which turns outwardly (radially) to engage side wall 355; an analogous portion being adjacent opposite side 354.

Inner (radially directed) region 402 also rises and terminates. However in the depiction shown in FIG. 30 it is depicted risen against one of the strips 371 of grid 370. On opposite sides of the strips 371, the seal material will typically rise further, but not preferably sufficiently high to engage outlet face 332 and block flow therefrom.

Typically, then, when formed, seal member 365 will be molded in a free rise process.

Still referring to FIG. 30, attention is directed to the cross-sectional shape of housing seal member 365. In particular, outer peripheral section 401 includes an outer surface 401s, with a longitudinal central rib 405 thereon. In general, rib 405 extends peripherally (longitudinally) completely around seal member 400, and is integral therewith. Rib 405 generally projects radially outwardly from adjacent portions of outer peripheral member 401, at opposite sides of rib 405, by a distance of at least 0.4 mm and usually at least 0.6 mm, for example an amount within the range of 0.6-2.3 mm, inclusive. Rib 405 is an interference rib, and is depicted drawn in overlap with wall 396, to show an amount of interference (compression) when installed. For the particular example depicted, rib 405 is continuous in extension peripherally around housing seal arrangement 440, i.e. around outer surface 401, and thus operates as a seal rib, to provide sealing engagement with inner surface 396s of outer side wall 396, of groove 350.

Also, attention is directed toward inner (radially directed) peripheral region 402 for seal member 365. For the particular example seal member 365 depicted, inner peripheral portion 402 includes rib 406 thereon, projecting radially inwardly from adjacent portions, both above and below, rib 406, of seal member 400 a distance of at least 0.4 mm usually at least 0.6 mm, and analogously to rib 405. For the particular example depicted, rib 406 provides for a radial inward engagement with inner wall 395 of groove 350. For the example depicted, rib 405 is integral with the remainder of seal member 365, and extends continuously (longitudinally) peripherally around inner peripheral region 402. Thus, for the particular example assembly depicted in FIG. 30, rib 405 provides for sealing engagement with surface 395s of inner wall 395 of groove 350. In FIG. 30, overlap between rib 402 and wall 395 is depicted to show an amount of interference (compression) when installed.

From the above, it will be understood that the example cartridge 302 depicted, includes a housing seal arrangement 340 configured to project into a groove 350 in a housing 301, engaging, within interference fit, opposite inner and outer side walls, 395, 396 of the groove 350. The particular interference fit depicted for the example of FIG. 30, is a sealing interaction. Thus, the particular housing seal arrangement 340 depicted, forms both an inwardly directed radial seal and an outwardly directed radial seal, completely therearound, with groove 350.

Still referring to FIG. 30, some example dimensions are provided as follows: DA=10 mm; DB=16.6 mm; DC=5.7 mm; DD=5.7 mm; DE=3 mm; DF=3.1 mm; DG=6.4 mm; and, DH=0.8 mm.

In general, then, housing seal arrangement 340 is a radial seal arrangement, meaning that the seal forces are generally directed radially rather than axially. Herein, the term "axially" refers to a direction generally corresponding to air flow through the media pack 330, i.e., in a direction between inlet flow face 331 and outlet flow face 332. The term "radially", is generally meant to refer to forces directed generally orthogonal to the axial direction.

Figure 32:
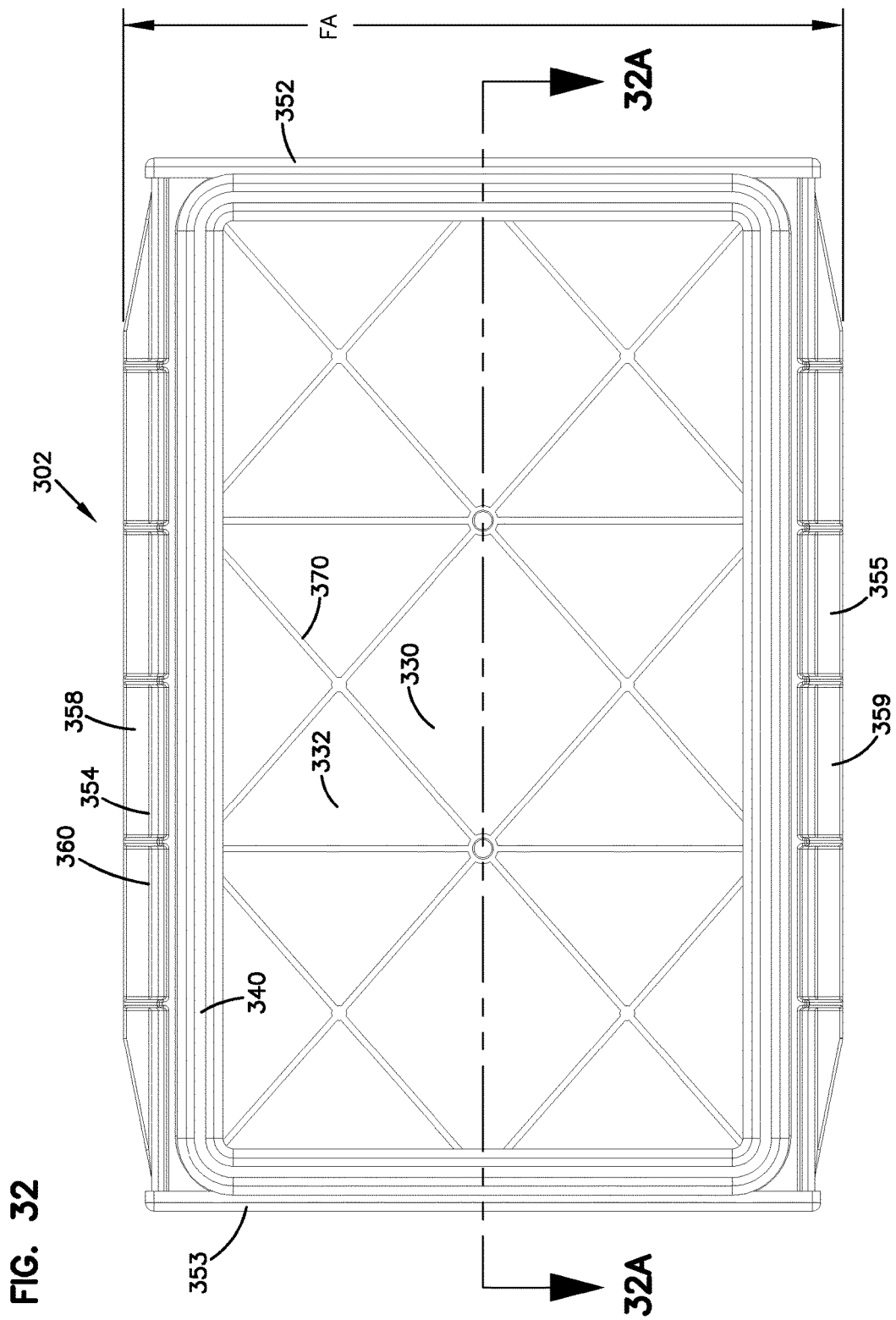
FIG. 32 is a schematic outlet end plan view of the filter cartridge of FIGS. 19 and 20.

FIG. 32 is a plan view of cartridge 302, directed generally toward outlet flow face 332 of media pack 330. Thus, FIG. 32 is analogous to FIG. 21. The width dimension of the cartridge 302, between the opposite flanges 358, 359 is designated by dimension FA, for example, as follows: FA=258 mm.

Figure 32A:
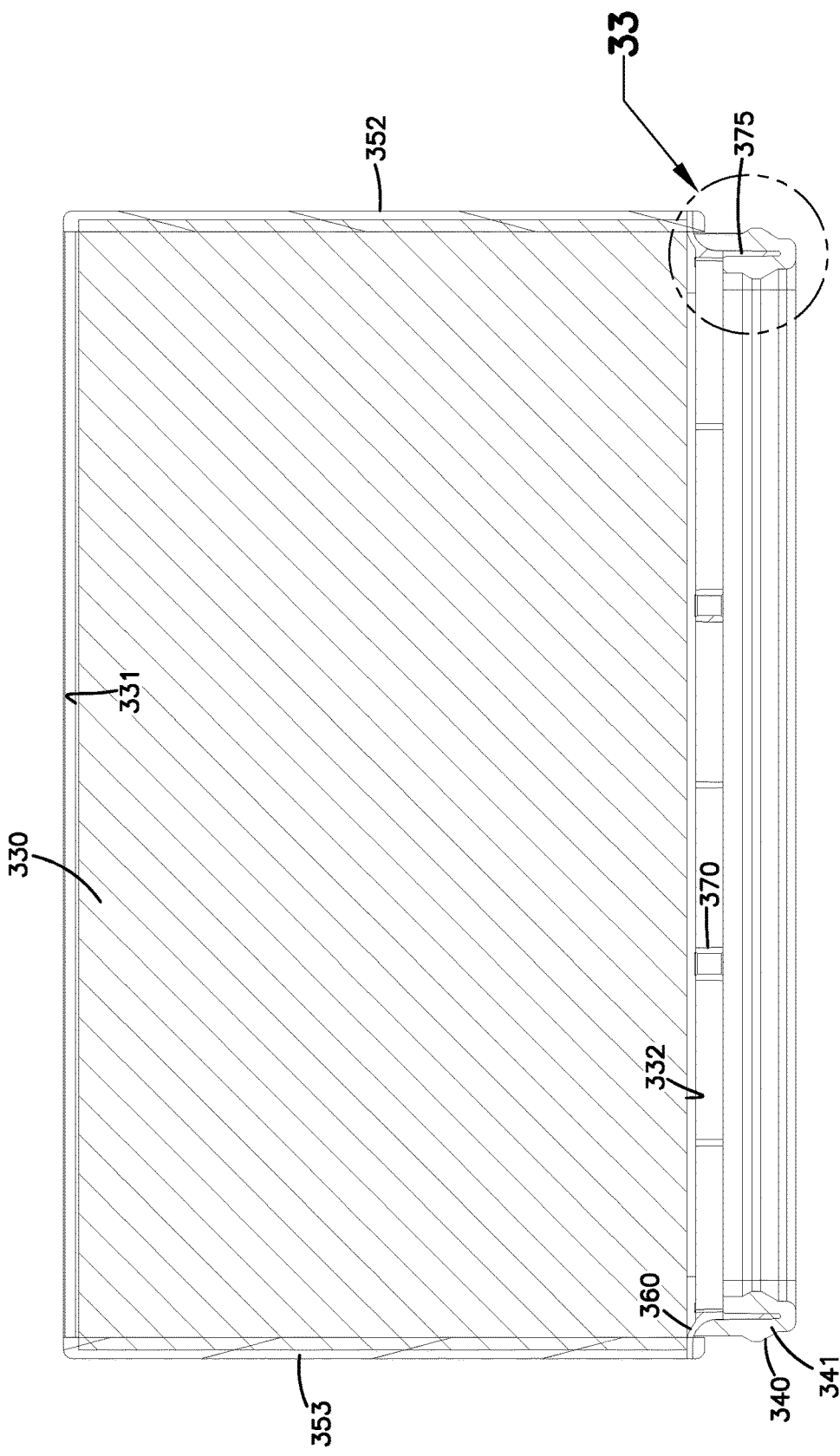
FIG. 32A is a schematic cross-sectional view taken along line 32A-32A, FIG. 32.

FIG. 32A is a cross-sectional view taken along line 32A-32A, FIG. 32.

Figure 33:
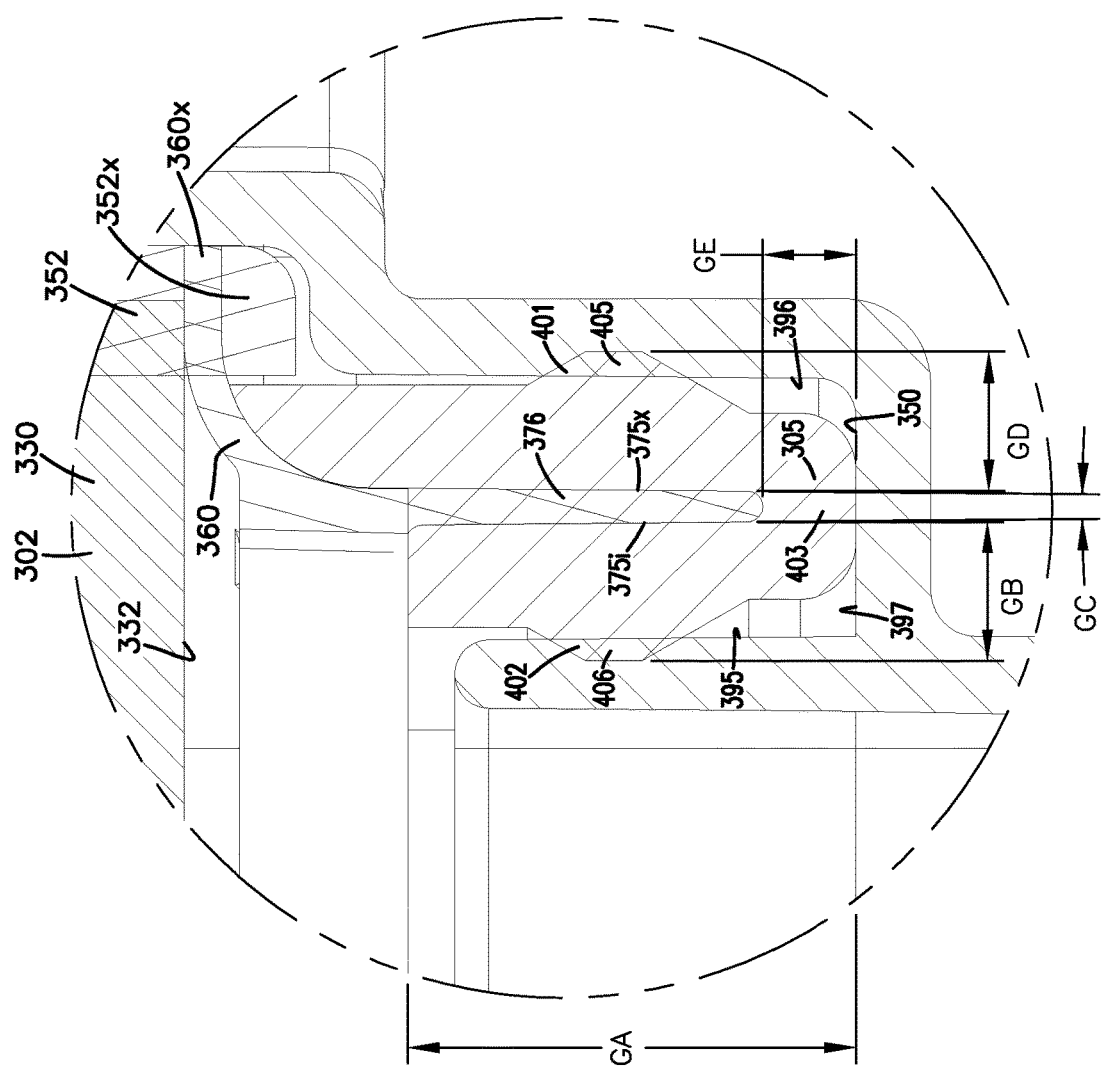
FIG. 33 is an enlarged, schematic, fragmentary view of a selected portion of FIG. 33, depicted inserted in a housing portion; also shown in schematic, fragmentary, view.

FIG. 33 is an enlarged fragmentary view of an identified portion of FIG. 32A. Features are generally analogous to those described above with respect to FIG. 30 are analogously referenced. Some dimensions are provided as follows: GA=10-60 mm, inclusive; GB=7.5 mm; GC=0.25-5°, inclusive; GD=7.5 mm; and, GE=5 mm.

In FIG. 33, attention is directed to a portion of molded-in-place side wall 352, depicted generally at 352x. In particular flange 360x is shown embedded in portion 352x of molded-in-place side wall 352. Flange 360x of shell 360 would typically include apertures therein, for flow of material therethrough, while molding-in-place side wall 352, for secure engagement. Analogous interaction will be provided along an opposite side of shell of 360 from that viewable in FIG. 33. These features are discussed further below, when assembly of cartridge 302 is discussed.

D. Shell Member 360; Assembly of Cartridge 302.

Attention is now directed to FIGS. 34-44, in which shell 360 and features of shell 360 are depicted. It is noted that typically shell 360 be a molded plastic part, for example molded from recycled nylon or another plastic, for example polypropylene, ABS or in some instances, hard urethane. It will be a preform, i.e., it will be formed in advance of manufacture of the cartridge 302, and used as one of the components for formation of the cartridge 302.

Figure 34:
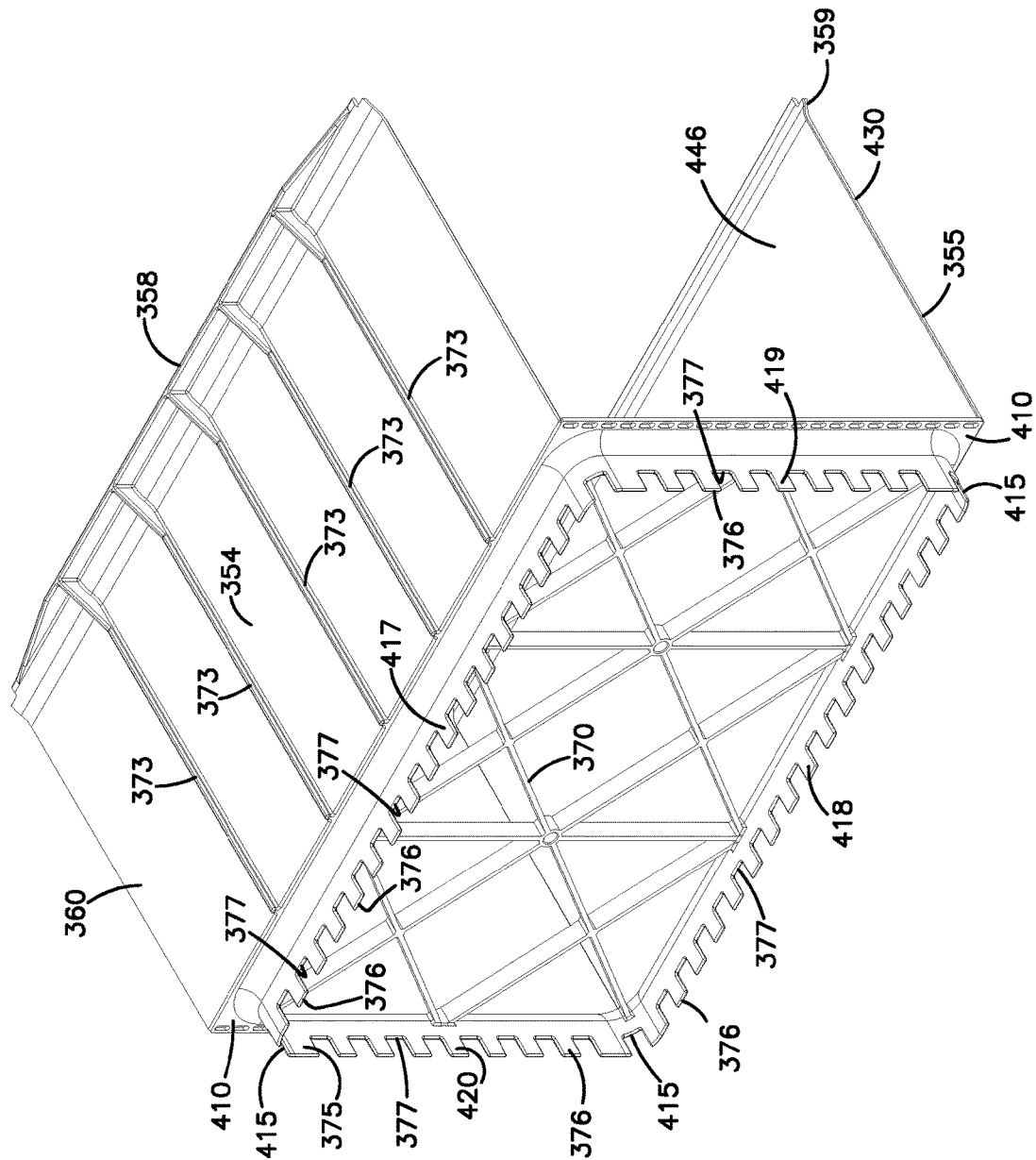
FIG. 34 is a schematic, outlet, perspective view of a shell component of the cartridge of FIGS. 19-21.

Referring first to FIG. 34, an outlet perspective view of shell 360 is depicted. The opposite sides 354, 355, each respectively having a outwardly directed, end flange 358, 359 are viewable. Strengthening ribs 373 extending cross side 354 are viewable and side 355 would typically have analogous ribs.

Projection arrangement 375 is viewable at outlet or outlet end 410, which also has support grid 370 extending thereacross. Projection arrangement of 375 comprises a plurality of tabs 376 spaced by gaps 377. It is noted that the projection arrangement 375 generally defines a rectangular shape; in the example depicted having four open corners 415, i.e., one of the gaps 377 is positioned in each corner 415. Shell projection arrangement 375, then, has first and second opposite long sides 417, 418 first and second opposite short sides 419, 420; each of sides 417, 418, 419, 420 being straight, in the example depicted.

Figure 35:
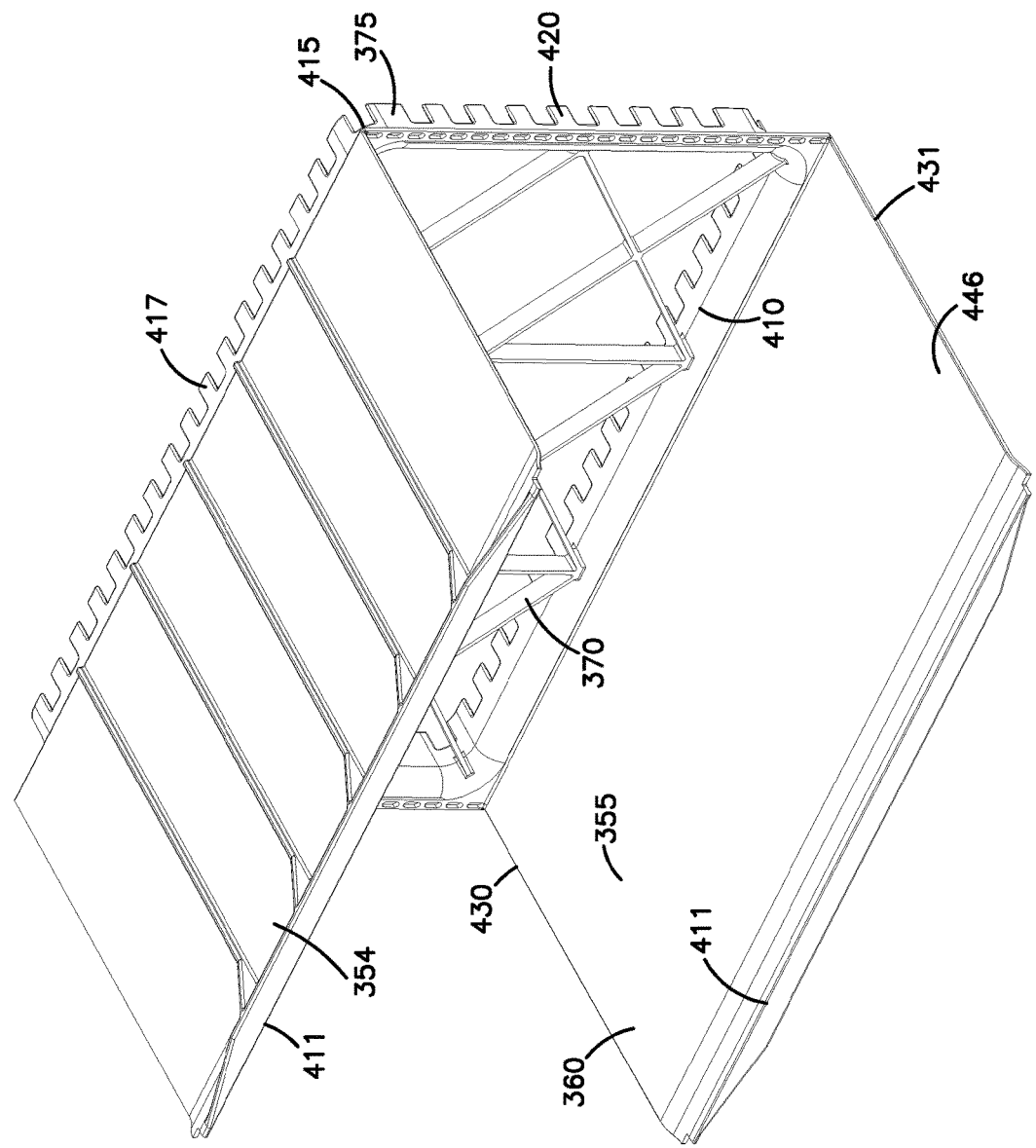
FIG. 35 is a schematic, inlet end, perspective view of the shell component of FIG. 34.

In FIG. 35, an opposite perspective view to FIG. 34, of shell 360 is depicted. At 411, ends of sides 354, 355, remote from outlet end 410 are shown. End 411 is sometimes characterized here as defining "an inlet" or "inlet end," or "inlet face" to preform 360. The reason for these characterizations, is that adjacent regions 411, will be positioned an inlet face 331 for a media pack 330 when the cartridge 302 is assembled; i.e. air will enter preform 360 adjacent regions 411, as it passes through the resulting cartridge 302.

Figure 36:
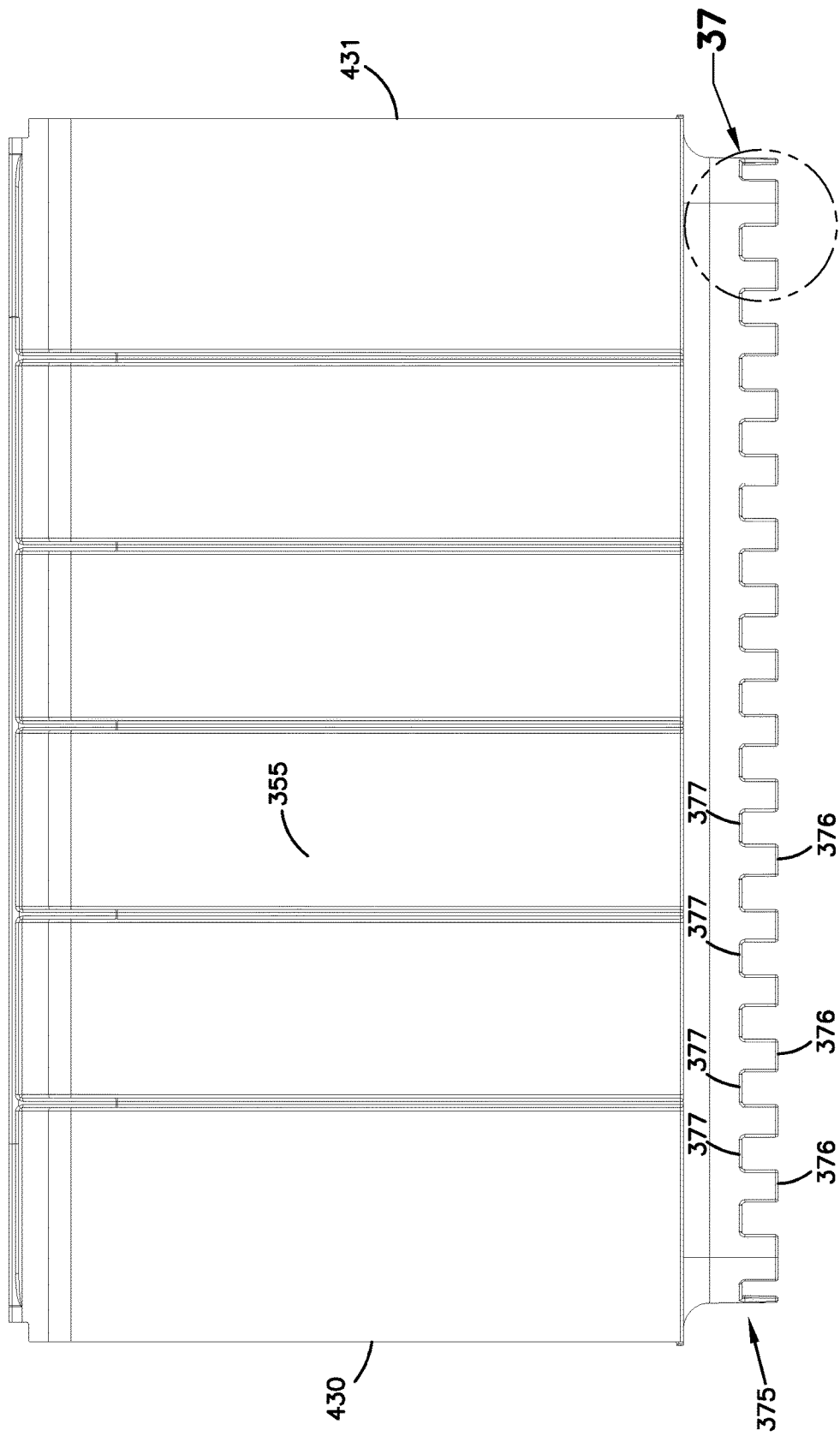
FIG. 36 is a schematic side elevational view of the shell component of FIGS. 34 and 35.

FIG. 36 is a side elevational view of shell 360.

Shell 360 extends between first and second opposite, open, ends (or side ends) 430, 431.

The same features as identified with respect to FIGS. 34 and 35 are identified with same reference numerals.

Figure 37:
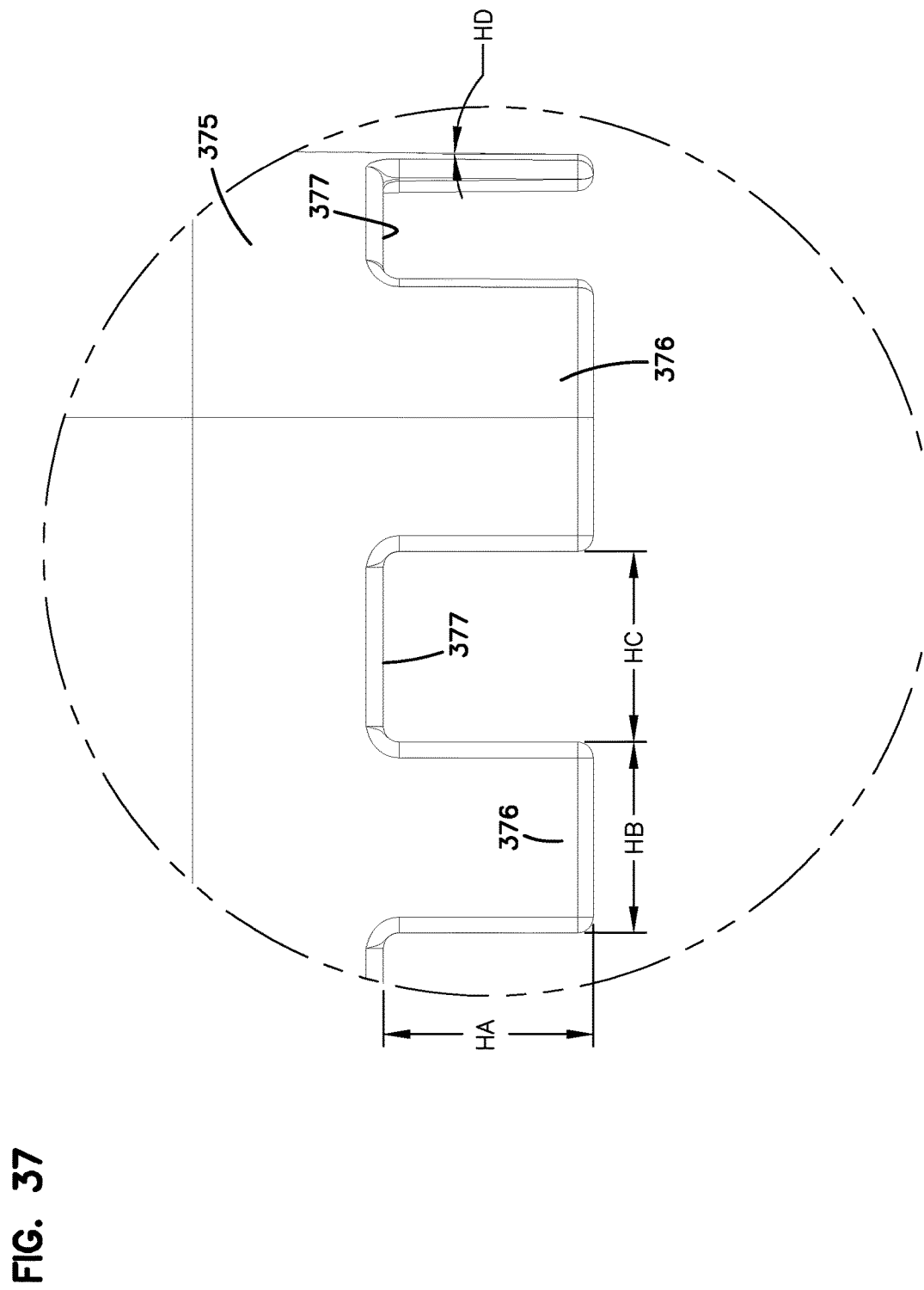
FIG. 37 is a schematic, enlarged, fragmentary view of an identified portion of FIG. 36.

FIG. 37 is an enlarged fragmentary view of an identified portion of FIG. 36. Here, some example tabs 376 are depicted, along with some identified dimensions, as follows: HA=11 mm (typically); HB=10 mm (typically); and HC=10 mm (typically). Of course these dimensions may be varied, as previously discussed. Angle HD, for the example depicted is 0.5° and may be varied as previously described.

Figure 38:
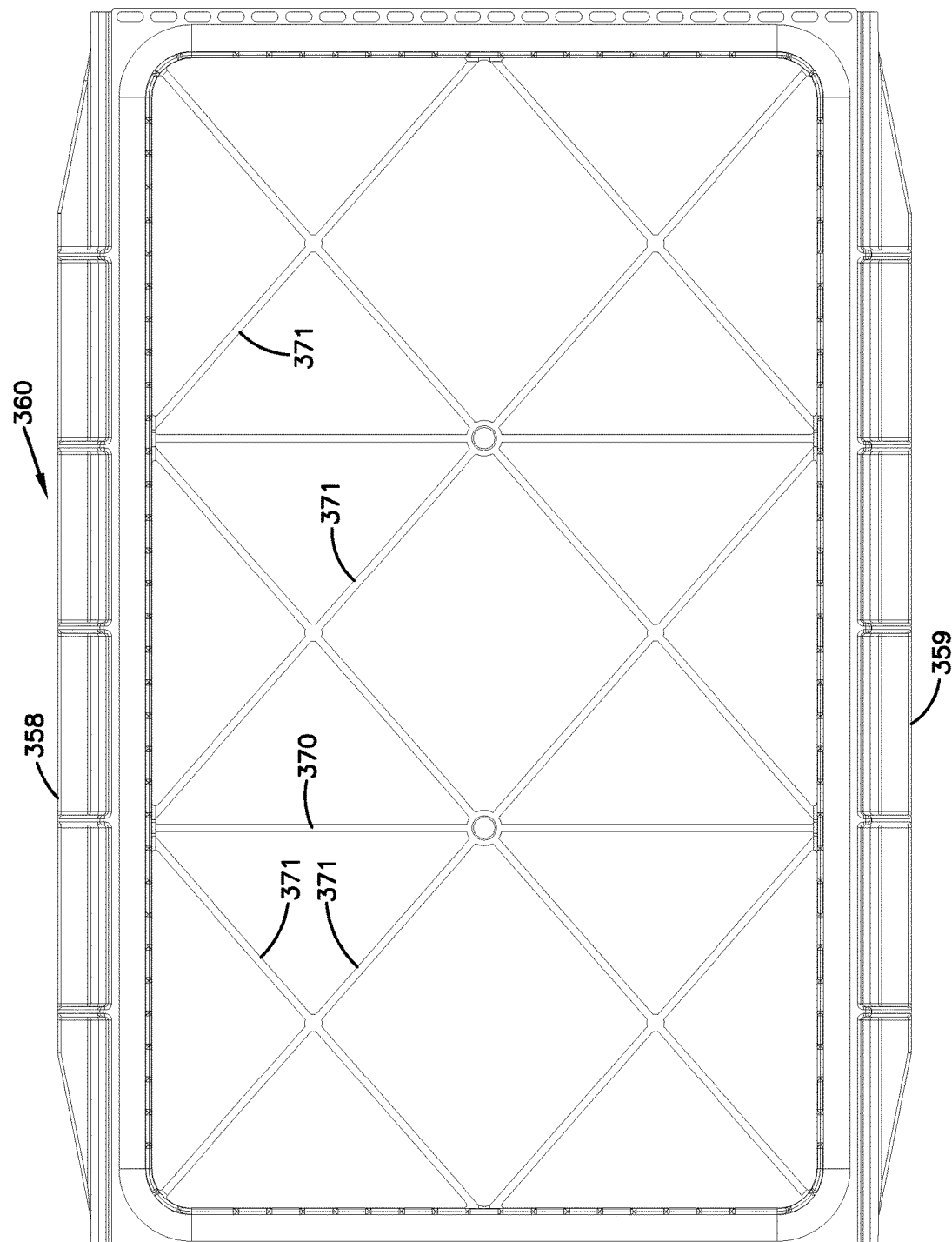
FIG. 38 is a schematic, outlet, perspective view of the shell component of FIGS. 34 and 35.

In FIG. 38, an outlet end view of the shell 360 is depicted, with support grid 370, comprising strips 371, being viewable.

Figure 39:
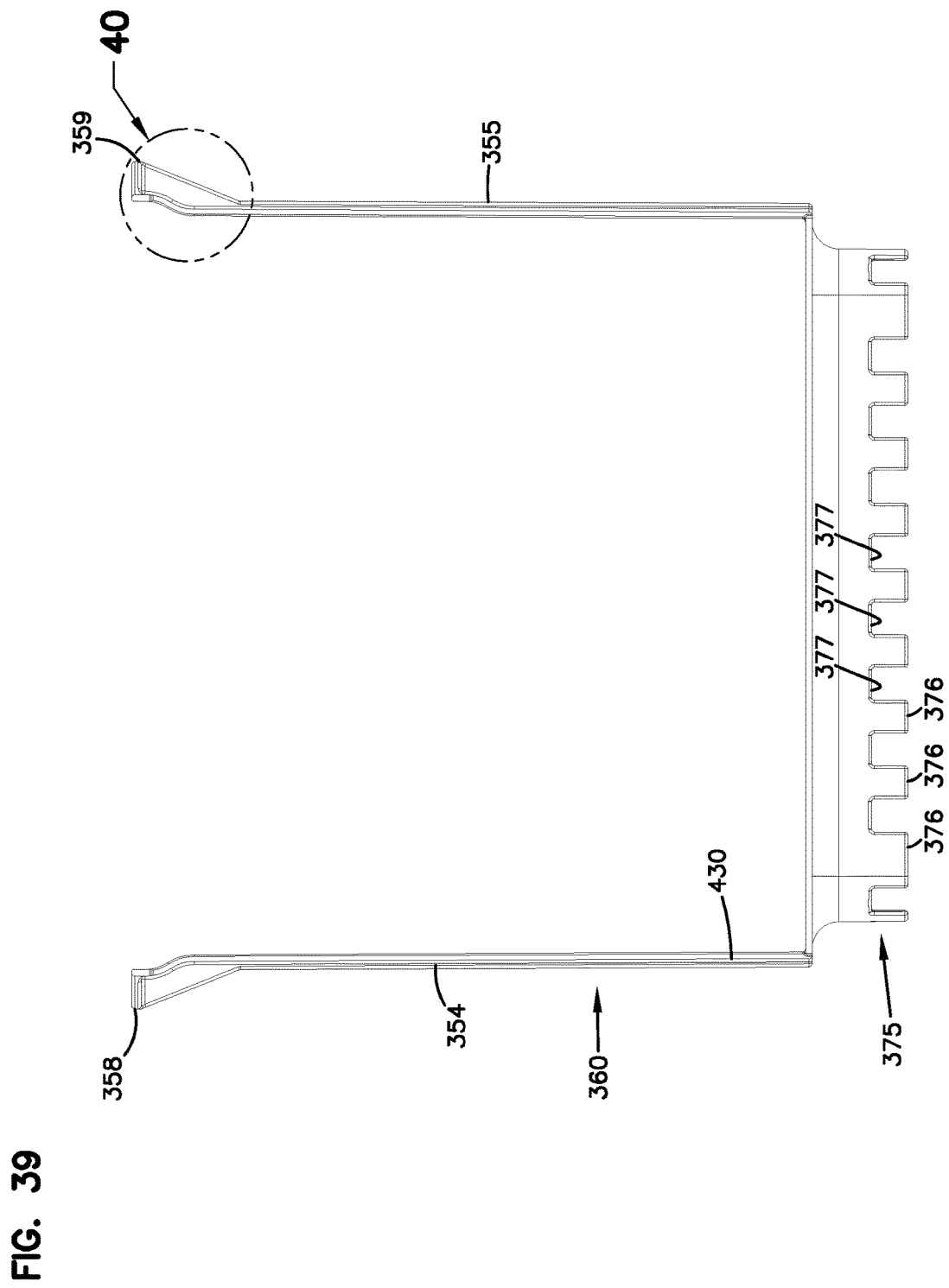
FIG. 39 is a schematic end elevational view of the shell component of FIGS. 34 and 35.

FIG. 39 is an end elevational view of shell 360, generally taken toward open end 430. Here, the opposite sides 354, 355, with outer flanges 358, 359, respectively, are viewable.

Figure 40:
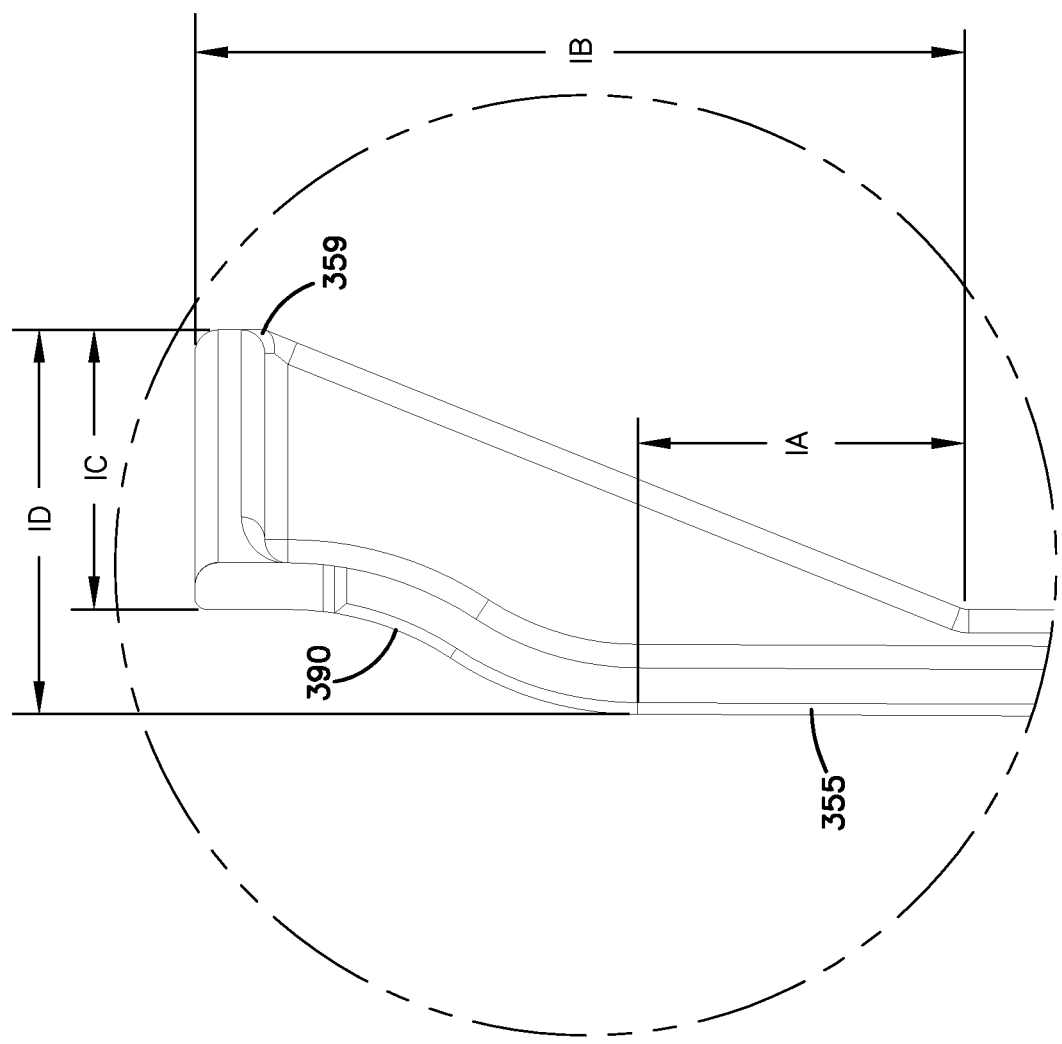
FIG. 40 is a schematic enlarged fragmentary view of an identified portion of FIG. 39.

In FIG. 40, an enlarged fragmentary view of a selected portion of FIG. 39 is shown. Flange 359 is viewable positioned and configured to define, gap 390. Some example dimensions for an example system are provided as follows: IA=14 mm; IB=33 mm; IC=12 mm; and, ID=16.5 mm. Of course the dimensions can be varied.

Figure 41:
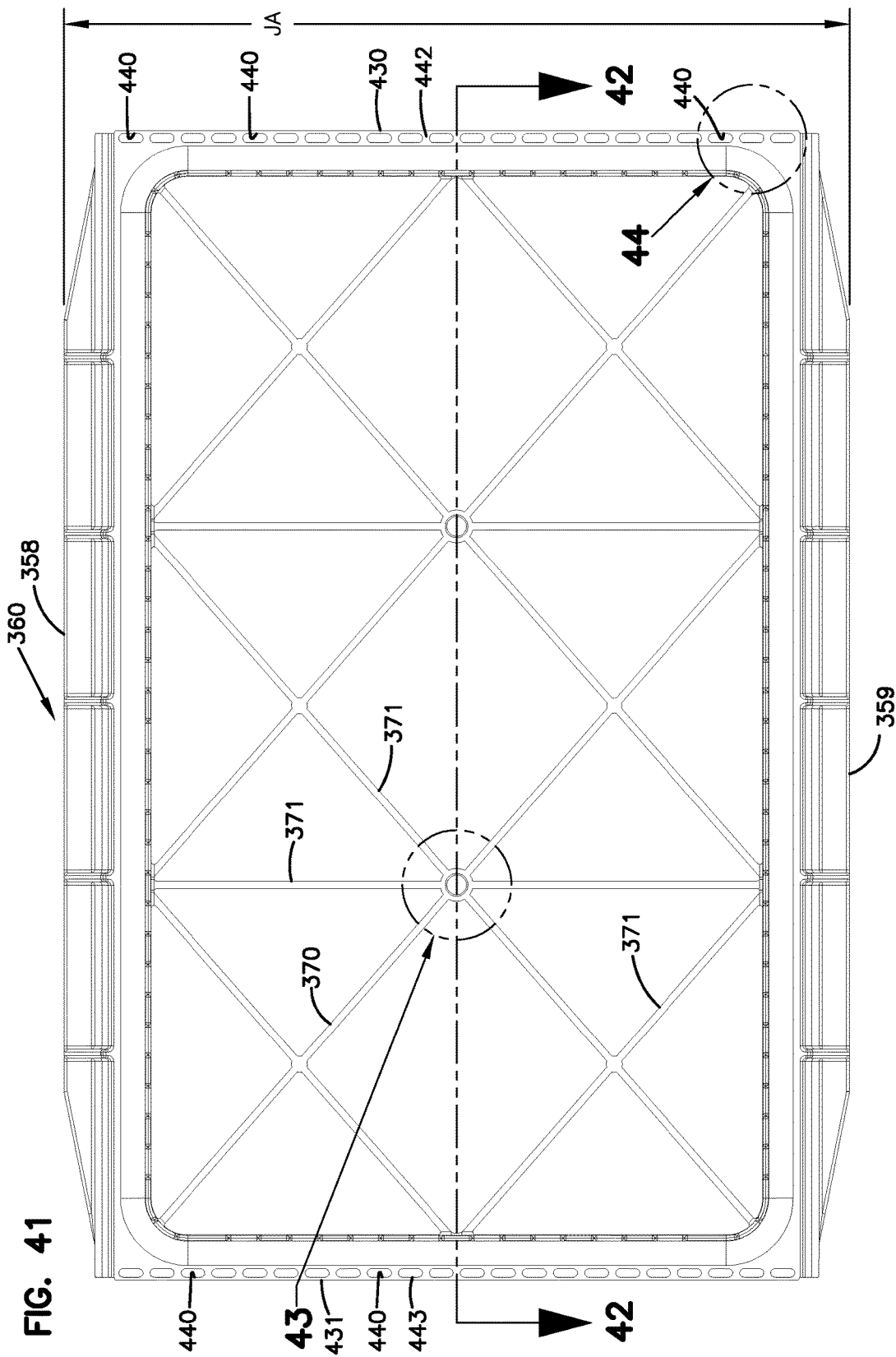
FIG. 41 is a second schematic, outlet, perspective view of the shell component of FIG. 34; the view of FIG. 41 generally corresponding to the view of FIG. 38.

In FIG. 41, a second plan view, analogous to FIG. 38, is provided. An example dimension is indicated as follows: JA=258 mm.

Figure 42A:
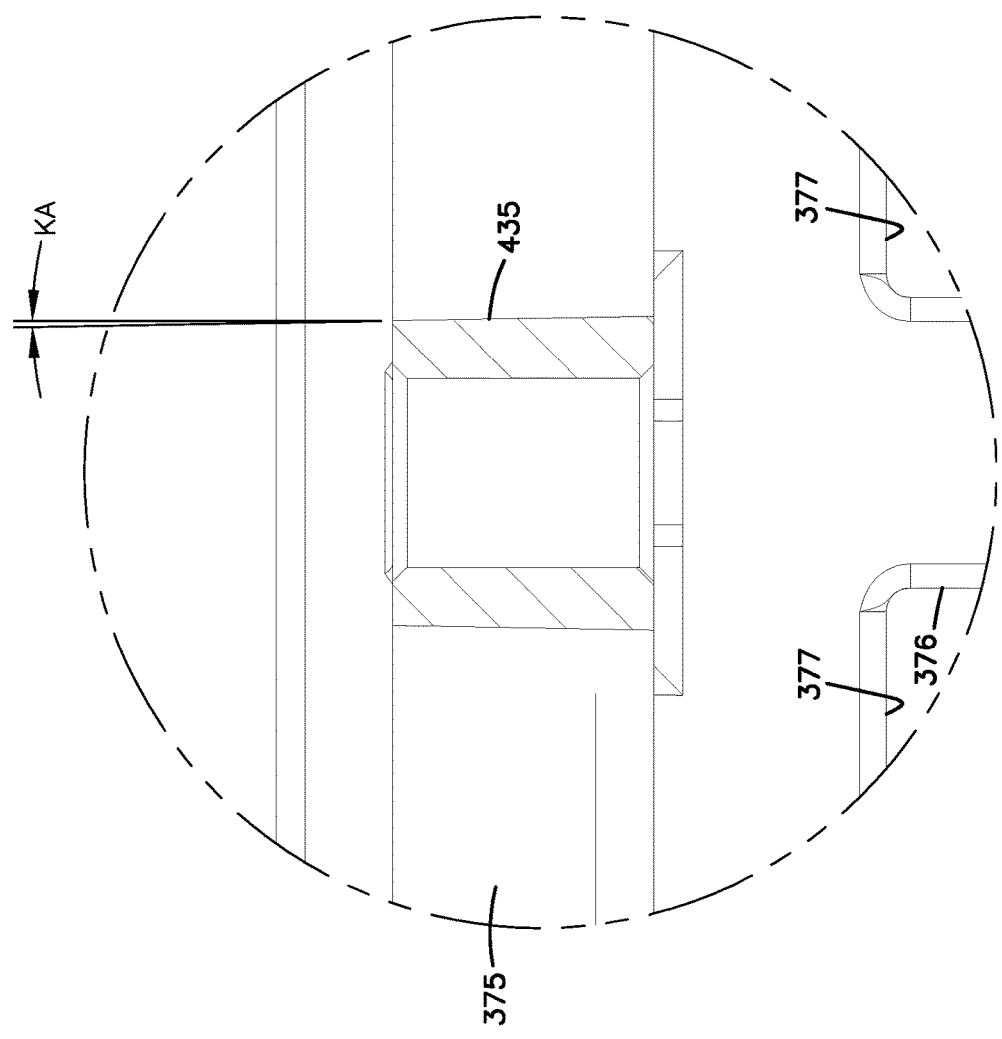
FIG. 42A is an enlarged schematic, fragmentary view of a identified portion of FIG. 42.

In FIG. 42, a cross-sectional view generally taken along line 42-42, FIG. 41, is provided. In FIG. 42A, an enlarged fragmentary view of a portion of 42 is provided. Here a cross-section of one of joint 435 of strips 371 is viewable. An indicated angle is as follows: –KA=1°.

Figure 43:
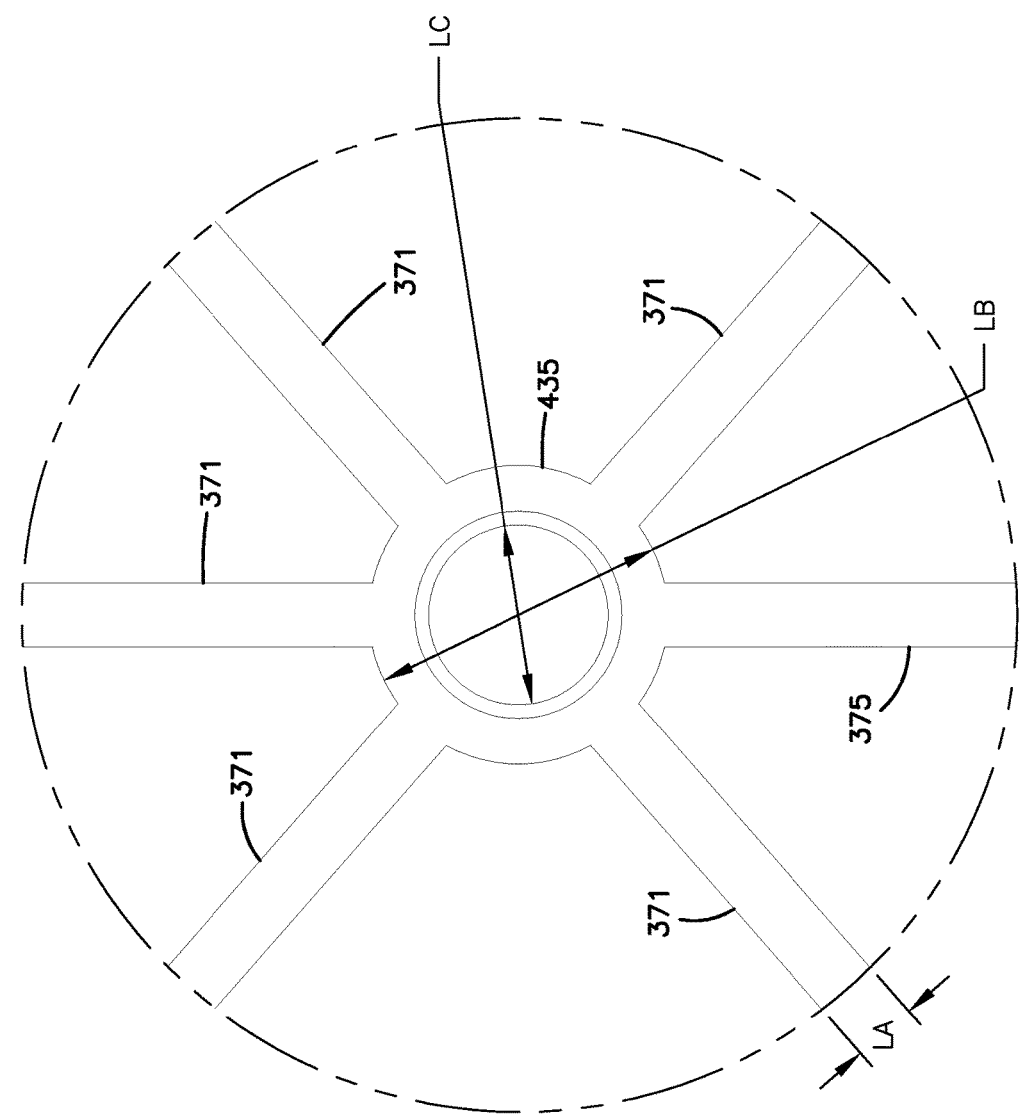
FIG. 43 is an enlarged, schematic, fragmentary view of an identified portion of FIG. 41.

In FIG. 43, an enlarged fragmentary view of an identified portion of FIG. 41 is shown; the portion depicted comprising a joint 435 of strips 371. Some example dimensions are provided in FIG. 43 as follows: LA=2.3 mm; LB=10.8 mm diameter; LC=6.5 mm diameter.

Figure 44:
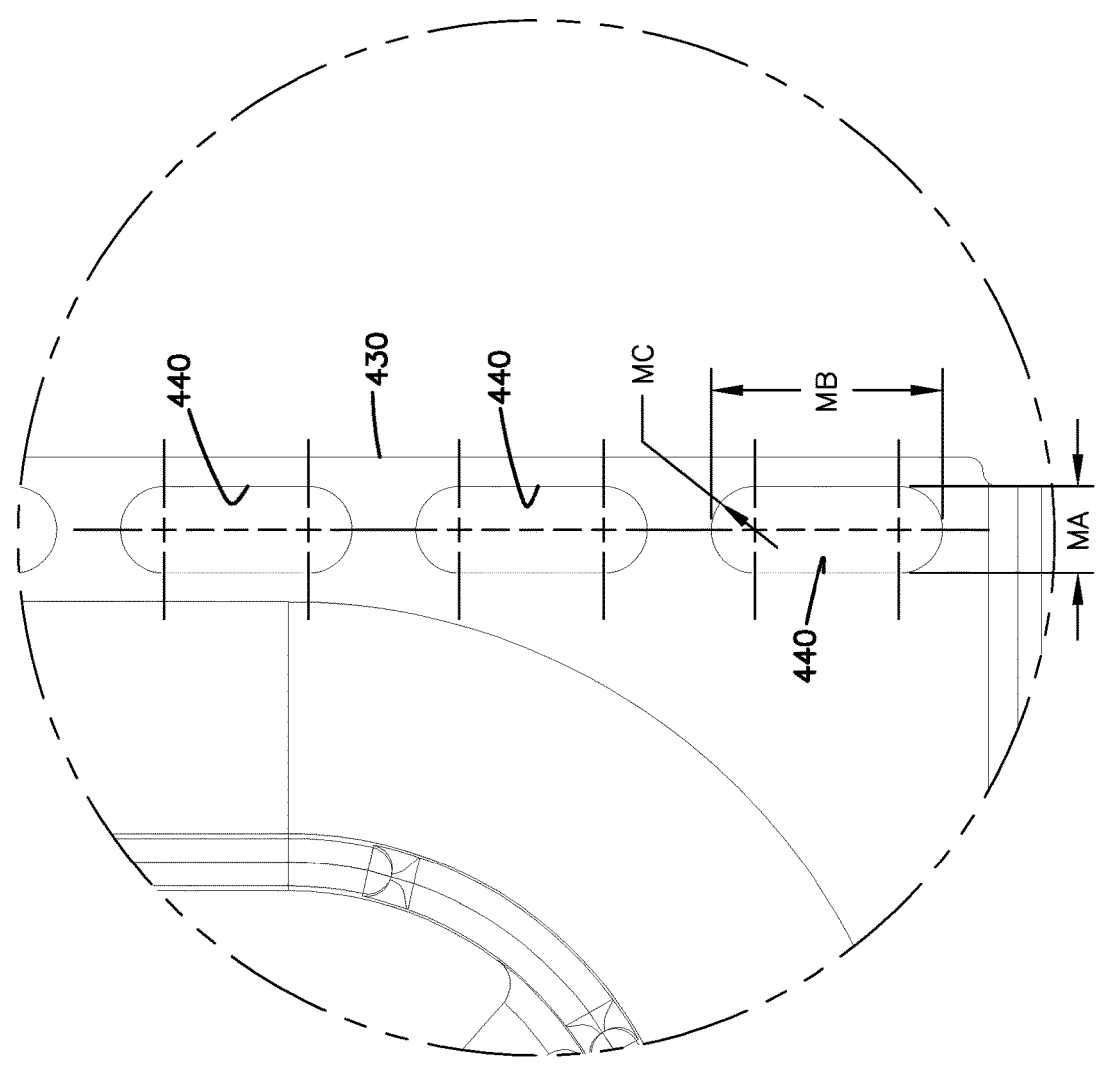
FIG. 44 is an enlarged schematic fragmentary view of a second identified portion of FIG. 41.

FIG. 44 is an enlarged fragmentary view of an identified portion of FIG. 41. Apertures 440 are depicted. In general, referring to FIG. 41, apertures 440 extend along base regions 442, 443 at opposite open ends 430, 431.

In FIG. 44, some example dimensions are provided as follows: MA=3 mm; MB=8 mm; and, MC=1.5 mm radius.

Manufacture of example cartridge 302 using shell 360 would generally be as follows. The shell 360 would be pre-formed, for example molded from a plastic. A blocked, stacked, media pack 330 of appropriate size would be formed, for example from strips of single facer and, for example, generally in accord with descriptions above for FIGS. 1-6. The media pack 330 would be inserted into interior 446 of shell 360, FIGS. 34 and 35. The media pack 330 would be positioned with an inlet face adjacent 331 flanges 358, 359, and an outlet face 332 adjacent (facing) support grid 370.

Sealant would be positioned in gaps 390, 391, FIG. 29, between the flanges 358, 359 and the media pack 330, adjacent end face 331. This sealant would seal against air flow around the media pack 330 between the opposite sides 354, 355 of the shell 360.

Referring to FIG. 36, the opposite open ends 430, 431 of the shell 360, and opposite ends 334, 335 of the media pack 330 (FIG. 19) adjacent the ends (430, 431) of the shell 360 would be potted in molded-in-place end pieces corresponding to end pieces 352a, 353a, FIG. 15, respectively. These molded-in-place pieces will typically comprise molded-in-place, foamed, polyurethane. The polyurethane will preferably be molded to an as molded density of no greater than 30 lbs/cu. ft. (0.46 g/cc), typically no greater than 15 lbs/cu. ft. (0.24 g/cc) and sometimes no greater than 10 lbs. cu. ft. (0.16 g/cc); and, a hardness Shore A of no greater than 30, typically no greater than 25 and often within the range of 12-20, inclusive. A similar material can be used for seal material 341.

It is noted that during the molding of end pieces 352a, 353a the resin will be allowed to flow through apertures 440, to provide for a mechanical connection.

In a final step of assembly, projection arrangement 375 will be inserted in a mold containing resin appropriate for molding in place seal member 365. Such a seal member, for example, can comprise a foamed polyurethane generally as characterized above.

It is noted that an alternate specific order of steps could be conducted.

Figure 45:
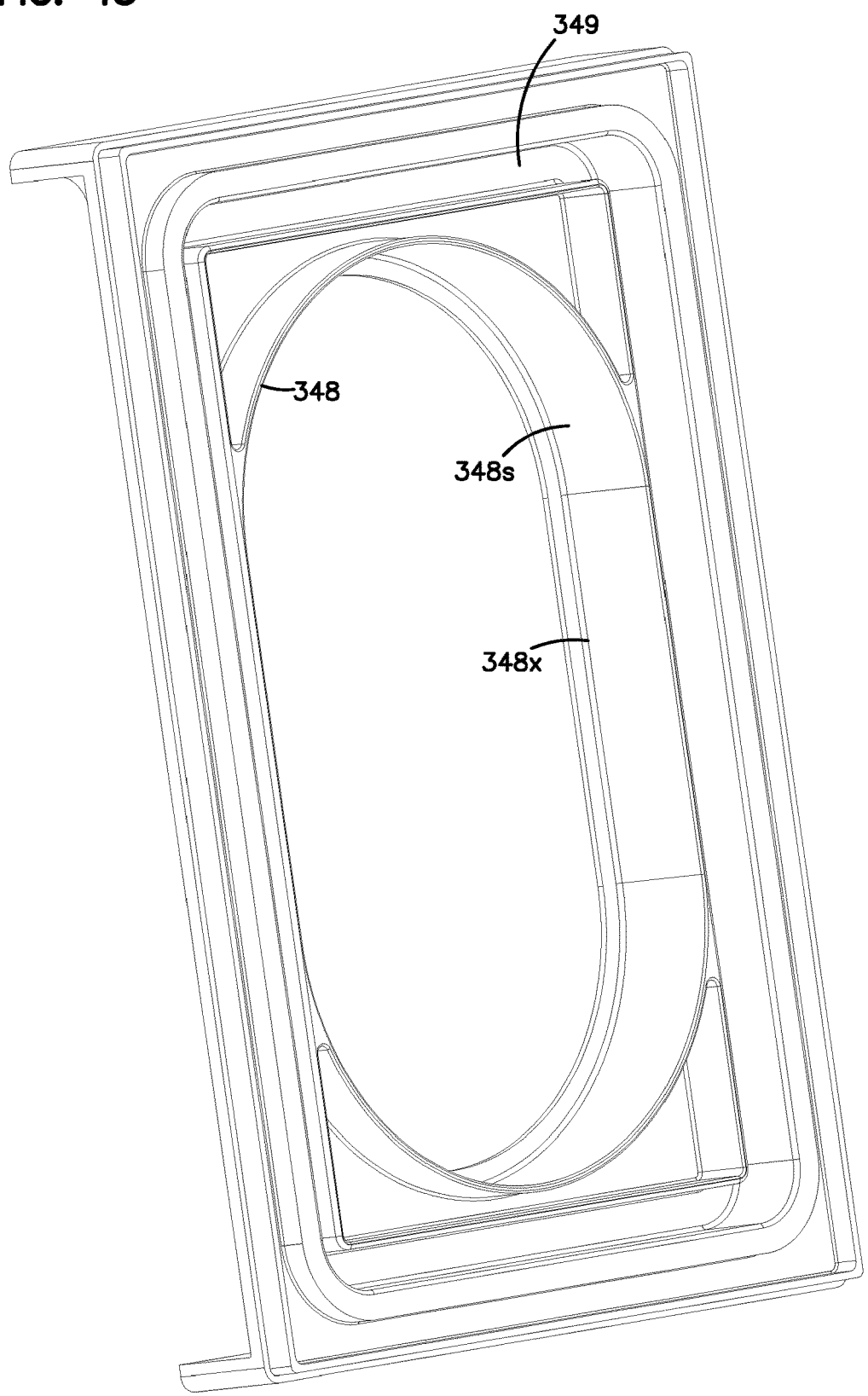
FIG. 45 is a schematic fragmentary inside view of a housing outlet end section for the air cleaner of FIG. 7.
Figure 46:
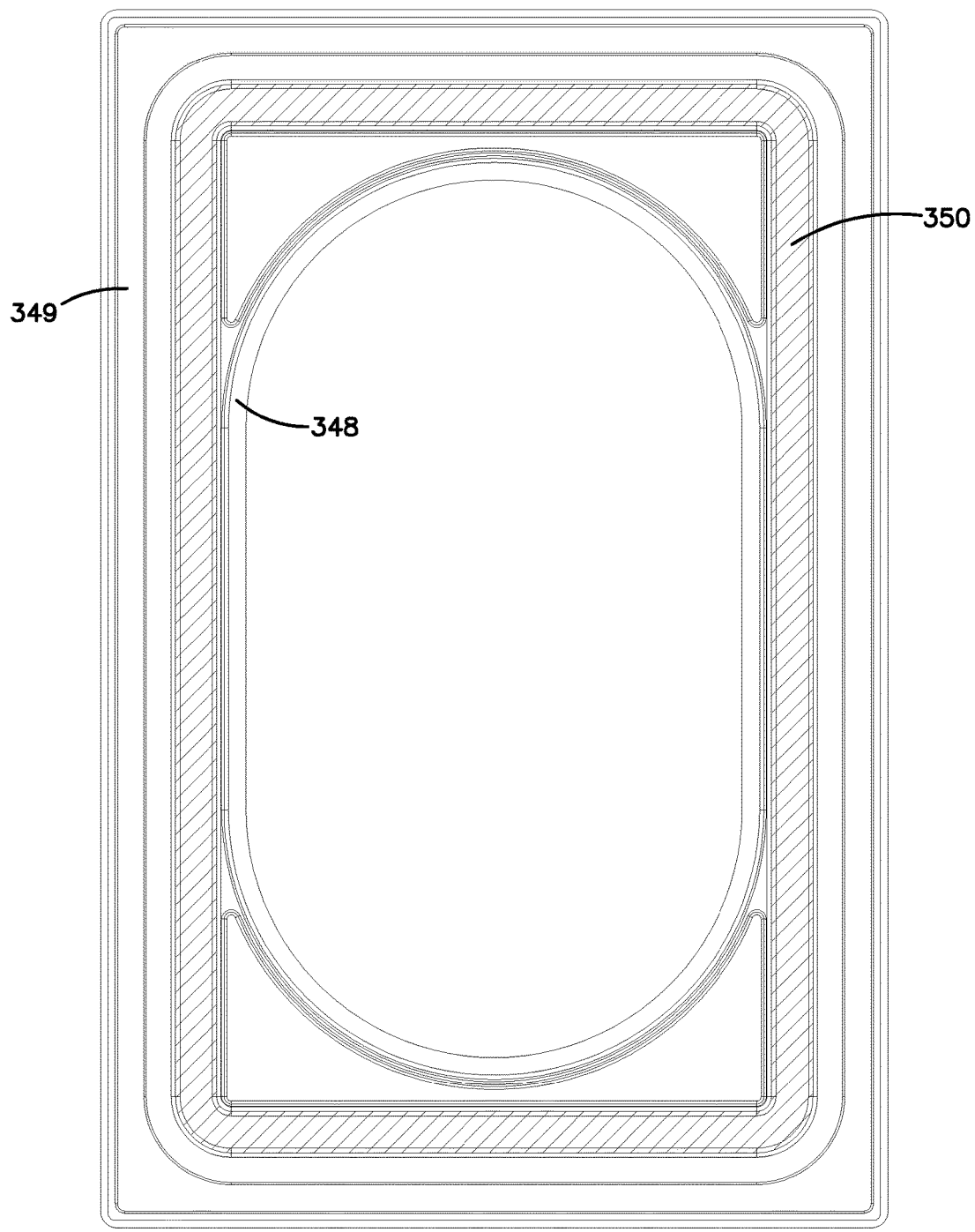
FIG. 46 is a schematic inside plan view of the housing outlet end section of FIG. 45.

E. Selected Further Detail Regarding the Housing End Wall 349, Aperture 348, and a Safety Cartridge In FIG. 45, an inside perspective view of end wall 349 and aperture 348 is viewable. In FIG. 46, an inside plan view is shown, with seal groove 350 shown in cross-hatch lines.

Figure 47:
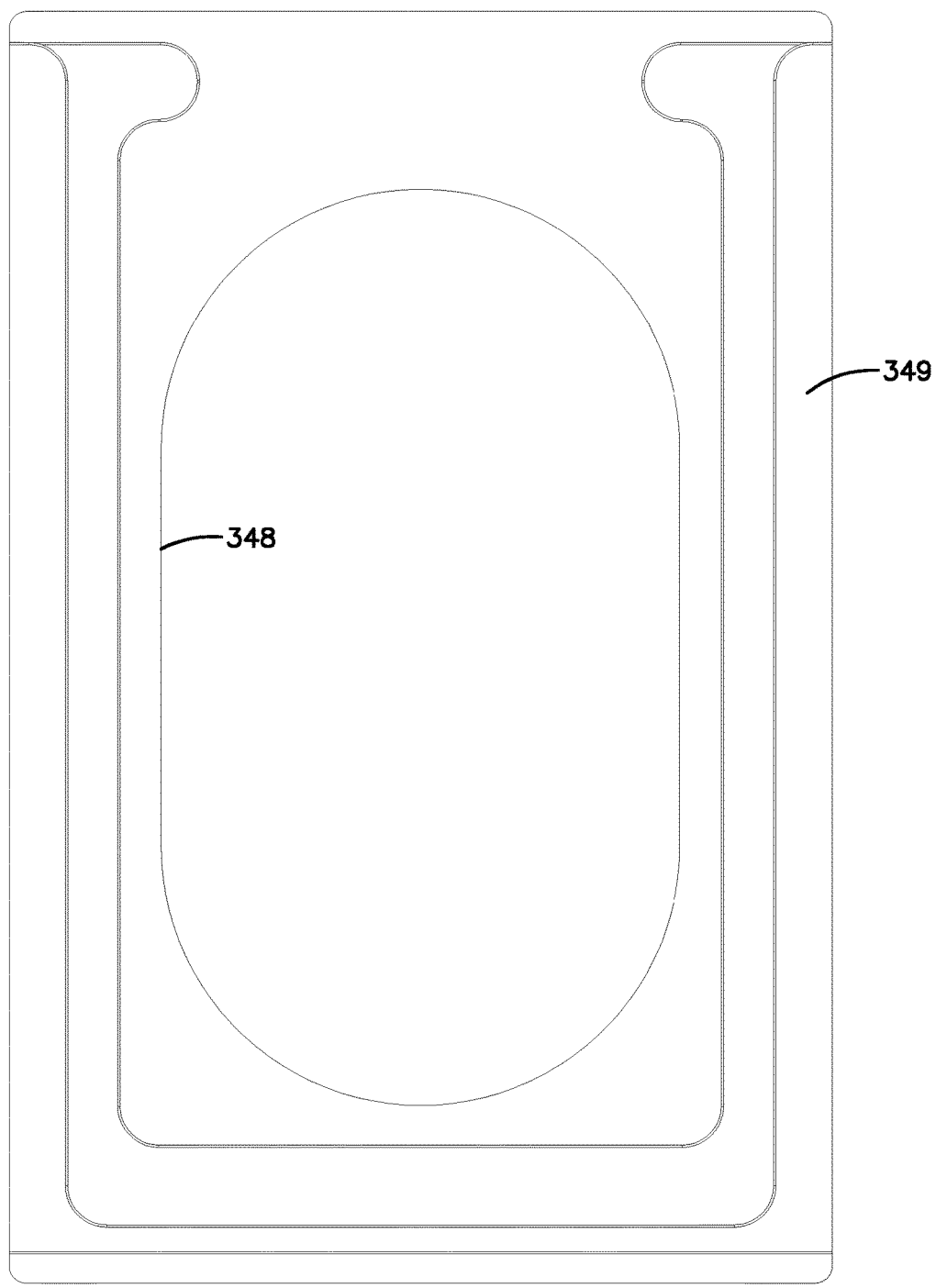
FIG. 47 is a schematic outside plan view of the housing outlet end section of FIG. 45.

In FIG. 47, an outside view of end wall 349 is provided.

Figure 48:
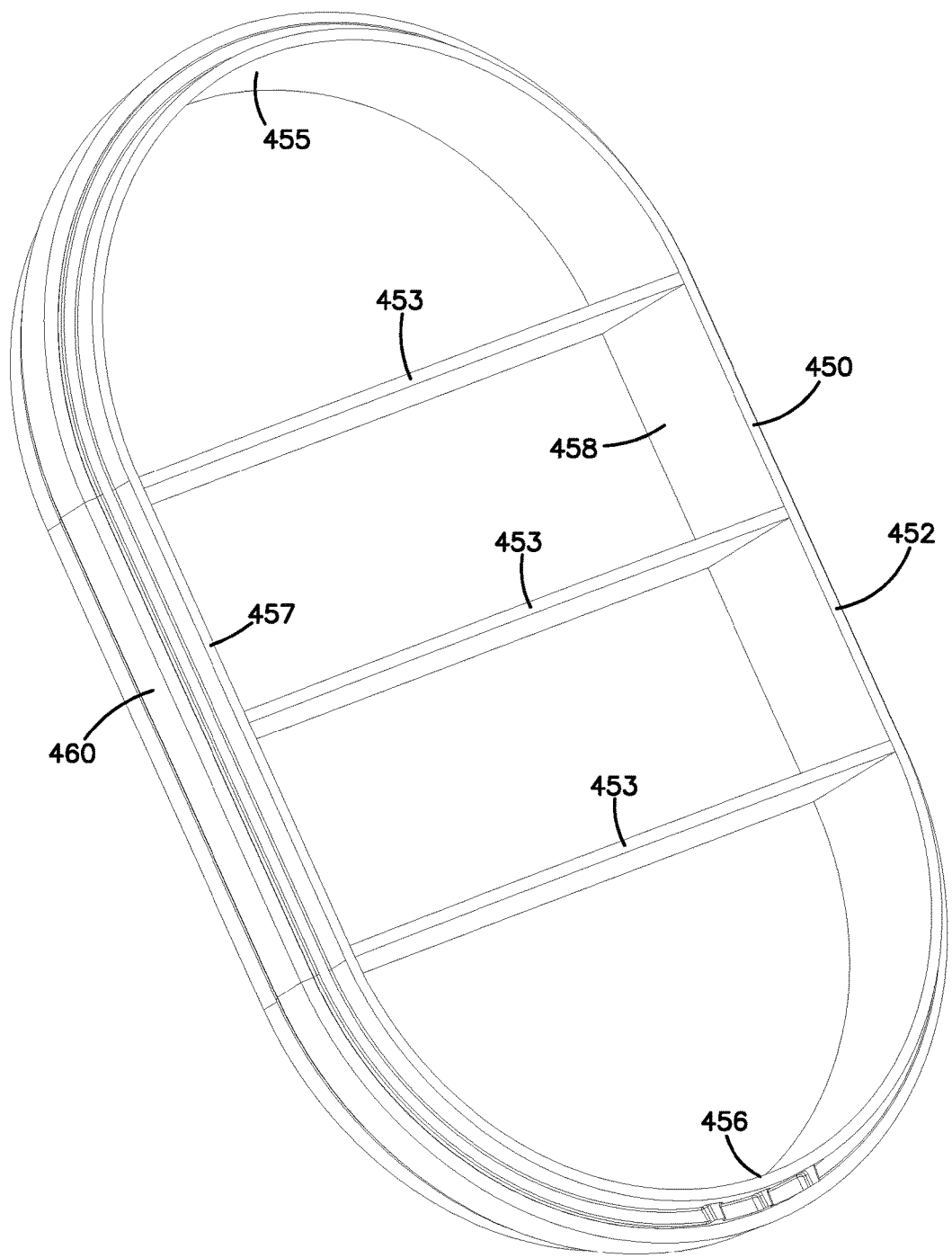
FIG. 48 is a schematic perspective view of a frame piece for a safety cartridge usable in the air cleaner assembly of FIG. 7.
Figure 49:
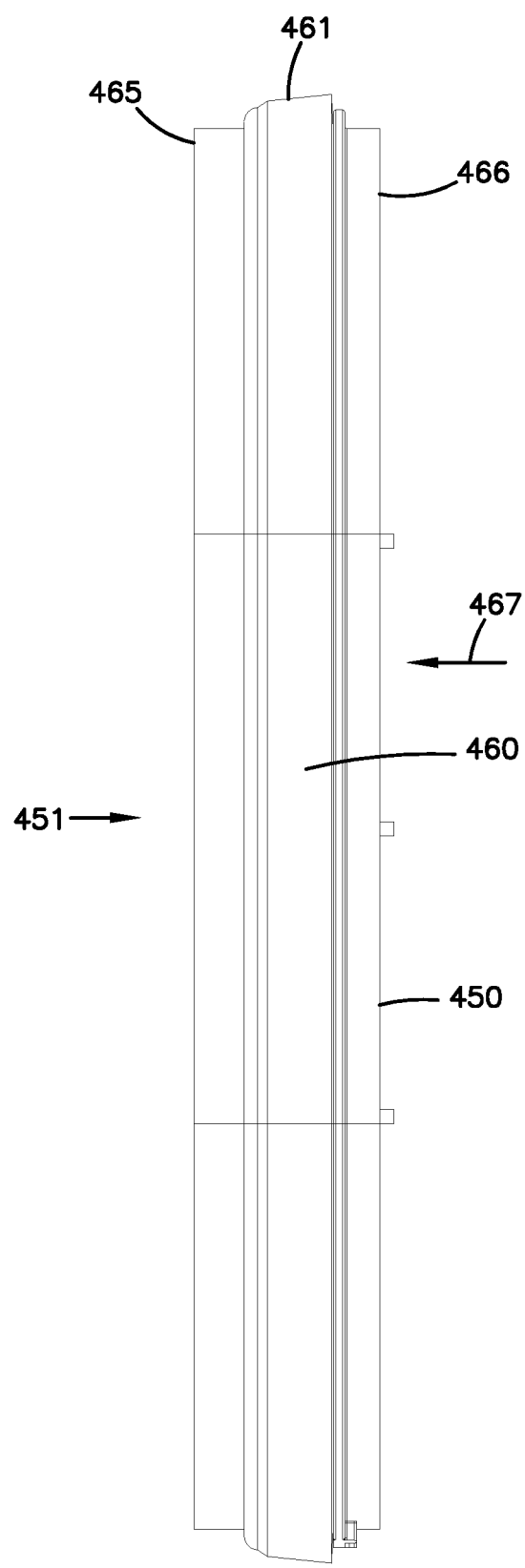
FIG. 49 is a schematic side elevational view of a safety cartridge using the frame piece depicted in FIG. 48.

In FIG. 48, a perspective view of a frame member 450 for a safety cartridge 451, FIG. 49, is depicted. Typically, the example frame member 450 will include an outer frame 452 having strengthening extensions 453 extending thereacross. The particular frame member 452 depicted, comprises opposite curved ends 455, 456 with a pair of opposite sides 457, 458 extending therebetween. In a typical safety cartridge, a pleated media pack, not shown, would be positioned within frame 430.

The frame member 450 is provided with a seal member 460 extending therearound.

Referring to FIG. 49, a side elevational view of safety cartridge 451 is provided. with seal member 460 extending therearound. The seal member 460 defines an outwardly projecting, slanted surface 461, tapering downwardly toward side 465 of frame 450 from an edge toward side 466. Typically, safety cartridge 451, comprising a frame piece 450 and media therein, would be pushed into a seal location, in the direction of arrow 467.

Referring back to FIG. 45, the safety cartridge 451 is sized and configured to be inserted into (or over) outlet aperture 348, with seal member 460 engaging side wall 348s of aperture 348. Aperture 348 includes end stop 348x, to provide an end stop to insertion of safety cartridge 451.

It is noted that air cleaner assembly 300 could be used without a safety cartridge, and could be configured for use with an alternate safety cartridge. Indeed, in some instances, the air cleaner assembly 300 can be configured with a second groove, analogous to seal groove 350, configured to receive seal member generally analogous to a seal member 365, on a safety cartridge.

F. Certain Problems Addressed by the Features Characterized Above

The features characterized above, relate to the addressing a number of issues concerning filter assemblies using fluted media extending between opposite and inlet and outlet flow faces, for example fluted media comprising a stack of strips; each strip comprising a single facer strip of fluted media secured to a facing sheet with appropriate sealing. In many prior systems, housing seal arrangements used stacked media packs comprising radial flanges configured to be pinched, axially, between housing sections. On the other hand, radial type seals have also been used, see for example WO 2004/071616 incorporated herein by reference. In contrast, at least preferred applications of systems according to the present disclosure relate to the presentation of a radial type seal and frame in which the seal is compressed within a housing groove, from both sides.

Although the previously described figures depict a metal assembly for a housing, it is anticipated that typically the housing will be a molded plastic unit. When molded plastic housings are used, there can be problems with deformation, during plastic molding, of certain features. When those features are designed to operate as sealing surfaces, deformation can be a problem. Especially when the sealing surfaces are extended straight surfaces, any deformation can cause a problem in seal integrity, when the deformation occurs in a surface against which a seal is to be formed. This is a problem as the length of the straight housing surface, against which a cartridge seal is to be pressed when installed, exceeds about 6 inches (152 mm) and is exacerbated at increasing lengths, for example 10 inches (254 mm) or greater.

Of course, air cleaner housings typically have covers that open for access to the cartridge. A common practice is to use a pinch seal gasket for this type of application. However, a pinch seal that relies on a cover to close and compress the gasket is vulnerable to the tolerances of the closure fit and the reliability of the closure to maintain compression when the assembly experiences shock and vibration forces.

To address the limitation of pinch type seals, radial seals have been developed; however these have most often been implemented in coiled arrangements, although they have been depicted for other units, see WO 2004/071616, referenced above. With coiled arrangements sealing is against round housing surfaces involved, which is not as subject to undesirable levels of deformation during cooling, as are relatively long straight housing surfaces.

Thus, the problem of developing a housing surface which is desirable for use as a housing seal surface for engagement by the compressive forces of a radial seal, is exacerbated as the surface needs to be straight; and, is further exacerbated as the surface needs to be long.

Radial seals rely on a substantial amount of compression maintained between the seal frame and side walls of the housing. In order for the seal to be maintained, the walls of the air cleaner housing need to have a substantial structural construction to prevent the side walls of the housing from bowing out from the compression forces and losing the force needed to maintain the seal.

Additionally, radial seals are sensitive to the dimensional tolerances of the seal frame and housing components, to maintain the proper dimensions for seal compression. These tolerances are typically proportional to the overall dimension of the parts, and, again, become much more problematic with largest component sizes.

The type of seal, involving a seal member directed into a seal groove, of a double sided gasket on the housing seal member, as described above, especially in connection with the FIG. 30 provides the following attributes.

First, the gasket seal is accompanied by radial forces that are not dependent on closure fit when an air cleaner cover made to the housing. This allows for modification in closure engagement shape, for convenient opening and access with respect to the equipment with which the air cleaner is to be used.

A seal arrangement with compressive forces against opposite sides, imposes opposite forces on the side walls of the groove. The need for substantial structural construction of the housing is reduced, since the radially directed seal forces are contained within a narrow channel of a groove.

Seal face to seal face dimension of the groove can be maintained to a much tighter tolerance, because the relative dimensions are relatively small. This is by comparison to the dimension entirely across an outer periphery of a seal member.

For the particular example depicted, the groove seal provides two distinct, opposite, seal faces. Alternatives are possible, as will be understood from certain each of the embodiments described below.

The seal support for a groove seal of the type characterized above, is intended to have as certain structural characteristics:

(a) A rigid beam strength in the axis that imposes the force to insert the gasket into the groove. This is to ensure that the gasket is fully inserted in the groove.

(b) A pliable, or flexible, beam strength when the axis is perpendicular to the beam, where side to side sealing forces are imposed. This is to enable the gasket to conform to manufacture deformation variability in the side walls of the housing groove. The seal frame is intended to be allowed to "float" in this axis and to rely on the gasket sealing forces to center it in the groove of the air cleaner housing.

Alternately stated, seal supports of projection 375 are built to be somewhat flexible in directions perpendicular to the length of the supports. This flexibility can be provided by: the selected material from which the shell portion 375 is made; the selected thickness of the shell portion 375 in a direction between opposite sides thereof; and, the configuration of the shell portion 375, which allows for flexibility.

In general, with a media pack comprising strips of media, the media pack configuration will typically be a blocked, stacked, rectangular square configuration. Typically, as a result, a convenient seal perimeter shape will be one with a first pair of opposite sides and second pair of opposite sides, typically comprising a square or rectangular shape with the sides being straight. With such a configuration, it is desirable that: the seal support embedded in the seal member has a first pair of opposite (typically straight) sides; and, a second pair of opposite (typically straight) sides (ends); with corners between the adjacent sides being open, i.e. not bridged or connected for strength. This means that the individual sides of the seal support can flex somewhat, independently of one another. It is further desirable that various sides of the seal support embedded within the seal material are not supported by gussets or struts, to inhibit flexing. To facilitate flexing along the length of each of the seal support sides, the various sides of the portion of the seal support embedded within the seal member, are configured with gaps therein, i.e. each side includes tabs. This is particularly desirable on longer sides, especially ones exceeding about 10 inches (254 mm) in length, however, it can be used for shorter sides also, as shown.

IV. Some Alternate Embodiments

A. A First Alternate Embodiment, FIGS. 50-54

In FIGS. 50-54, a first alternate embodiment for a filter cartridge usable with the housing 301 is depicted.

Figure 50:
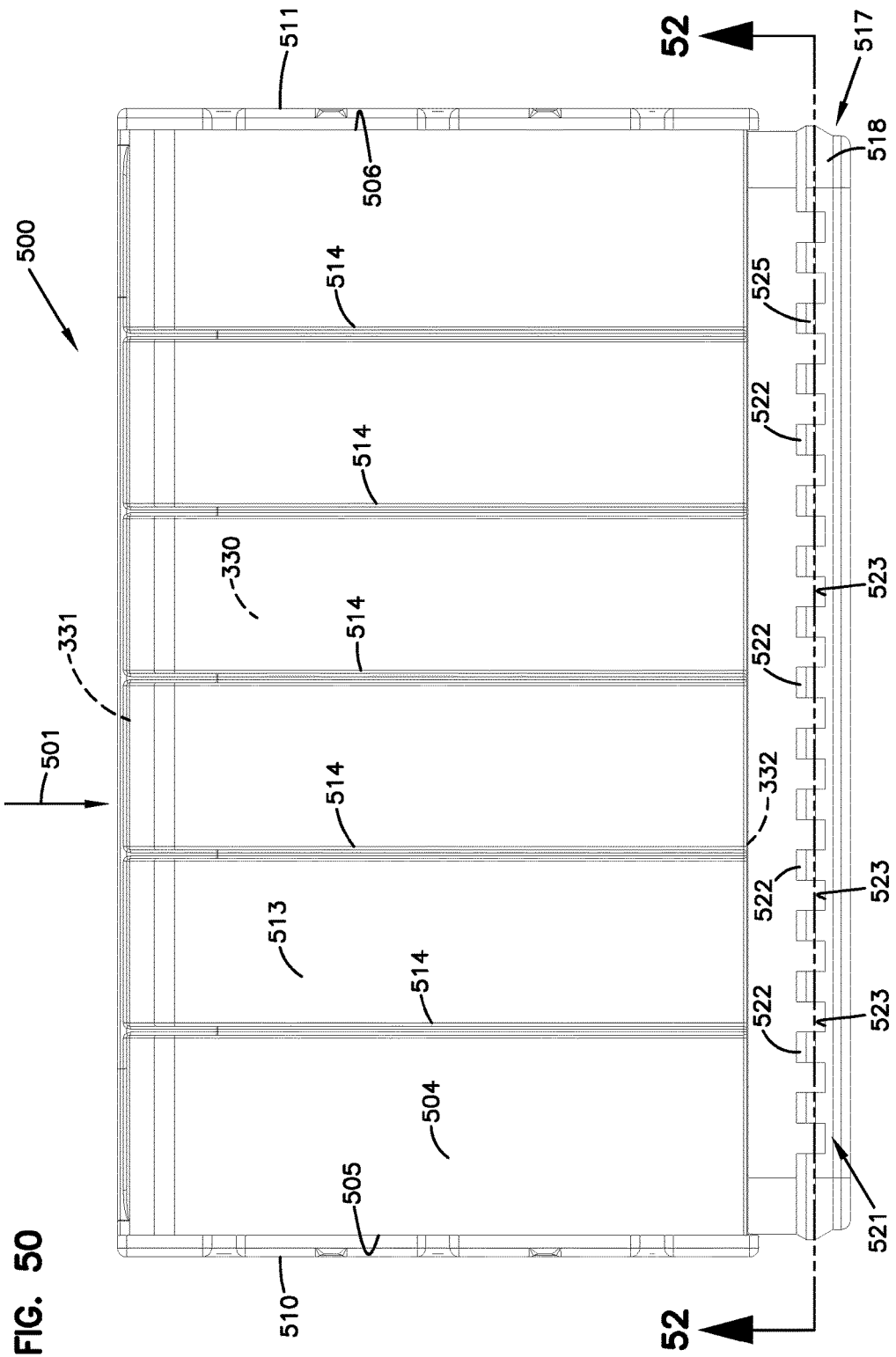
FIG. 50 is a schematic side elevational view of a first alternate filter cartridge usable in the air cleaner assembly of FIG. 7.

Attention is first directed to FIG. 50, a side elevational view of cartridge 500. Cartridge 500 would include a media pack analogous to media pack 330, discussed above. Air flow through cartridge 500, during filtering, would be in the general direction of arrow 501. Thus, the enclosed media pack 330 would have an inlet face 331 and outlet flow face 332. Cartridge 500 includes a shell 504 extending between open (side) ends 505, 506, the open ends 505, 506 being closed by molded-in-place side pieces 510, 511, respectively.

The shell 504 includes a first side 513 with ribs 514 thereon, and, typically an analogous second opposite side to side 513.

Housing seal arrangement 517 projects outwardly in a direction of air flow away from outlet end face 332. The housing seal arrangement 517 differs from the housing seal arrangement 340 for cartridge 302. In other manners, however, cartridge 500 is generally analogous to cartridge 302.

Figure 51:
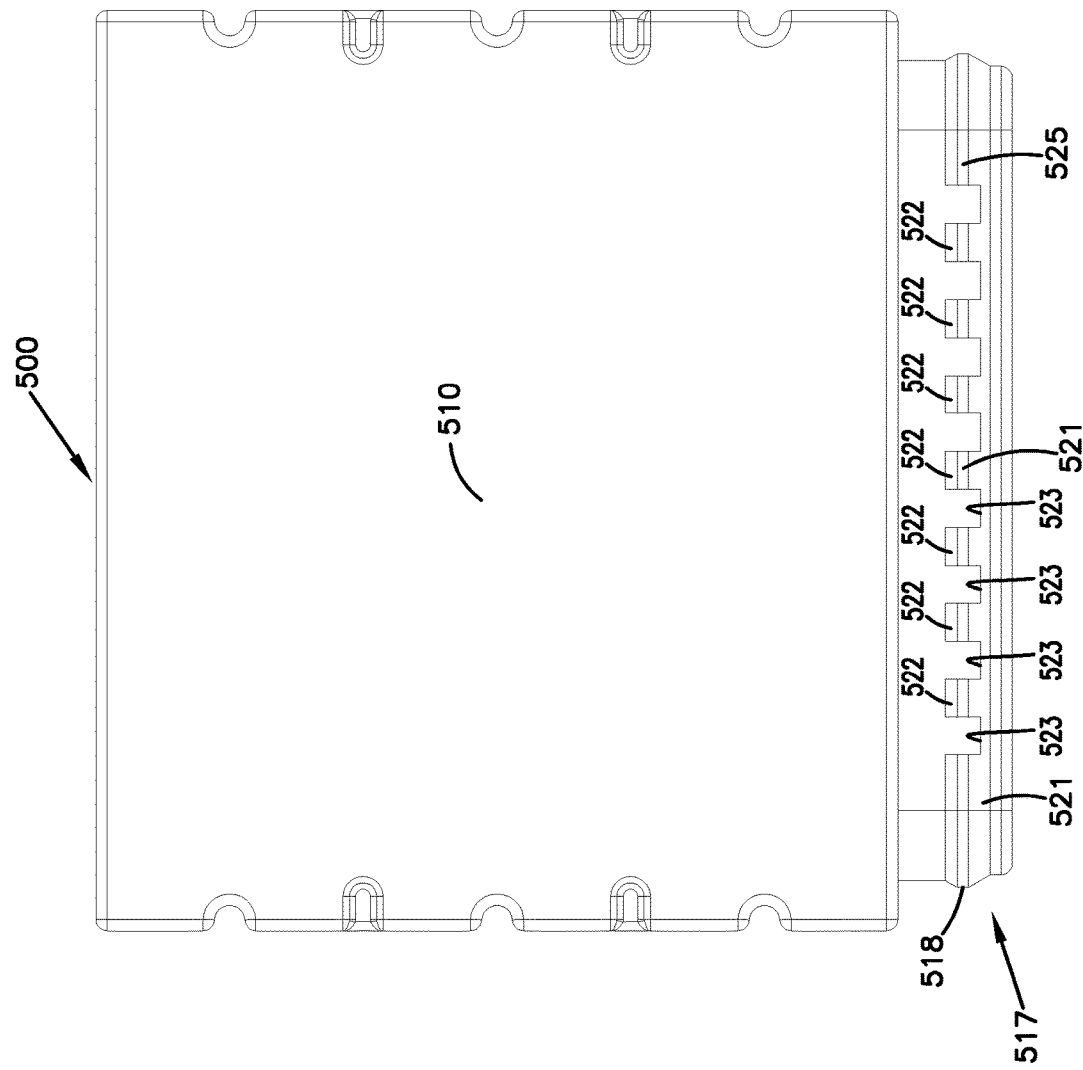
FIG. 51 is a schematic end elevational view of the cartridge depicted in FIG. 50.

Attention is now directed to FIG. 51, an end elevational view taken toward side piece 510.

Comparing FIGS. 50 and 51, it can be seen that an outer surface 521 of housing seal member 518 of housing seal arrangement 517 comprises a plurality of spaced sections 522, the sections 522 being spaced by gaps 523. Thus, outer surface 521 is not configured to form a housing seal. However the inner surface, not viewable in FIGS. 50 and 51, of housing seal arrangement 517 will generally be analogous to surface 402, FIG. 30, and would form an inwardly directed radial seal within groove 350.

Tab sections 522 will, however, press against an outer wall 396 of the groove 350, FIG. 33, providing for compression against the housing seal member 517 by both groove sides 395 and 396. This will ensure that sufficient compressive force is present, for forming the inwardly directed radial seal. However, the sections 522, with gaps 523, can be used to reduce the insertion and withdrawal force for the cartridge 500, with respect to the housing seal groove 350. It is noted that outer surface 521 can be provided with a cross-sectional configuration generally analogous to that of surface 401, FIG. 30. That is, longitudinal rib 525 can be present on inner surface 521; in this case, by comparison to FIG. 30, the rib 525 being discontinuous in extension around outer surface 521 of housing seal arrangement 517.

Figure 52:
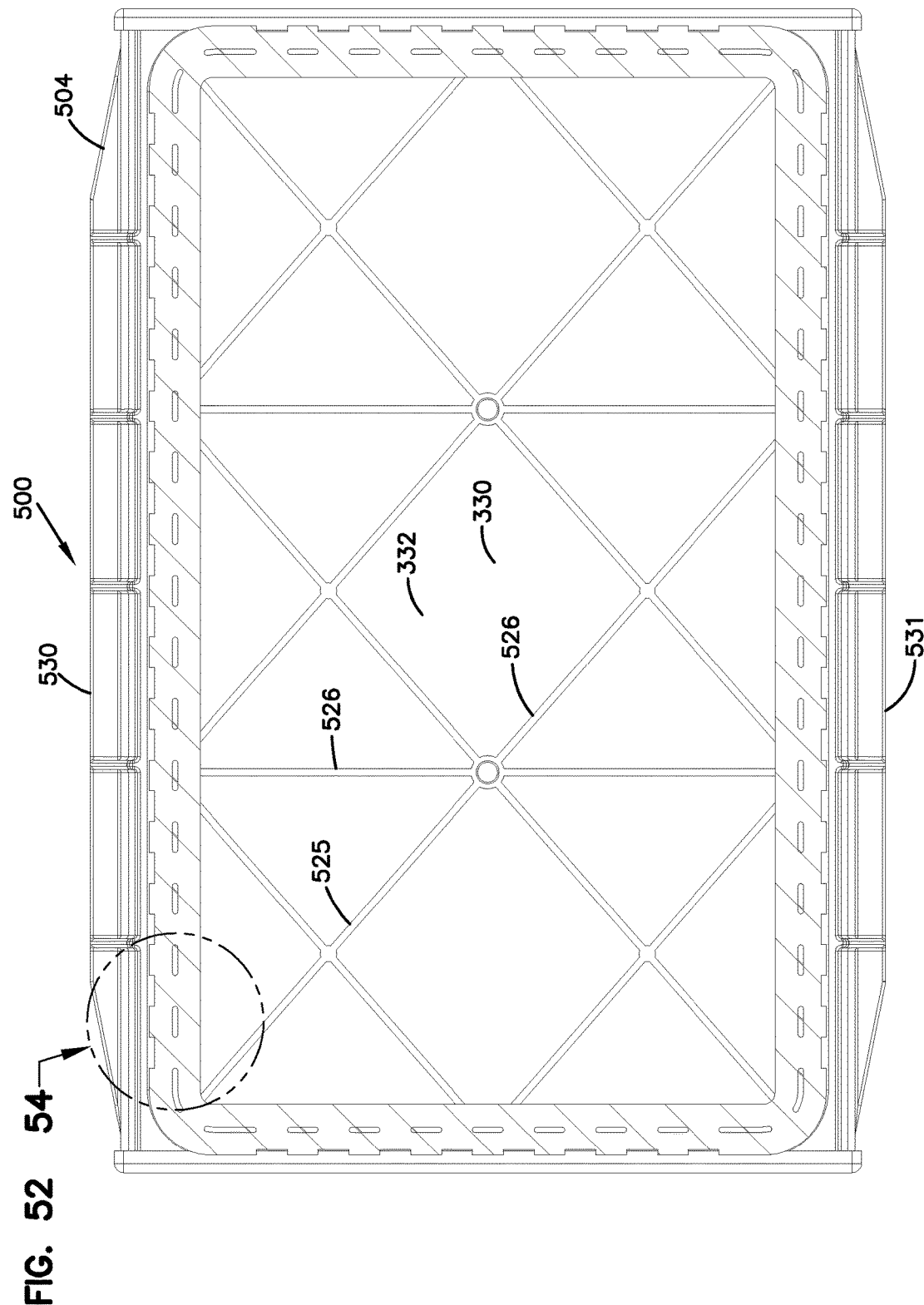
FIG. 52 is a schematic cross-sectional view taken along line 52-52, FIG. 50.

In FIG. 52, cross sectional view taken along line 52-52, in FIG. 50 is provided. Grid 525, comprising strips 526 is viewable, against outlet flow face 332 of media pack 330. Further, the shell 504, and thus the cartridge 500, can be seen to have outwardly directed flanges 530,531, analogous to flanges 358, 359.

Figure 53:
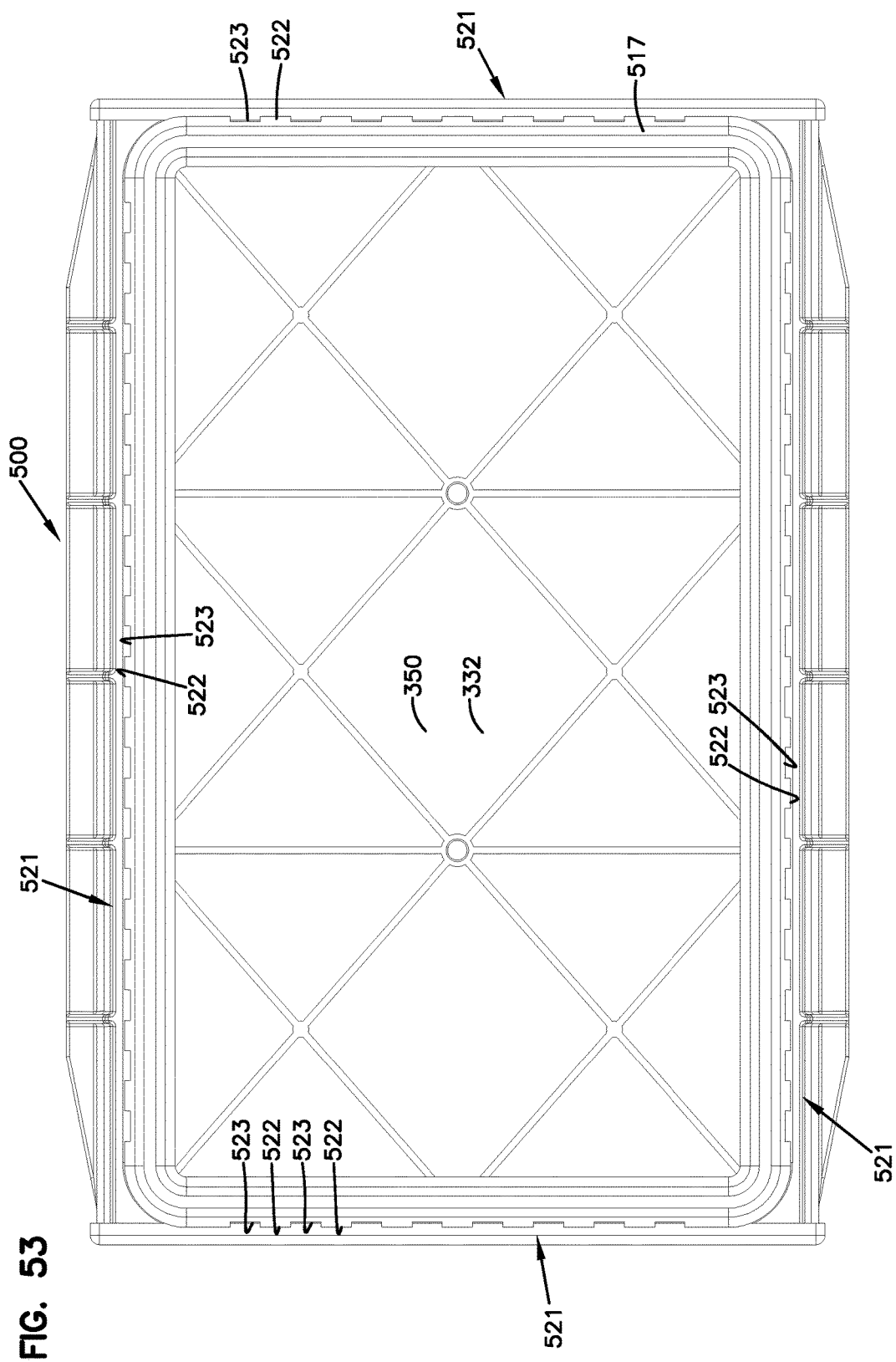
FIG. 53 is a schematic, outlet, plan view of the cartridge depicted in FIG. 50.

FIG. 53 is a plan view taken generally toward face 332.

Figure 54:
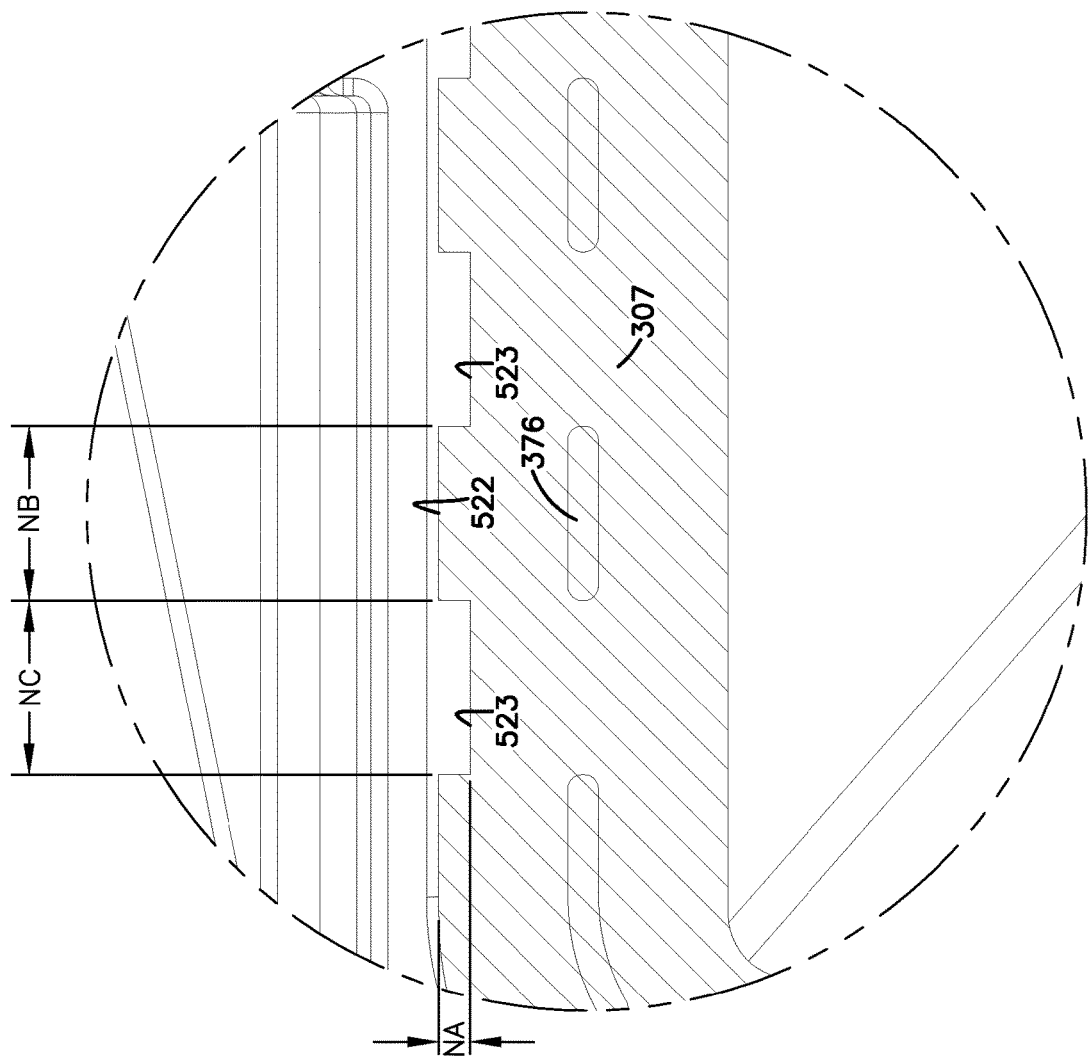
FIG. 54 is an enlarged schematic fragmentary view of an identified portion of FIG. 52.

FIG. 54 is an enlarged fragmentary view of an identified portion of FIG. 52. In FIG. 54, some example dimensions are shown as follows: NC=2-20 mm; NB=2-20 mm. Indeed, for the particular example depicted in FIG. 54, the seal material sections 522 overlap tabs 366, and the seal material gaps 523 overlap gaps 377.

In sum, then, cartridge 500 is generally analogous to cartridge 302, and can be manufactured in analogous manner. The basic difference relates to the outside surface of the housing seal member which is continuous for cartridge 302, and which is discontinuous for cartridge 502, see surface 521. This means the seal will not be formed against outer surface 396 of groove 350, FIG. 30, when cartridge 500 is installed, in contrast to cartridge 302. However spaced sections 522 in outer surface 521 will ensure that a compressive contact with outer surface of groove 350 is generated, to ensure a cross-sectional compression against housing seal arrangement 517. This will ensure a seal against inner surface 397 of groove 350.

It is noted that in the particular example cartridge 500, and in particular the housing seal arrangement 517, the various corners 528 of the housing seal arrangement 517 are continuous sections of seal material.

It is noted that in an alternate application of the techniques described with respect to FIGS. 50-54, an inner surface of the housing seal arrangement could be made discontinuous while the outer surface, corresponding to surface 521, would be made to be a continuous seal surface. In this instance, the housing seal would form against the outer surface 396 of the groove; and, the inner surface 397, of the groove 350 would be engaged by a discontinuous seal material provide compression within the groove 350, for operation of the seal.

Typically, if only one of the opposite surfaces of the seal member is configured to form a seal, within the groove 350, it will be preferred to select the radially inner surface to form that seal. A reason is that during shipping and handling, radially inwardly directed seal surfaces are more protected against damage. Also restriction forces against the media pack may tend to cause a restriction in the seal area, which will operate in favor of an inwardly directed radial seal.

B. A Second Alternate Cartridge Embodiment, FIGS. 55-57

Figure 55:
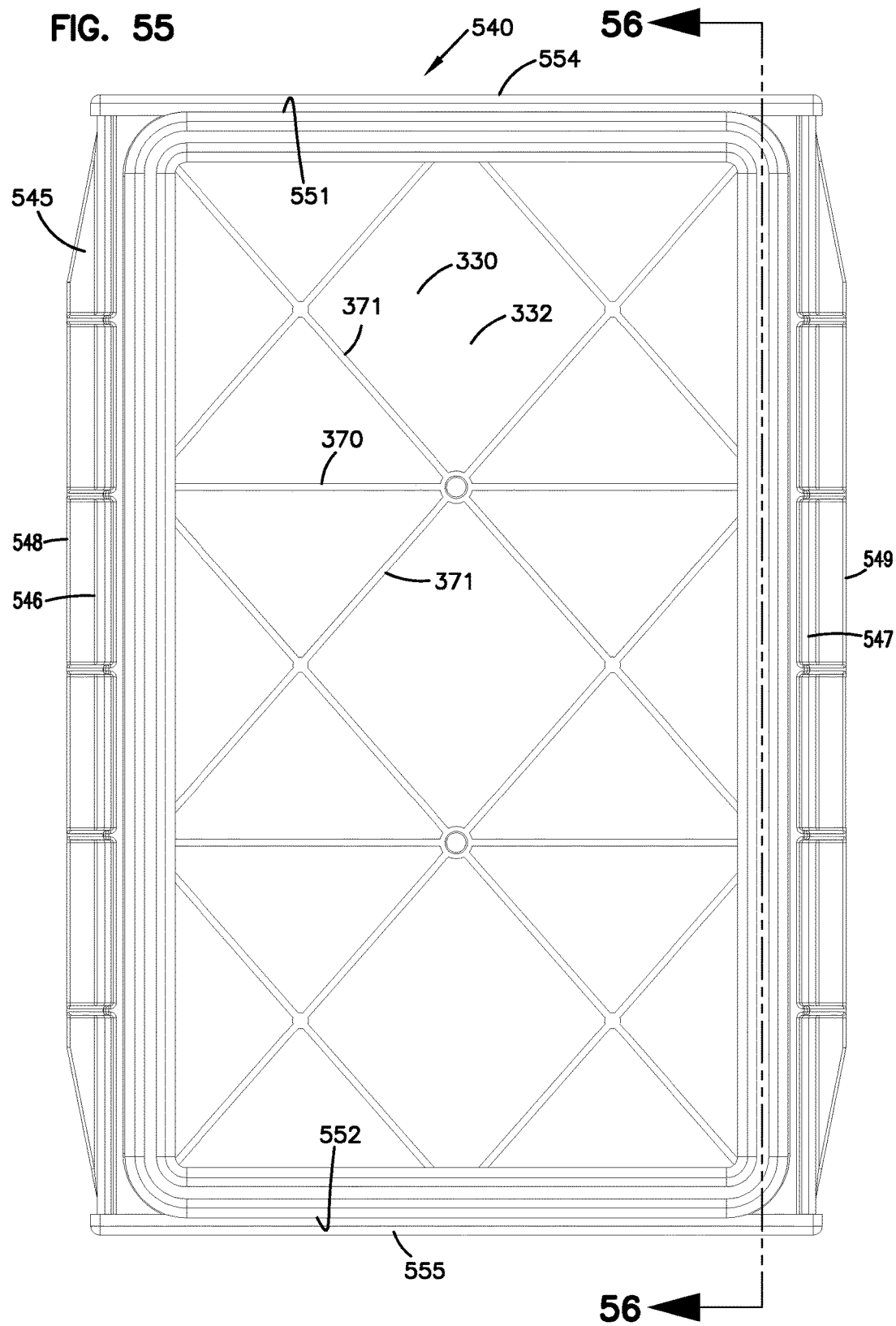
FIG. 55 is a schematic, outlet, plan view of a second alternate filter cartridge, usable in the air cleaner assembly of FIG. 7.
Figure 56:
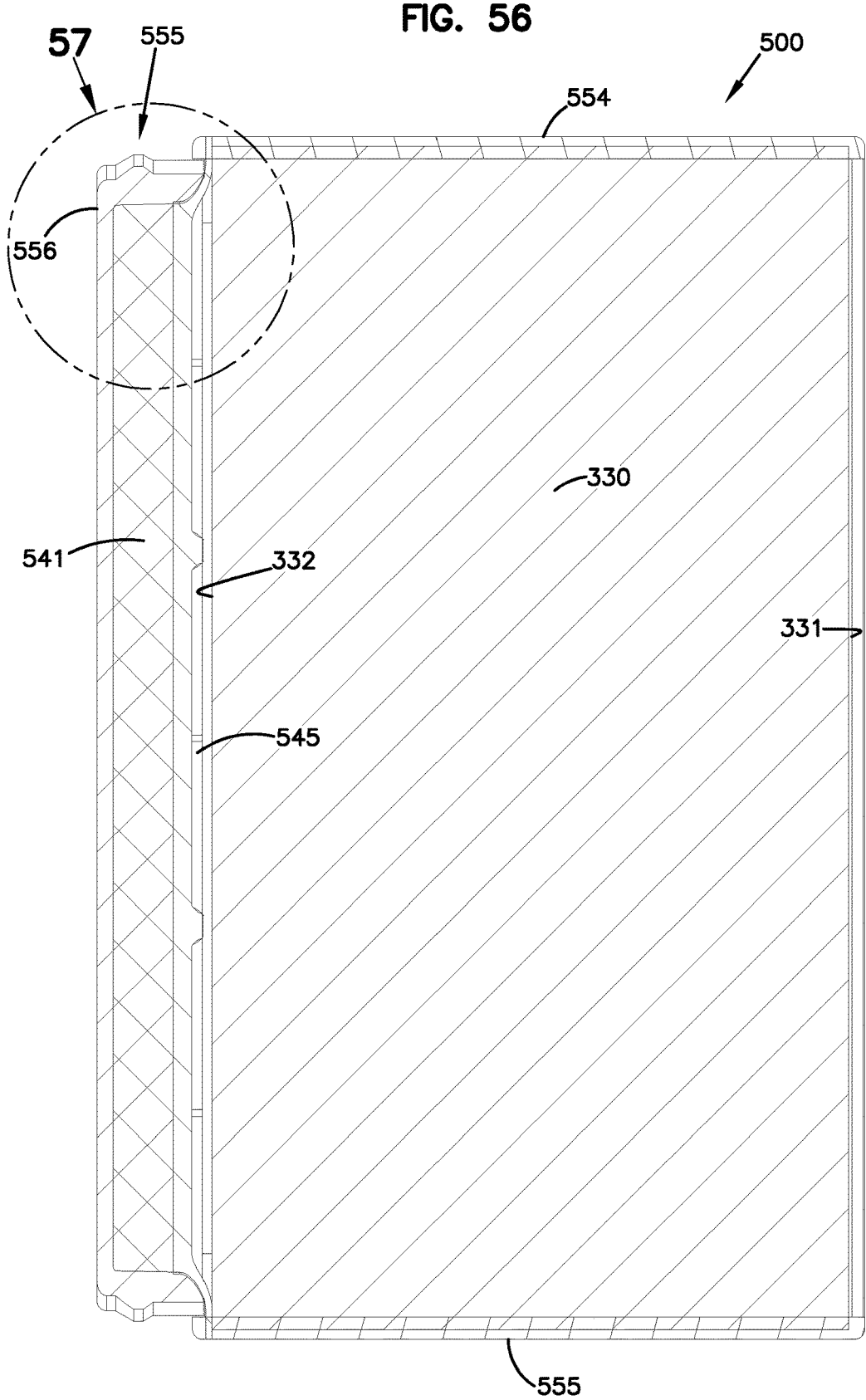
FIG. 56 is a schematic cross-sectional view taken along line 56-56, FIG. 55.
Figure 57:
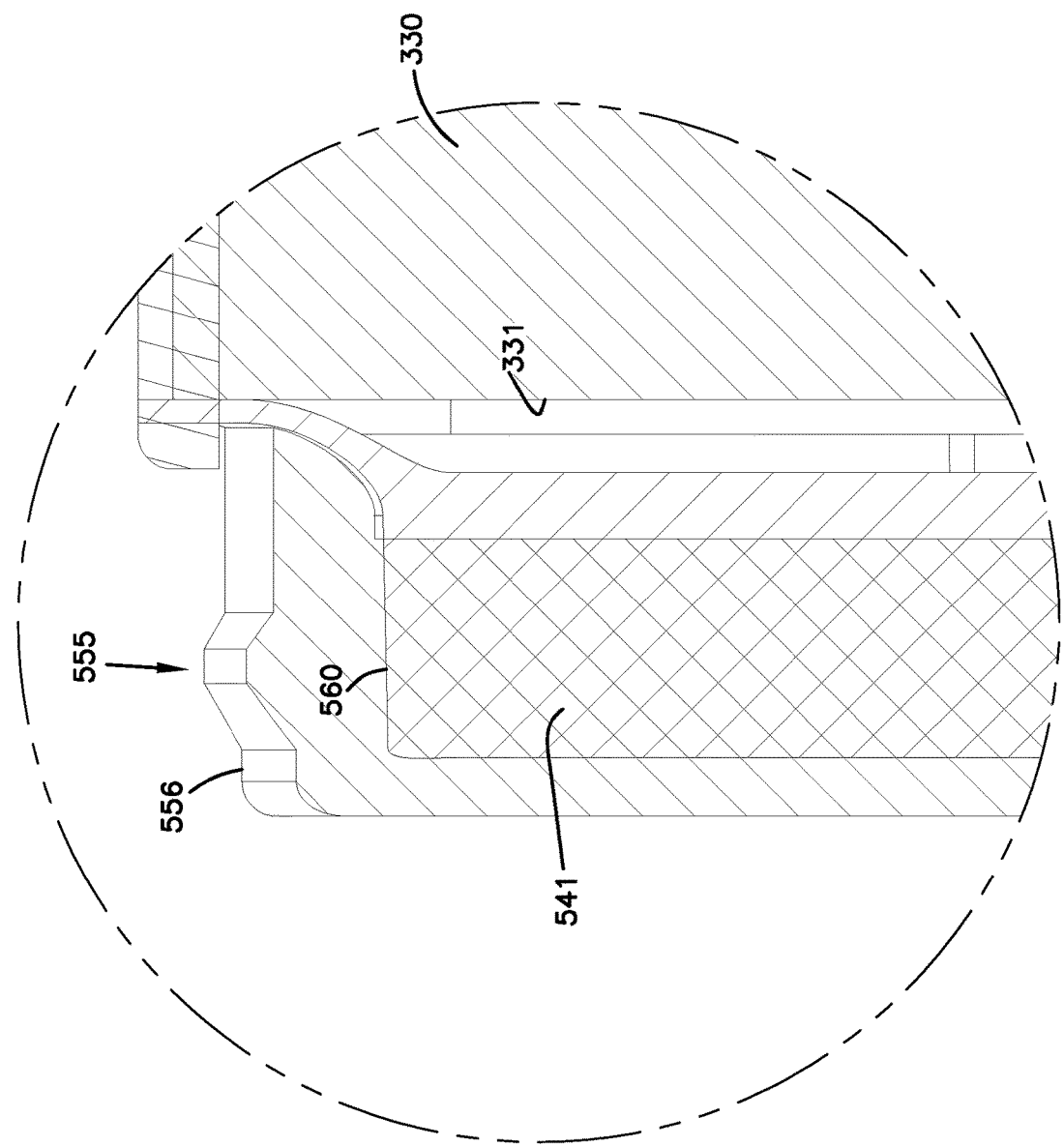
FIG. 57 is an enlarged, fragmentary, schematic view of a selected identified portion of FIG. 56.

A second alternate embodiment of a cartridge is depicted in FIGS. 55-57. Referring first to FIG. 57, an alternate cartridge usable in housing 301 is indicated at reference numeral 540. Cartridge 540 is generally analogous to cartridge 302, with one major change. That major change is that projection 541, corresponding to projection 375, comprises solid strips without gaps therein, except in the corners. Thus, projection arrangement 541 comprises four strips without gaps, a pair of long, opposite, sides; and, a pair of short, opposite ends.

Referring to FIG. 55, then, cartridge 540 is depicted, comprising a media pack 330 having opposite inlet and outlet flow faces, outlet face 332 being viewable in FIG. 55. In general, the cartridge 540 includes shell 545 generally analogous to shell 360 except modified in a projection region as discussed below. The shell 545 has opposite sides 546, 547 with flanges 548, 549 thereon, and media pack 330 positioned therebetween. Open ends 551, 552 is a shell 545 are closed by molded-in-place end pieces 554, 555 respectively.

In FIG. 56, a cross-sectional line taken along line 56-56, FIG. 55, is provided of cartridge 540. Here media pack 330 can be seen with inlet flow face 331 and opposite outlet flow face 332. The housing seal arrangement 555 is viewable, comprising a seal member 556 positioned in place over projection arrangement 541 on shell 545. Projection arrangement 541, again, comprises continuous strips (without gaps except in corners) projecting away from outlet flow face 332, the projection arrangement 541 comprising four strips with open corners. By "open" in this and related context, herein, with reference to corners, it is meant that the plastic material of projection arrangement 541 includes a gap therein, in each of the four corners. This means that each of the four strips is independent of the other four strips and can flex independently. This prevents adjacent strips from operating to strengthen or make more rigid, various strips of projection arrangement 541. Preferably, each of the four strips of the projection arrangement 541 terminates short of turning into the corner, so that corner turns do not provide strengthening or rigidity, resisting flexing of a corresponding strip.

In FIG. 57, an enlarged fragmentary view of a selected portion of FIG. 56 is depicted. In FIG. 57, an open corner 560 in projection arrangement 541 can be seen.

The particular embodiment of FIGS. 55-57 can be configured with a molded-in-place seal member 556 having a configuration analogous to seal member 365 FIG. 30, i.e., with both an inner projecting rib or an outer projecting rib. Further it can be implemented with the seal member configuration of the embodiment of FIGS. 50-54, i.e., with a continuous seal on one side, but a plurality of spaced projections on the seal material on the opposite side, to form a seal against only one of the two side surfaces of housing groove 350, while being compressed against an opposite surface.

It is noted that the embodiment of FIGS. 55-57 will not have as much flexibility as housing seal arrangement of earlier described embodiments; and, thus. may not be as preferred with respect to manufacturing tolerances, in the larger sizes. However made appropriately thin, projection arrangement 541 will exhibit some flex along its length, especially in the presence of the open corners.

C. A Third Alternate Embodiment, FIGS. 58-67

Figure 58:
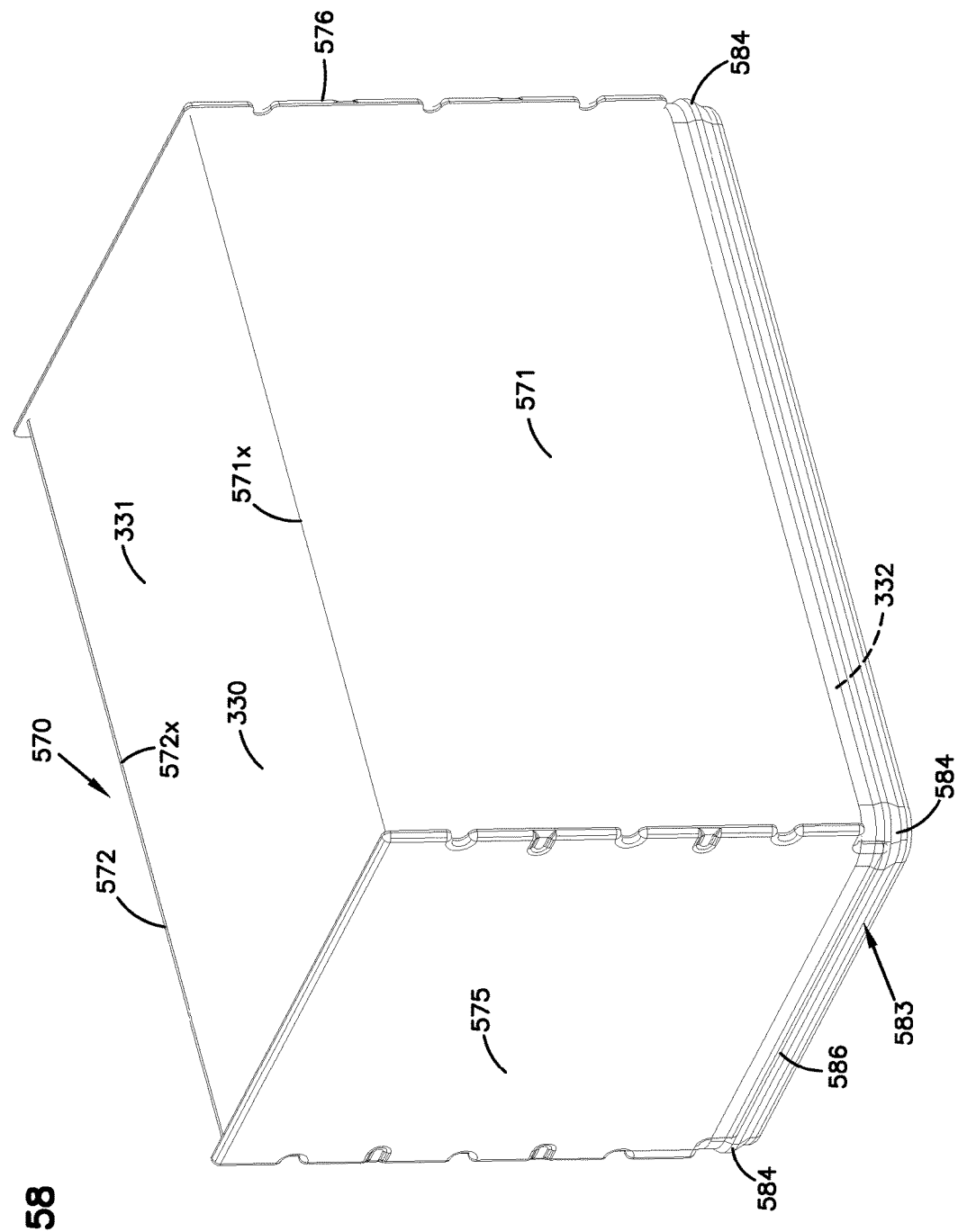
FIG. 58 is schematic, inlet, perspective view of a third alternate filter cartridge usable in the assembly of FIG. 7.

In FIGS. 58-67, a third alternate embodiment of a cartridge usable in the housing 301 is discussed. Referring first to FIG. 58, cartridge 570 is generally viewable. A particular difference in cartridge 570, from previously described cartridges, is that no shell is used as a preform.

Referring to FIG. 58, cartridge 570 comprises a media pack 330 extending between an inlet flow face 331 an opposite outlet flow face 332. The media pack 330 is not positioned in a preform shell. Rather, the media pack 330 is positioned between two side panels 571, 572. The side panels can comprise fiber board, plastic sheet or other material, as selected. The side panels 571, 572 are secured in place by: molded-in-place end pieces 575, 576, which also seal closed opposite ends 578, 579 of media pack 330; and, strips of sealant which would at least be positioned along edges 571x, 572x, between side panels 571, 572 and media pack 330.

For the embodiment cartridge 570, each of the side panels 571, 572 and end pieces 575, 576 is configured to extend beyond outlet flow face 332 sufficiently far, to provide a projection arrangement or support for housing seal member 583. This is discussed further below in connection with other drawings. It is noted that with such a configuration, the four corners 584 of the housing seal arrangement 583 will have gaps in the embedded support for seal material 586.

Figure 59:
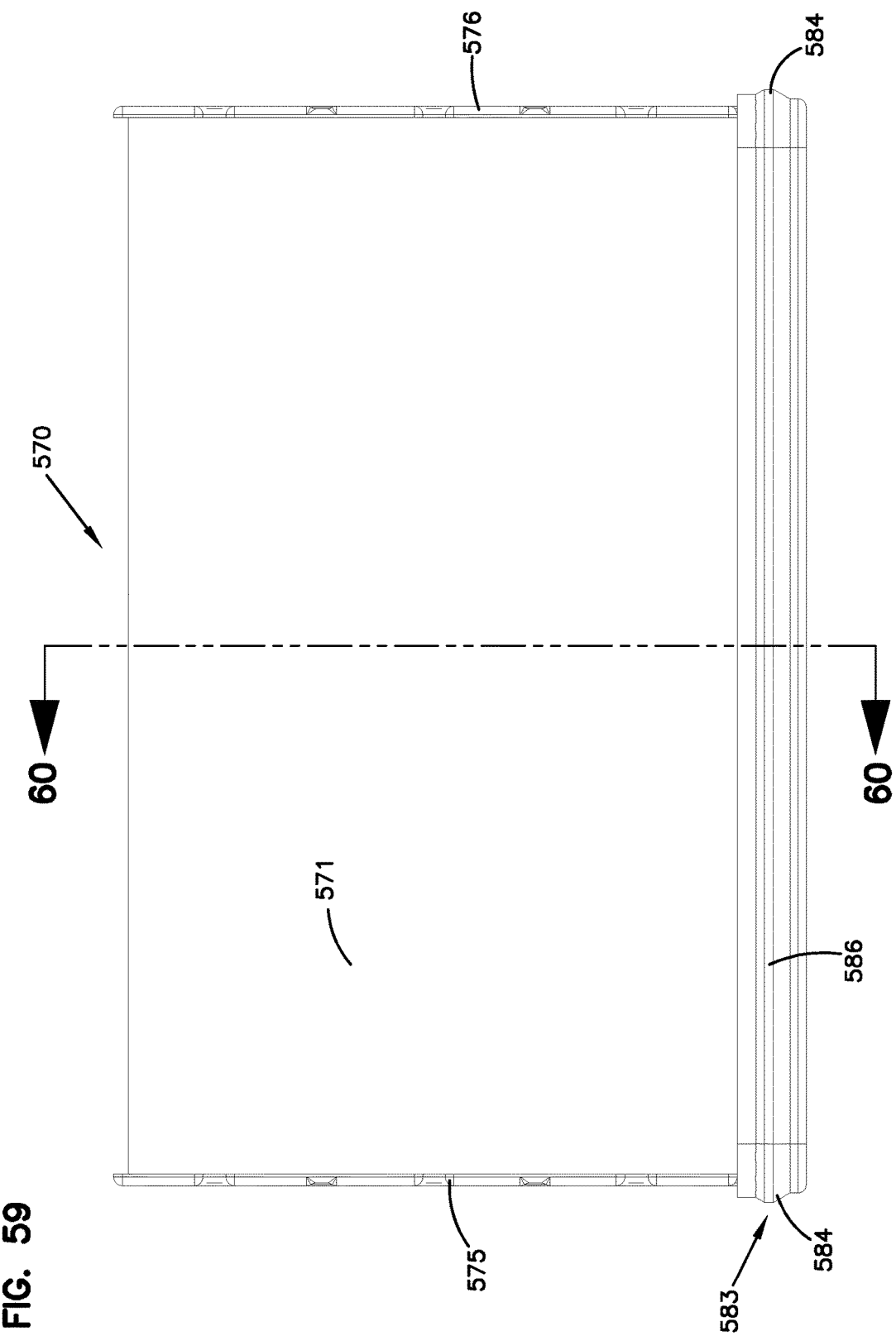
FIG. 59 is a schematic side elevational view of the cartridge depicted in FIG. 58.

FIG. 59 is a side elevational view of cartridge 570 generally directed toward side panel 572.

Figure 60:
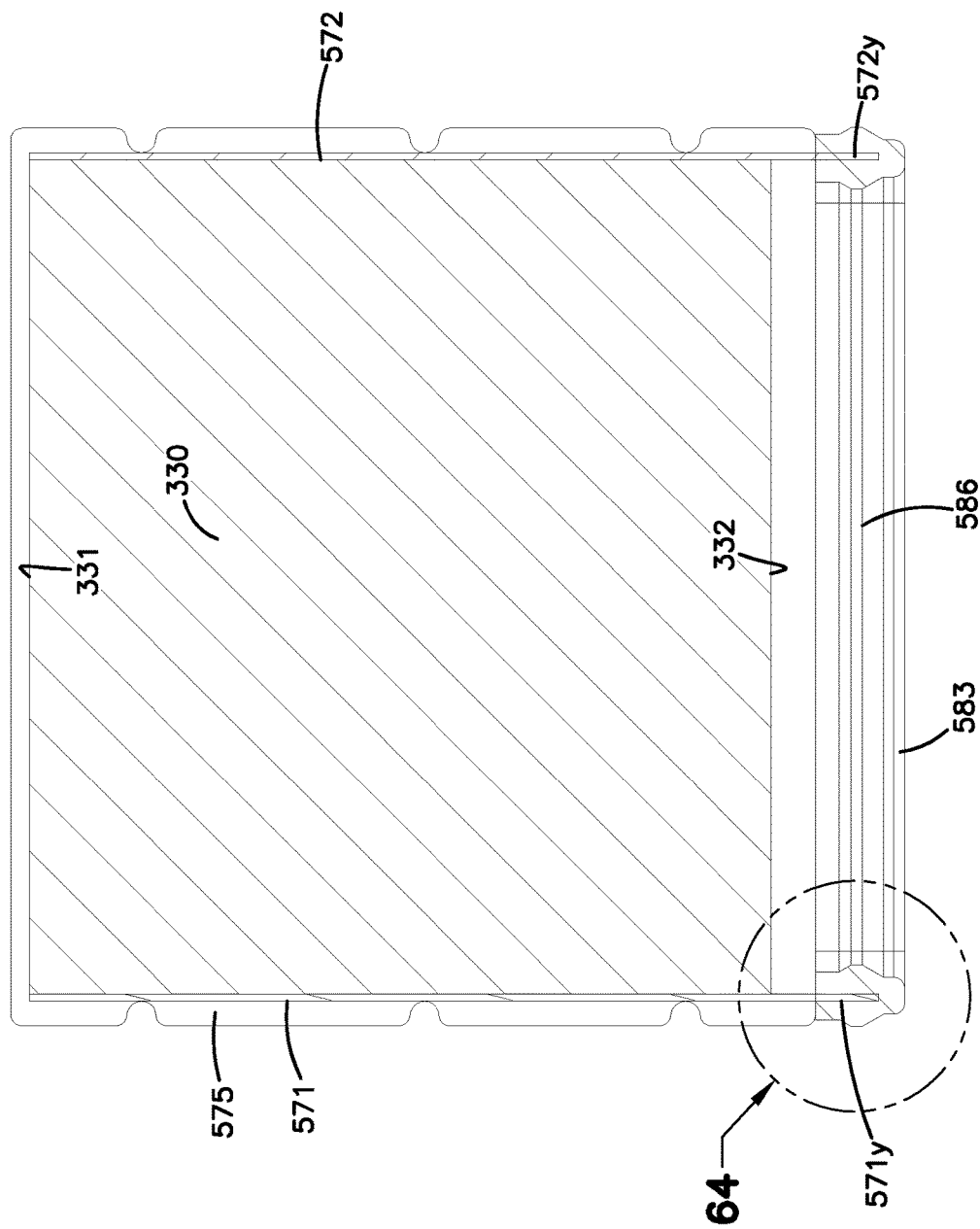
FIG. 60 is a schematic cross-sectional view taken generally along line 60-60, FIG. 59.

FIG. 60 is a cross sectional view taken along generally line 60-60 of FIG. 59. Here the media pack 330 can be seen extending between inlet flow face 331 and outlet flow face 332. Further, end sections 571y, 572y of the panels 571, 572 can be seen projecting outwardly from flow face 332 in an axial direction, away from media pack 330.

Further, housing seal arrangement 583 can be seen as including molded-in-place seal material 586, on a frame defined by portions 571y, 572y of the side panels 571, 572, projecting axially beyond end face 332 in a direction away from the media pack 330.

Figure 64:
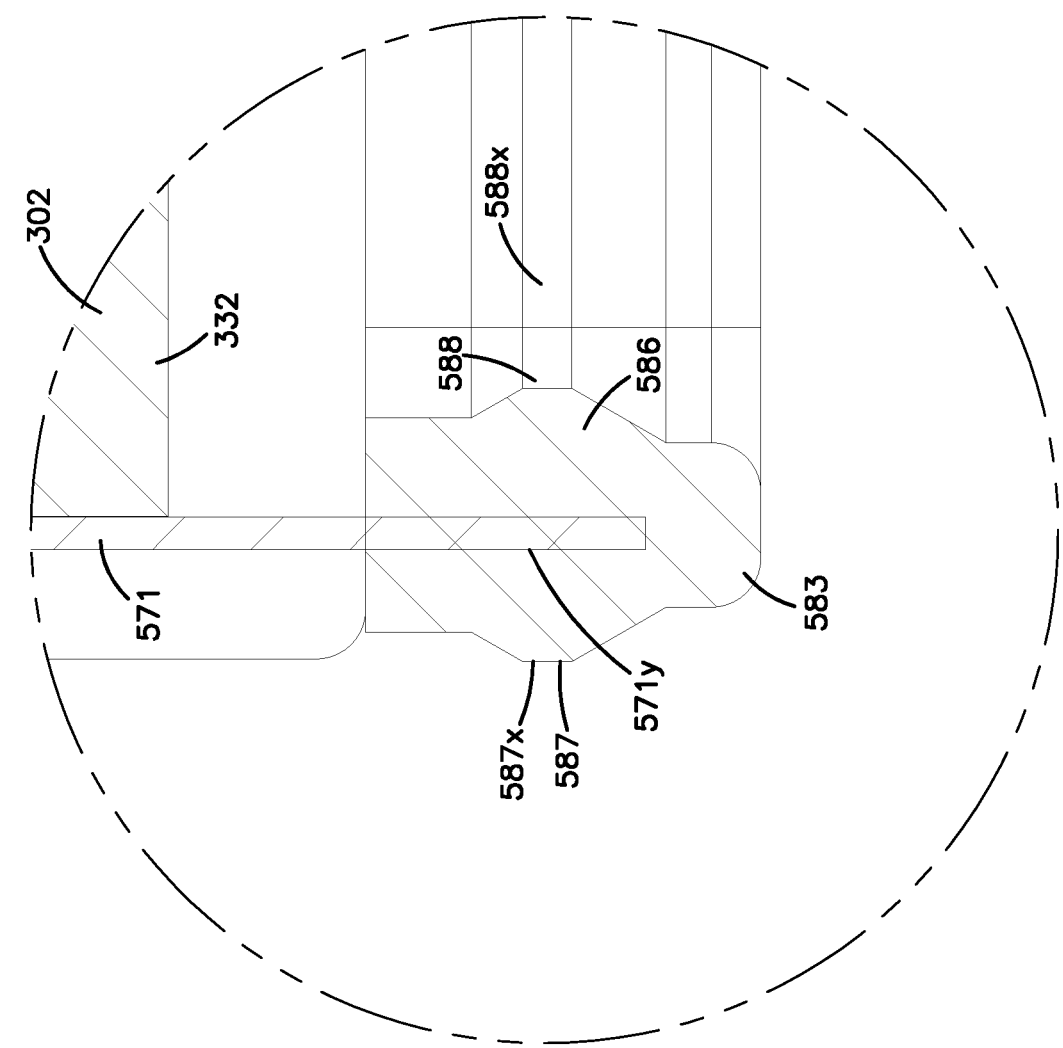
FIG. 64 is enlarged, schematic, fragmentary view of an identified portion of FIG. 60.

FIG. 64 is an enlarged fragmentary view of a portion of FIG. 60. Here portion 571y of side panel 571 can be seen with a portion of housing seal arrangement 583, and in particular a seal member 586 thereof, molded-in-place. The particular seal member 586 has an outer side 587 and an inner side 588, each of which has a central longitudinal rib, 587x, 588x. Of course the seal member 586 could be configured in accord with alternatives described previously, such as to have only inner surface 588 configured for a seal surface, or only surface 587 configured as a seal surface, when the opposite surface to seal surface is discontinuous, with spaced sections therein.

Figure 61:
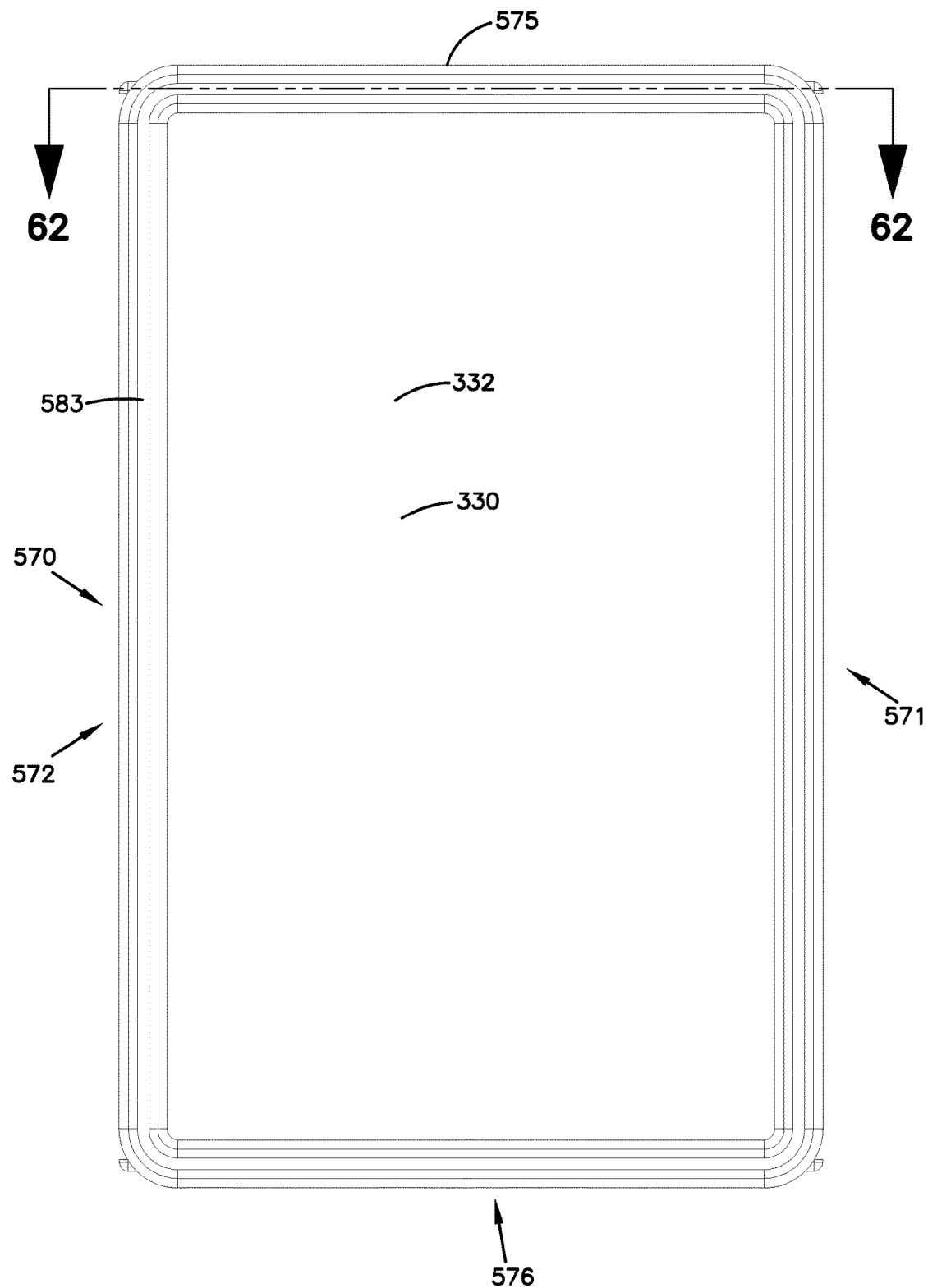
FIG. 61 is a schematic, outlet, plan view of the filter cartridge of FIG. 58.

FIG. 61 is a plan view of cartridge 570 taken generally toward outlet flow face 332 of media pack 330. Housing seal arrangement 583 can be seen as extending in a rectangular pattern, in at least partial and overlap with perimeter portions of outlet flow face 332.

Figure 62:
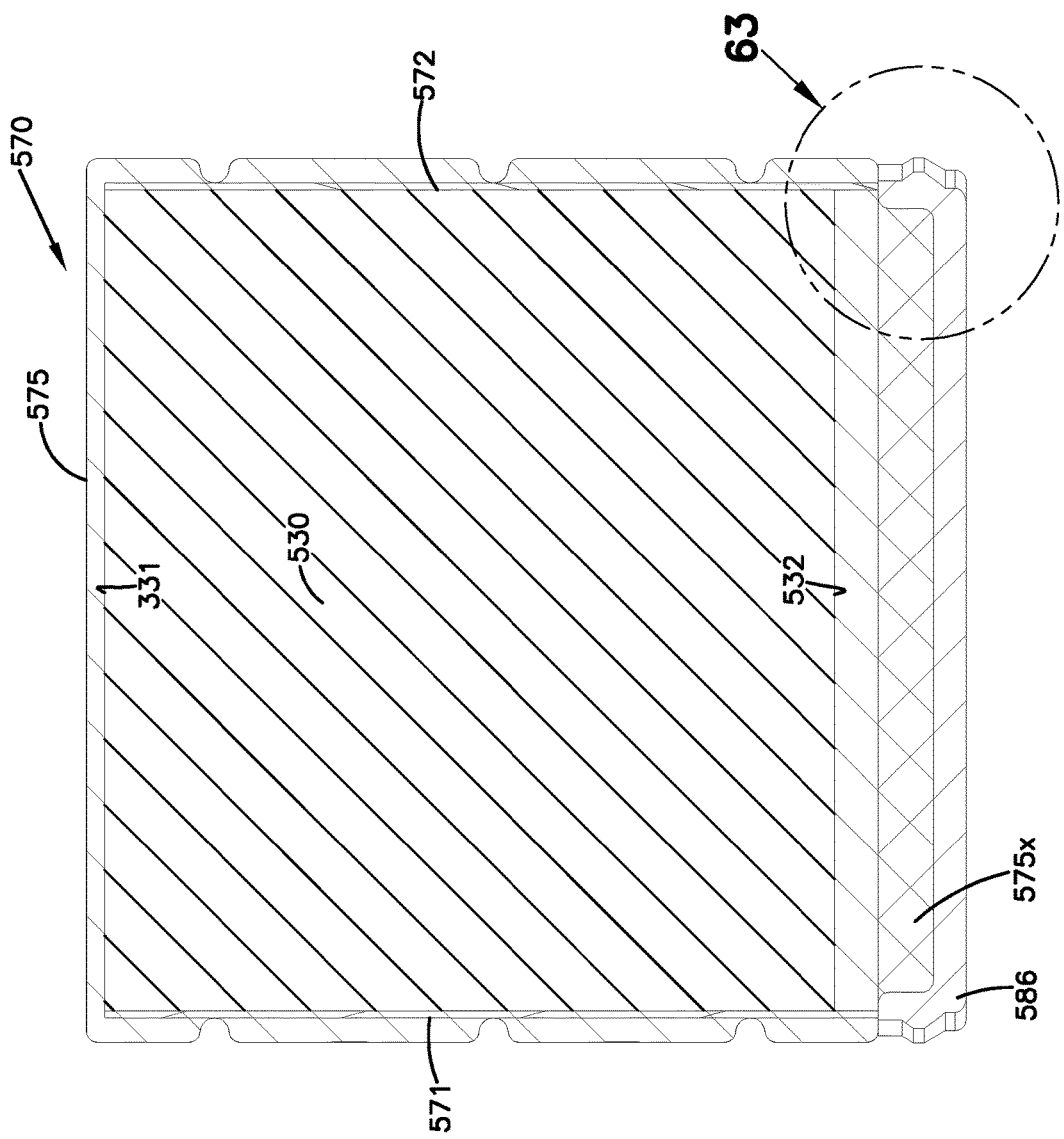
FIG. 62 is a schematic cross-sectional view taken generally along line 62-62, FIG. 61.

FIG. 62 is a cross sectional view of FIG. 61, taken along line 62-62 thereof. Here an extension 575x of panel 575 can be seen, extending beyond outlet flow face 332 of media pack 330. A portion of seal material 586 is molded-in-place with portion 575x projecting therein.

Figure 63:
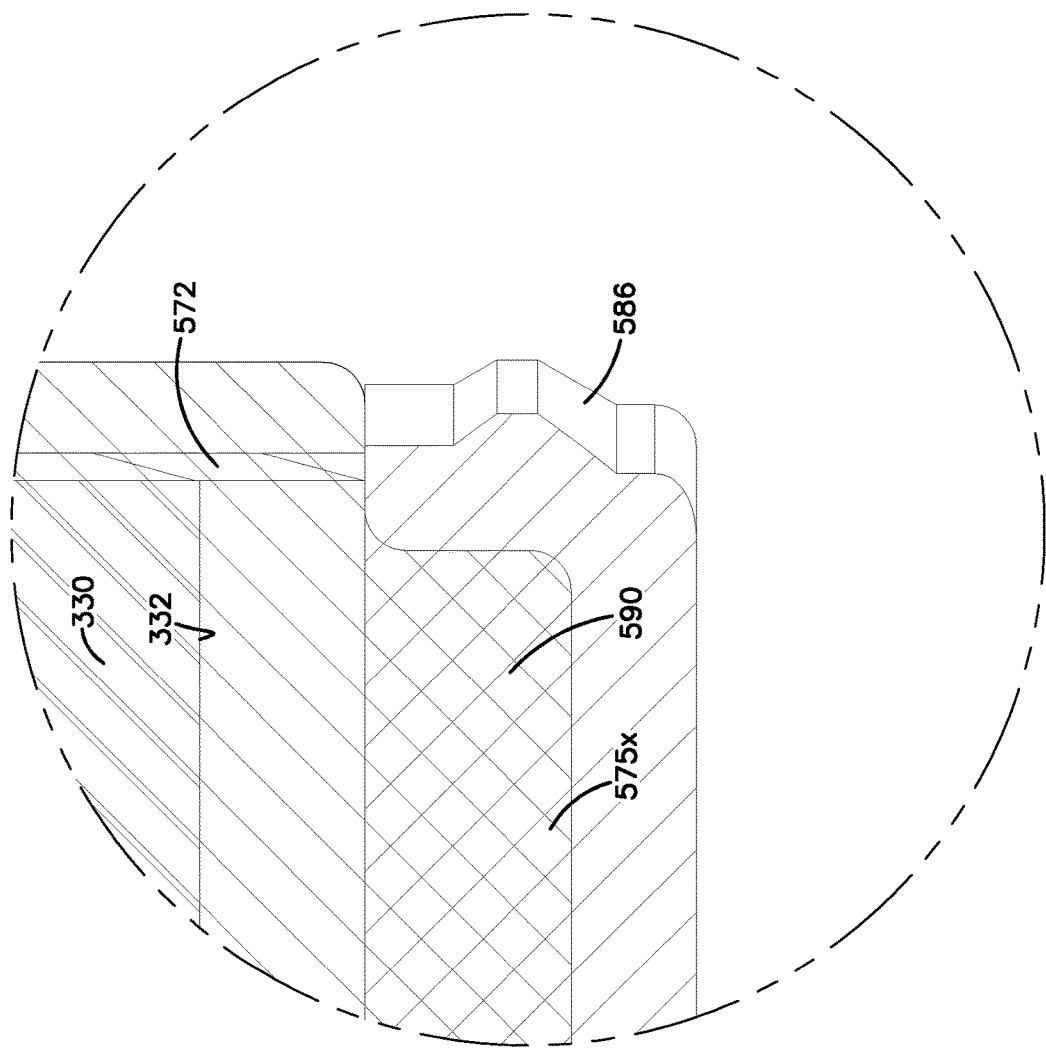
FIG. 63 is an enlarged, schematic, fragmentary view of an identified portion of FIG. 62.

FIG. 63 is an enlarged fragmentary view of an identified portion of FIG. 62. Section 575x is more readily viewable. It is noted that a portion of region 575x, indicated generally at 590, is embedded within seal member 586.

Figure 65:
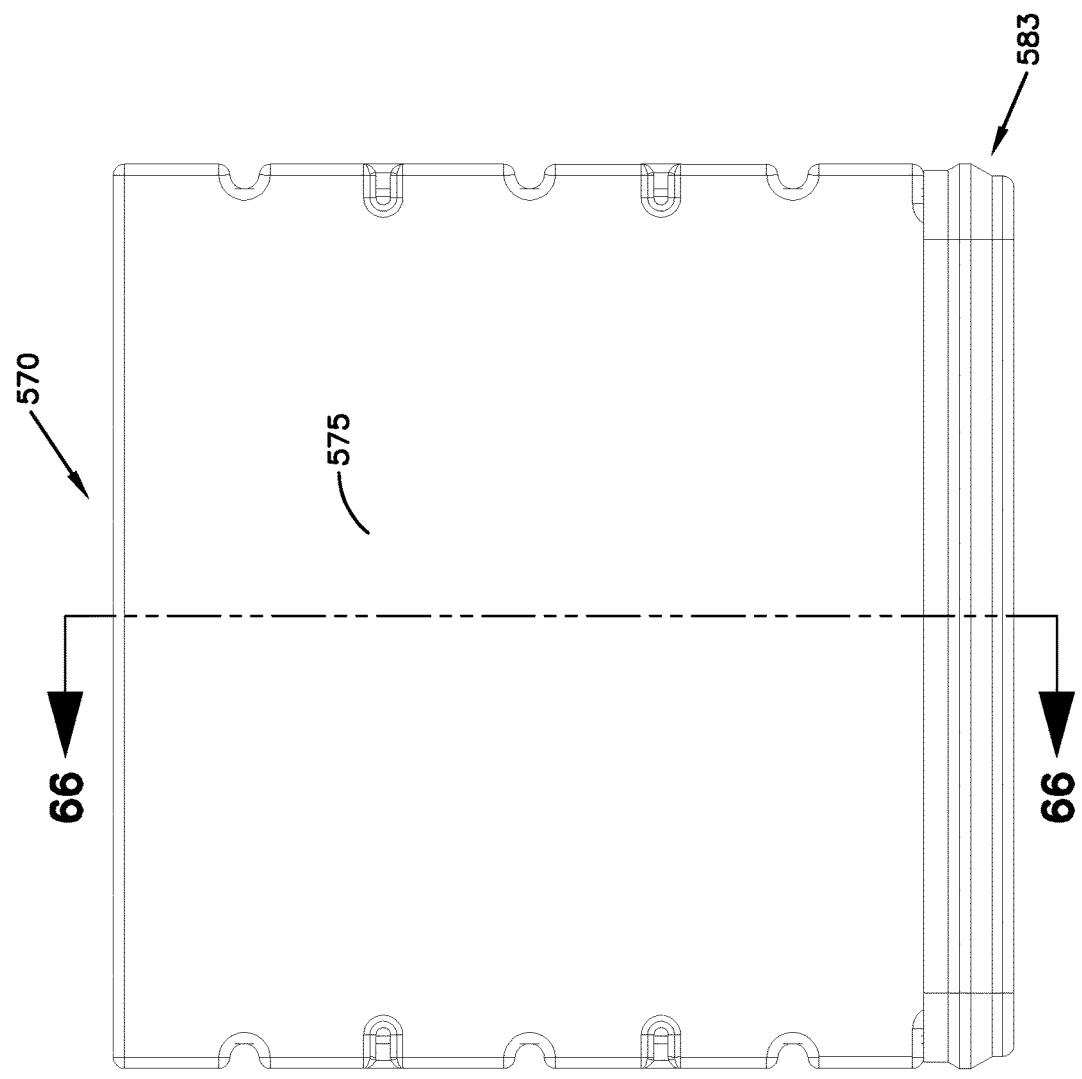
FIG. 65 is a schematic, end elevational view of the filter cartridge of FIG. 58.

FIG. 65 is an end elevational view of cartridge 570, generally directed toward end member 575.

Figure 66:
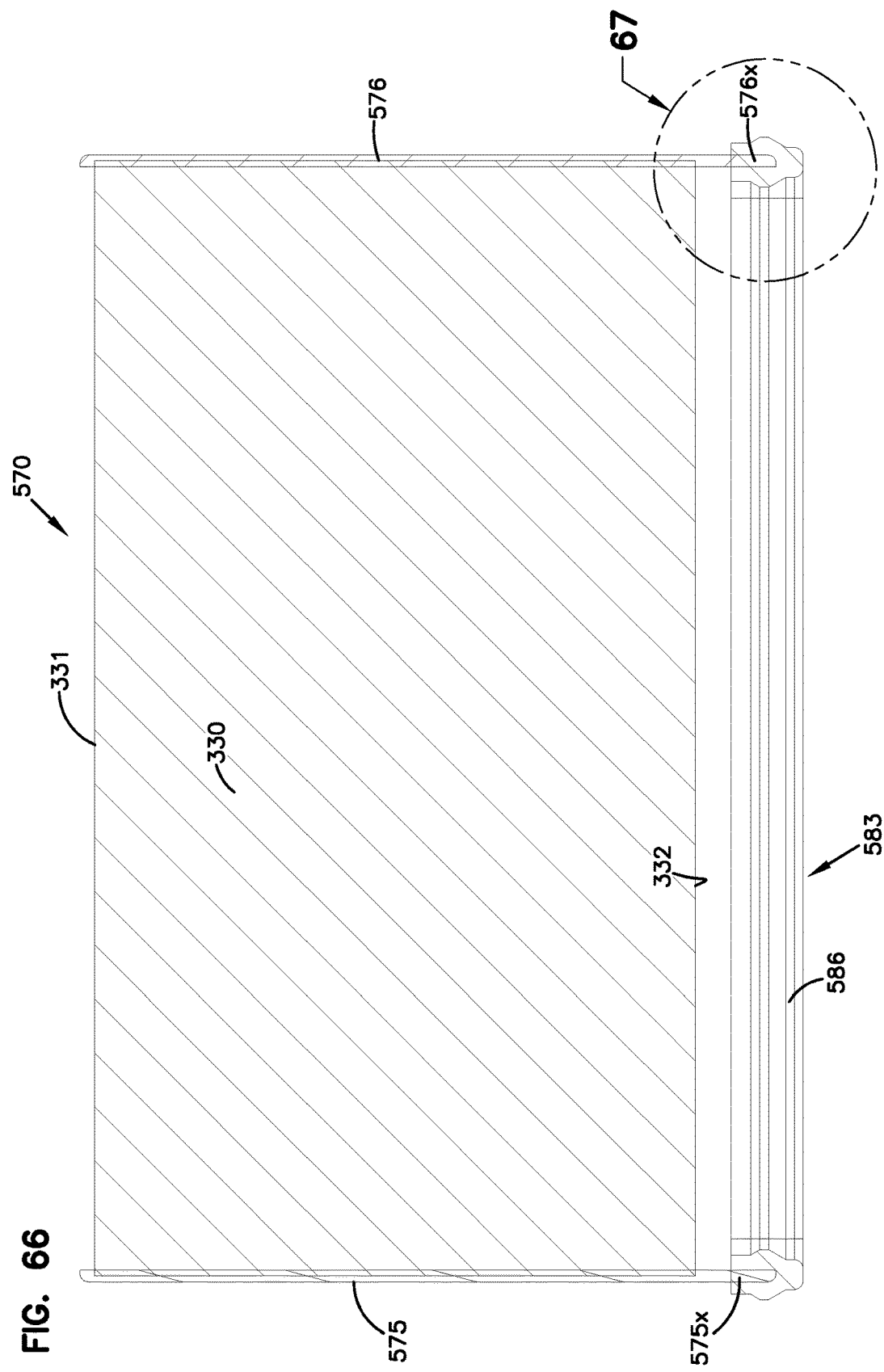
FIG. 66 is a schematic cross-sectional view taken generally along 66-66, FIG. 65.

FIG. 66 is a cross-sectional view taken generally along line 66-66, FIG. 65. Here extensions 575x 576x, respectively, of end pieces 575, 576 are viewable, extending axially beyond face 332 of cartridge 302, in a direction away from the cartridge 302.

Figure 67:
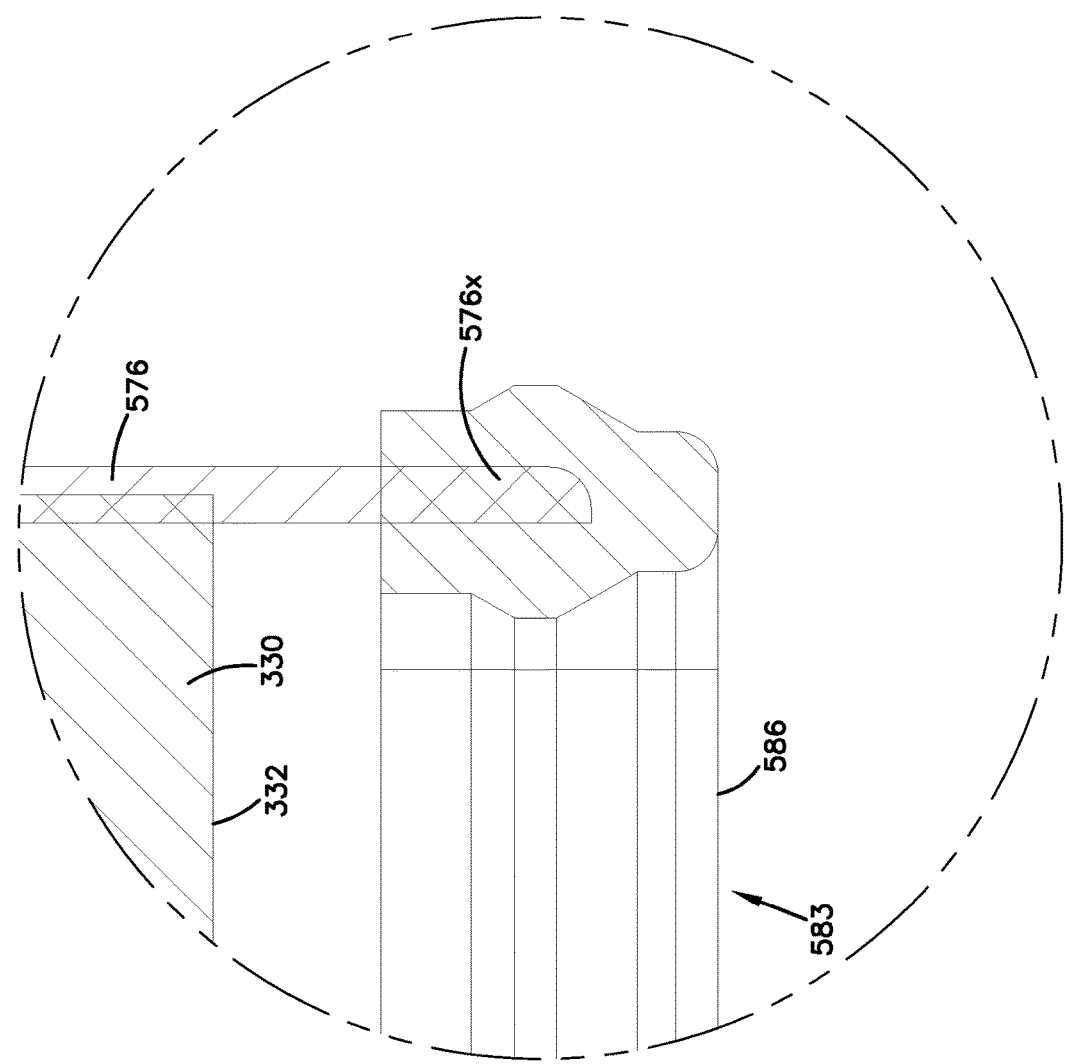
FIG. 67 is schematic, enlarged, fragmentary view of a selected identified portion of FIG. 66.

FIG. 67 is an enlarged fragmentary view of a portion of FIG. 66.

In general, then, the seal arrangement of cartridge 570, FIGS. 58-67, is formed from a molded-in-place seal member 586 positioned on extensions of the side pieces 575, 575, and the side panels 571, 572. Molded-in-place end pieces 575, 576, then, will typically be made from a harder material than used for end pieces of the earlier described embodiments also provide support and for the seal member 586.

Of course the embodiment of FIG. 58 could be implemented with the variations in one of the two seal material surfaces, described previously; i.e. either the outer surface of the inner surface could be discontinuous, with the seal only formed against a selected one of the sides of groove 350.

Flexibility in the sides of the support embedded within seal material 586, for the embodiment of FIGS. 58-67 is provided by the following: gaps in the corners; and, choosing the material for the side panels 571, 572, and the end pieces 575, 576, to provide for some flexibility.

It is noted that the housing seal arrangement 583 of the cartridge 570, FIGS. 58-67, is not positioned as much in axial overlap with surface 332, as is the housing seal arrangement for the other embodiments. Thus, the media pack 330 of FIG. 58 may have slightly smaller outer perimeter dimensions, for the same size sealing groove in the housing.

V. General Comments

According to the present disclosure, various filter cartridges, features thereof, and air cleaner assemblies and features thereof are described. There is no specific requirement than an air filter cartridge or air cleaner include all of the features characterized herein, in order to obtain some benefit of the present disclosure.

According to one aspect of the present disclosure, an air filter cartridge is provided that includes a media pack having opposite inlet and outlet flow faces. The media pack comprises fluted media having flutes extending in a direction between inlet and outlet flow faces. Typically, the media pack typically comprises a stack of strips of fluted media having flutes extending in a direction between the inlet and outlet flow faces; and, in a specific media pack characterized herein, the media pack comprises a stack of strips of single facer; each strip of single facer comprising a sheet or strip of a fluted media, having flutes extending in a direction between the inlet and outlet flow faces, secured to a sheet (strip) of facing media.

In general, the media pack is closed to flow of air entering the inlet face and passing outwardly from the outlet flow face, without filtering flow through media of the media pack.

The cartridge includes a housing seal arrangement positioned to project from adjacent the outlet flow face and configured with a seal member having: a radially inwardly directed housing seal groove engagement surface; and, a radially outwardly directed housing seal groove engagement surface. At least one of the radially inwardly directed housing seal groove engagement surface and the radially outwardly directed housing seal groove engagement, has a housing seal surface. In an example described herein, both the radially inwardly directed housing seal groove engagement surface and the radially outwardly directed housing seal groove engagement surface, are housing seal surfaces. In an alternate embodiment described herein, one of the radially inwardly directed housing seal groove engagement surface and the radially outwardly directed housing seal groove engagement surface is a seal surface, and the other housing seal groove engagement surface is configured to engage the groove, for example with spaced tabs of compressible seal material, in manner that does not form a continuous housing seal with the housing seal groove.

In example arrangements described herein, the inner groove engagement surface has a central, longitudinal, rib; and, the outer groove engagement surface face has a central, longitudinal, rib. At least one of the ribs is a seal rib. In an arrangement with two opposite seal faces, each face has a central, longitudinal, seal rib which is continuous.

In typical arrangements characterized herein, the housing seal arrangement includes a seal member having a perimeter shape with first and second, opposite, straight sides; and, first and second, opposite, straight ends. The corners (4) typically are rounded.

In certain selected embodiments described herein, the housing seal arrangement comprises a frame projection having seal material thereon. The frame projection of such arrangements typically comprises a pair of first and second, opposite, sides; a pair of first and second, opposite, ends; and, four open corners. By the term "open corners" as used herein, it is meant that the sides do not abut or engage one another adjacent the corners. Typically, each corner has an opening at least 2 mm deep, typically at least 2-15 mm deep, inclusive (usually 5-15 mm deep, inclusive) although alternatives are possible. Also, typically each of the frame projection sides is provided without a gusset or other support member, enhancing rigidity of the frame projection sides.

In an example arrangement characterized herein, the first and second, opposite, sides each have a first length $L_1$; and, the first and second, opposite, ends each have a length of $L_2$; with $L_1$ greater than $L_2$. Typically $L_1$ is at least 50 mm greater than $L_2$, usually at least 80 mm greater than $L_2$.

In example arrangements characterized generally herein, L1 is typically at least 200 mm, usually at least 250 mm, and often 300 mm or more; and, L2 is typically at least 150 mm, usually at least 200 mm, and often 230 mm or more.

In a typical arrangement herein, at least each extension (side or end) of the frame projection which is greater than about 6 inches (152 mm) long, often comprises a plurality of spaced tabs. In a typical assembly, this generally comprises at least the first and second, opposite, sides.

In some assemblies characterized herein, each of the first and second, opposite sides and the first and second, opposite, ends of the projection comprises a plurality of spaced, tabs whether greater than 6 inches (152 mm) in length or not. Typically, each tab within the frame projection has: a width within in the range of 2-20 mm, inclusive, usually 5-20 mm, inclusive; and is spaced from at least one adjacent by a tab by a distance within the range of 2-20 mm, inclusive, usually at least 5 mm; although alternatives are possible. Also, typically each tab has a length within the range 2-15 mm, inclusive, usually at least 5 mm, although alternatives are possible.

In certain example assemblies characterized herein, the air filter cartridge includes a preform shell; the preform shell having: a first and second, opposite, sides; an open inlet end; an outlet end; and first and second, opposite, open (side) ends. In an example, a preform shell is provided which includes flanges projecting outwardly from each of the first and the second, opposite, sides in a direction generally away from adjacent portions of the preform. Also, a preform is characterized herein which includes support grid, extending across the outlet end.

Typically a media pack is positioned within the preform with: an outlet flow face of the media pack adjacent the outlet end of the preform shell; and, the inlet flow face of the media pack adjacent the inlet end of the preform shell. The media pack is typically positioned between the first and second, opposite, sides of the preform shell with the cartridge further including first and second end panel pieces positioned to close the first and second, opposite, open (side) ends (not the inlet and outlet ends) of the preform shell and to close opposite ends of the media pack. Typically, the end panels or pieces are molded-in-place.

In certain example assemblies characterized herein, the preform shell includes a (frame) projection surrounding the outlet end and projecting in a direction away from the media pack outlet face. Also, the housing seal arrangement includes the seal member positioned on the frame seal projection. Typically, a seal member comprises molded-in-place seal material, with a frame seal projection embedded therein.

In a alternate characterization of a filter cartridge described herein, the air filter cartridge comprises a media pack generally in accord with characterizations or selected ones of the characterizations provided herein above. A housing seal arrangement is configured to project outwardly from adjacent the outlet flow face of the media pack, in a direction away from an inlet flow face of the media pack.

The housing seal arrangement includes a projection comprising: a pair of first and second, opposite, sides; a pair of first and second, opposite, ends; and, four open corners. The housing seal arrangement includes a seal member positioned on the projection. The seal member is typically configured to have a continuous, rectangular, seal configuration with rounded corners and with at least one of: a first radially inwardly directed seal face; and, a second radially, outwardly, directed seal face. An example arrangement has both radially inwardly and radially outwardly, directed, continuous, seal faces; the seal arrangement being rectangular with four rounded corners. A preform shell, as previously characterized, can be used in the filter cartridge.

According to yet another characterization of the present disclosure, an air filter cartridge is provided which includes a media pack as generally characterized. Further, the cartridge includes a preform shell having: first and second, opposite, sides; and, first and second, opposite, (side) ends. The media pack is positioned between the first and second, opposite, sides of the preform shell. First and second, opposite, side pieces are provided, typically molded-in-place, to: close the first (side) open end of the preform shell and to close the first end of the media pack; and, to close the second (side) open end of the preform shell and to close the second end of the media pack. A housing seal arrangement is positioned, typically in at least partial overlap with the outlet flow face of the media pack, and in any event, generally projecting in a direction away from the media pack. The housing seal arrangement comprises a seal member defining at least one of an inwardly directed radial seal and an outwardly directed radial seal. The housing seal arrangement can be as characterized herein above.

Also according to the present disclosure, an air cleaner assembly is provided which includes a housing having a housing body and an openable access cover. The housing includes an air flow inlet arrangement and an air flow outlet arrangement. The housing body includes a seal groove therein having: a inner wall; and, a outer wall opposite the inner wall. The seal groove typically has a channel width with of least 8 mm and not greater than 25 mm, typically 9-18 mm, inclusive, although alternatives are possible. This would correspond to a width between the inner wall and the outer wall.

An air filter cartridge generally in accord with the previous characterizations, or selected portions of the previous characterizations, is typically positioned in a housing with the housing seal arrangement projecting into the seal groove and engaging each one of the inner and outer walls of the seal groove. In some arrangements, a seal is formed against each of the inner and outer walls of the seal groove; whereas in others, although each groove side wall is engaged, only one wall is engaged by a continuous seal.

In an example assembly depicted, the housing is configured for air flow through the inlet arrangement to be in an opposite direction to air flow through the outlet arrangement. Also, in an example arrangement described, the access cover is hingedly mounted on the housing. In a specific example depicted, the access cover is hingedly mounted for pivoting between an upper, closed, orientation, and a lower, open, orientation.

In an example characterized herein, the access cover includes a lock arrangement thereon, positioned to be engage a portion of the cartridge; for example, a flange arrangement on the cartridge, to help retain an enclosed filter cartridge in a sealed orientation, when installed. In certain air cleaner assemblies according to the present disclosure, a secondary or safety cartridge can be positioned downstream of the main filter cartridge or filter cartridges as characterized above.

According to another aspect of the present disclosure, a filter cartridge is provided comprising a media pack having opposite inlet and outlet flow faces. The media pack typically comprises a stack of strips of fluted media having flutes extending in a direction between the inlet and outlet flow faces. The media pack is closed to flow entering the inlet face and passing outwardly from the outlet face without filtering flow through media of the media pack.

The filter cartridge includes a housing seal arrangement positioned to project from adjacent the outlet flow face and configured with a seal member having at least one radially directed housing seal surface. The housing seal arrangement comprises a frame projection having seal material thereon configured to form the housing seal surface. The frame projection comprises a portion of a pre-formed shell having: first and second, opposite, sides; an outlet end; and an opposite inlet end. It further includes first and second, opposite, open side ends; and, first and second, opposite, outwardly directed flanges on the first and second sides of the pre-formed shell adjacent the inlet end of the pre-formed shell and directed toward the inlet face of the media pack.

The cartridge further includes first and second end panels molded in place: to close the first and second, opposite, open side ends to the pre-formed shell; and, to close opposite ends of the media pack.

In an example depicted, the media pack is positioned between the outwardly directed flanges. The housing seal surface can comprise a radially outwardly directed seal, although alternatives are possible.

There is no specific requirement that an assembly, component or technique have all of the details characterized herein, in order to obtain some benefit according to the present disclosure.

What is claimed:

1. An air filter cartridge comprising:
   (a) a media pack having an inlet flow face, and, an opposite outlet flow face and comprising fluted media secured to facing media;
      (i) the media pack being closed to air entering an inlet face and passing outwardly from an outlet flow face without filtering flow through media of the media pack; and,
   (b) a housing seal arrangement comprising a seal member defining at least one of an inwardly directed radial seal and an outwardly directed radial seal;
      (i) each such radial seal being a seal configured to provide seal forces directed generally orthogonal to a direction of air flow through the media pack; and,
      (ii) a seal frame projection embedded within the seal member;
         (A) the seal frame projection comprising a plurality of spaced tabs, having gaps between the tabs, embedded in the seal member;
         (B) the spaced tabs being oriented with molded-in-place portions of the seal member positioned on opposite sides thereof.

2. An air filter cartridge according to claim 1 wherein:
   (a) the media pack has a rectangular shape.

3. An air filter cartridge according to claim 1 wherein:
   (a) each tab has a width within the range of 2-20 mm inclusive.

4. An air filter cartridge according to claim 1 wherein:
(a) each tab is positioned spaced from at least one adjacent tab by a distance within the range of 2-20 mm, inclusive.

5. An air filter cartridge according to claim 1 wherein:
(a) each tab has a width within the range of 2-20 mm inclusive; and,
(b) each tab is positioned spaced from at least one adjacent tab by a distance within the range of 2-20 mm, inclusive.

6. An air filter cartridge according to claim 5 wherein:
(a) each tab has a length within the range of 2-15 mm, inclusive.

7. An air filter cartridge according to claim 1 wherein:
(a) each tab is located in a straight portion of the seal frame projection.

8. An air filter cartridge according to claim 7 wherein:
(a) the portion of the seal frame projection comprising the spaced tabs has a rectangular shape.

9. An air filter cartridge according to claim 8 wherein: (a) the portion of the seal frame projection comprising the spaced tabs has a rectangular shape with four sides, each of which has a length of at least 152 mm.

10. An air filter cartridge according to claim 9 wherein:
(a) the portion of the seal frame projection comprising the spaced tabs has a rectangular shape including a second, shorter, pair of opposite sides, each having a length of at least 50 mm less than each of the first pair of opposite sides.

11. An air filter cartridge according to claim 10 wherein:
(a) the portion of the seal frame projection comprising the spaced tabs has a rectangular shape including a second, shorter, pair of opposite sides, each having a length of at least 80 mm less than each of the first pair of opposite sides.

12. An air filter cartridge according to claim 10 wherein:
(a) each tab has a length of at least 5 mm.

13. An air filter cartridge according to claim 12 wherein:
(a) each tab is spaced from each adjacent tab by at least 5 mm.

14. An air filter cartridge according to claim 1 wherein:
(a) the media pack comprises a stack of strips; each strip comprising a fluted sheet secured to a facing sheet.

15. An air filter cartridge according to claim 14 wherein:
(a) the media pack has a blocked, stacked, configuration.

16. An air filter cartridge according to claim 15 wherein:
(a) each tab has a length of at least 5 mm.

17. An air filter cartridge according to claim 16 wherein:
(a) each tab is spaced from each adjacent tab by at least 5 mm.

18. An air filter cartridge according to claim 1 wherein:
(a) each tab is spaced from each adjacent tab by at least 5 mm.

19. An air filter cartridge according to claim 18 wherein:
(a) each tab has a length of at least 5 mm.

20. An air filter cartridge according to claim 1 wherein:
(a) each tab has a length of at least 5 mm.

21. An air cleaner arrangement comprising:
(a) a housing including: a housing body; and, an openeable access cover;
  (i) the housing including an air flow inlet arrangement and air flow outlet arrangement;
  (ii) the housing body including a seal groove therein having: an inner wall; and, an outer wall opposite the inner wall; and,
(b) an air filter cartridge in accord with claim 1 operably positioned within the housing with the housing seal arrangement projecting into the seal groove and engaging each one of the inner and outer walls of the seal groove.

* * * * *